(12) United States Patent
Newgent

(10) Patent No.: US 11,629,685 B2
(45) Date of Patent: Apr. 18, 2023

(54) ELECTROMAGNETIC TURBINE AND FLUID RECIRCULATION SYSTEM

(71) Applicant: Michael Newgent, Kapaa, HI (US)

(72) Inventor: Michael Newgent, Kapaa, HI (US)

(*) Notice: Subject to any disclaimer, the term of this patent is extended or adjusted under 35 U.S.C. 154(b) by 181 days.

(21) Appl. No.: 17/224,758

(22) Filed: Apr. 7, 2021

(65) Prior Publication Data

US 2021/0388807 A1 Dec. 16, 2021

Related U.S. Application Data

(60) Provisional application No. 63/006,459, filed on Apr. 7, 2020.

(51) Int. Cl.
| | |
|---|---|
| *F03B 11/00* | (2006.01) |
| *H02K 7/18* | (2006.01) |
| *F03B 11/06* | (2006.01) |
| *F03B 1/00* | (2006.01) |

(52) U.S. Cl.
CPC .......... *F03B 11/002* (2013.01); *F03B 1/00* (2013.01); *F03B 11/06* (2013.01); *H02K 7/1823* (2013.01); *F05B 2240/51* (2013.01); *F05B 2260/60* (2013.01)

(58) Field of Classification Search
CPC .......... F03B 11/002; F03B 1/00; F03B 11/06; H02K 7/1823; F05B 2240/51
USPC .......................................................... 290/52
See application file for complete search history.

(56) References Cited

U.S. PATENT DOCUMENTS

| | | | |
|---|---|---|---|
| 4,155,022 A | 5/1979 | Crockett | |
| 6,836,028 B2 | 12/2004 | Northrup | |
| 7,915,750 B1 * | 3/2011 | Rovinsky | F03B 17/061 290/52 |
| 8,564,148 B1 * | 10/2013 | Novak | F03D 80/70 290/55 |
| 9,088,187 B2 | 7/2015 | Andujar | |
| 2009/0102193 A1 | 4/2009 | Murphy | |
| 2014/0117669 A1 | 5/2014 | Kyle | |

\* cited by examiner

*Primary Examiner* — Charles Reid, Jr.
(74) *Attorney, Agent, or Firm* — L/O Of Alexis J Saenz

(57) ABSTRACT

An electromagnetic turbine system includes a circulation system for recirculating fluid that drives turbine impellers for electromagnetic turbine modules. The circulation system includes a fluid separator module which separates gas from liquid and circulates the liquid back to a pressure chamber. The liquid in the pressure chamber is propel by compressed gas. Multiple pressure chambers may be controlled to release pressurized fluid to drive their respective shafts on a staggered timing sequence. The turbine modules may be levitated from a supporting surface to reduce friction.

20 Claims, 55 Drawing Sheets

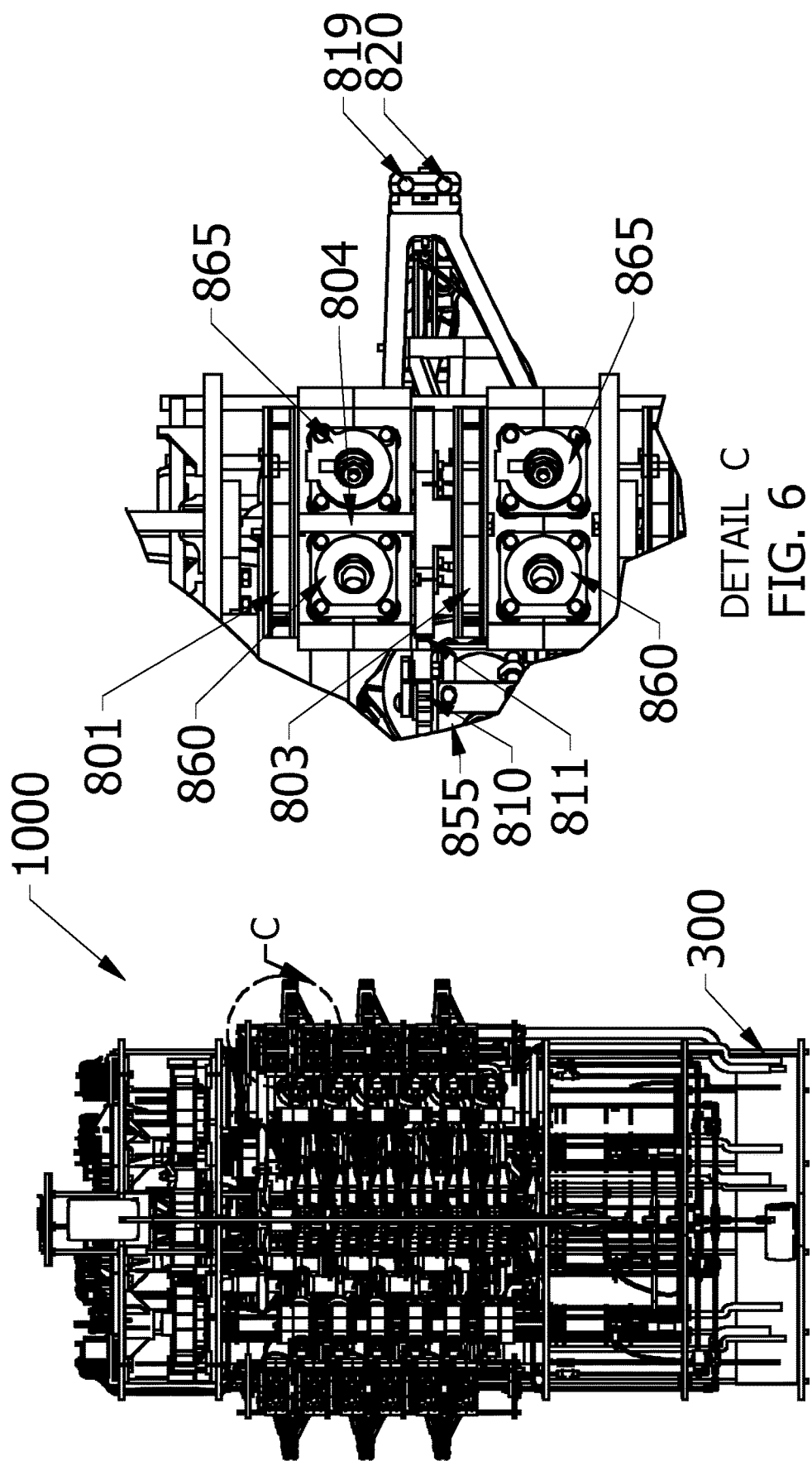

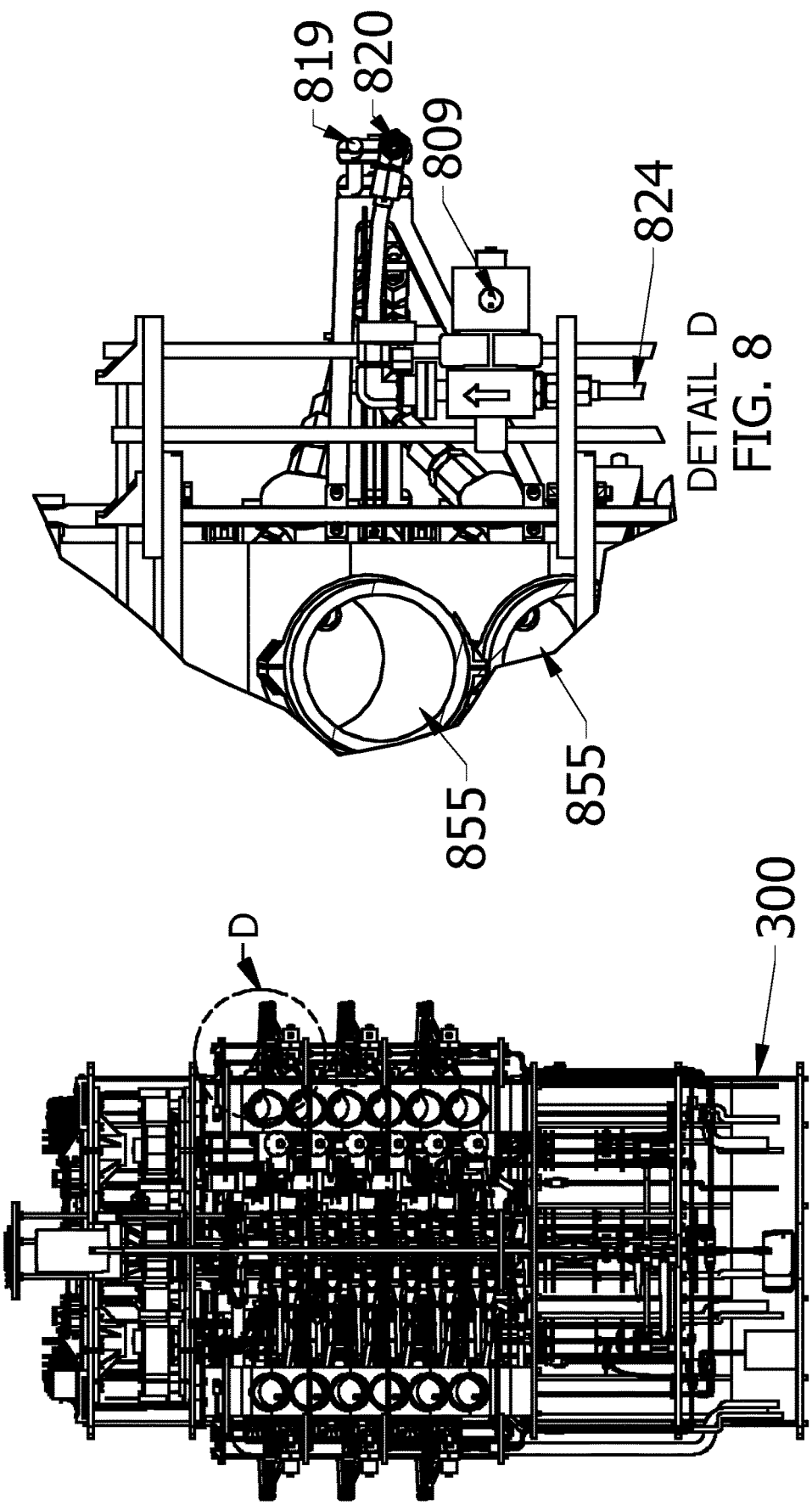

DETAIL H-H

SECTION G-G

SECTION U-U

DETAIL Y

SECTION A2-A2

Elevation Control Actuator Assembly

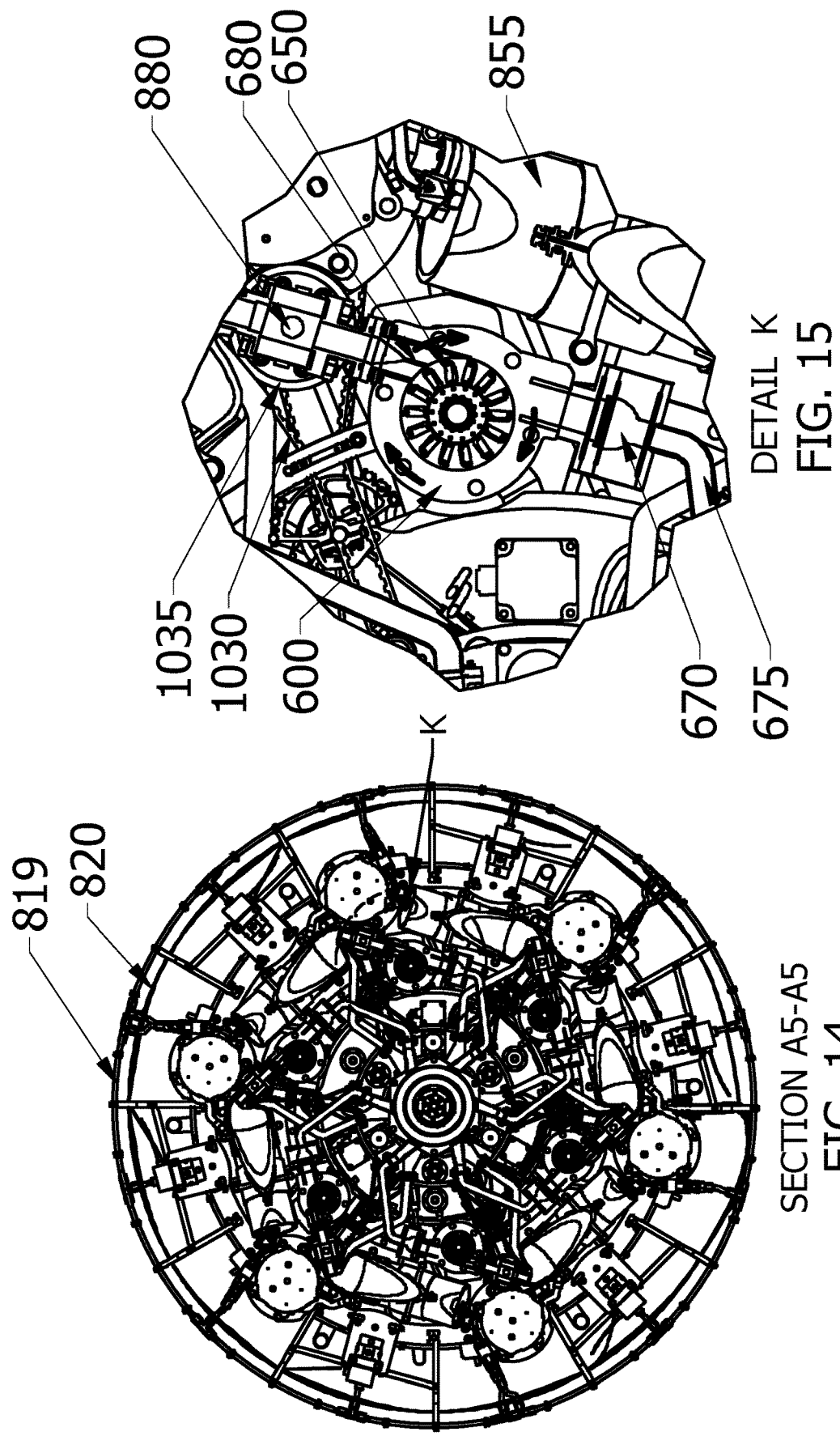

DETAIL N

SECTION A4-A4

DETAIL R

SECTION A3-A3

4 Valve Pulley Assembly

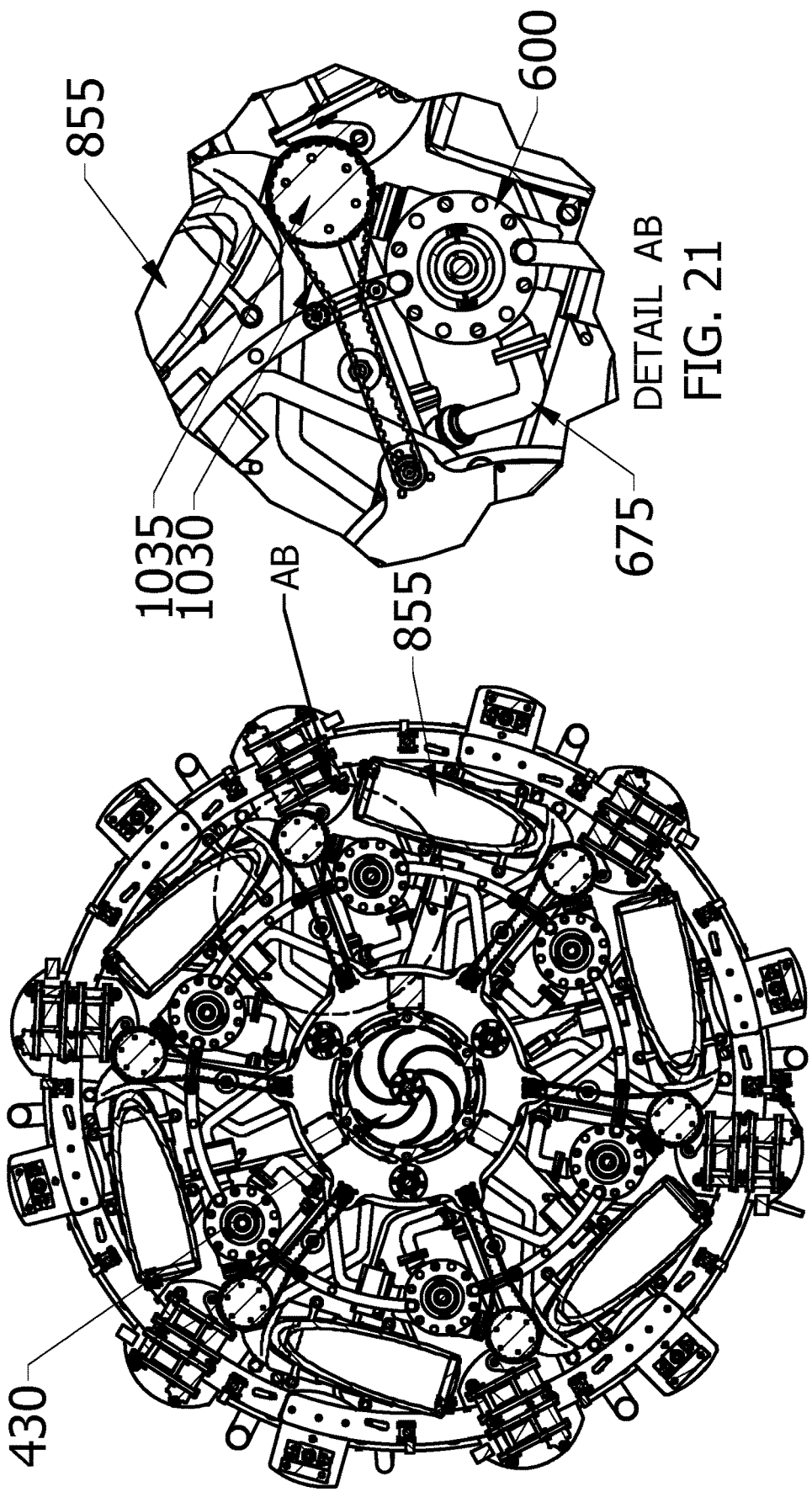

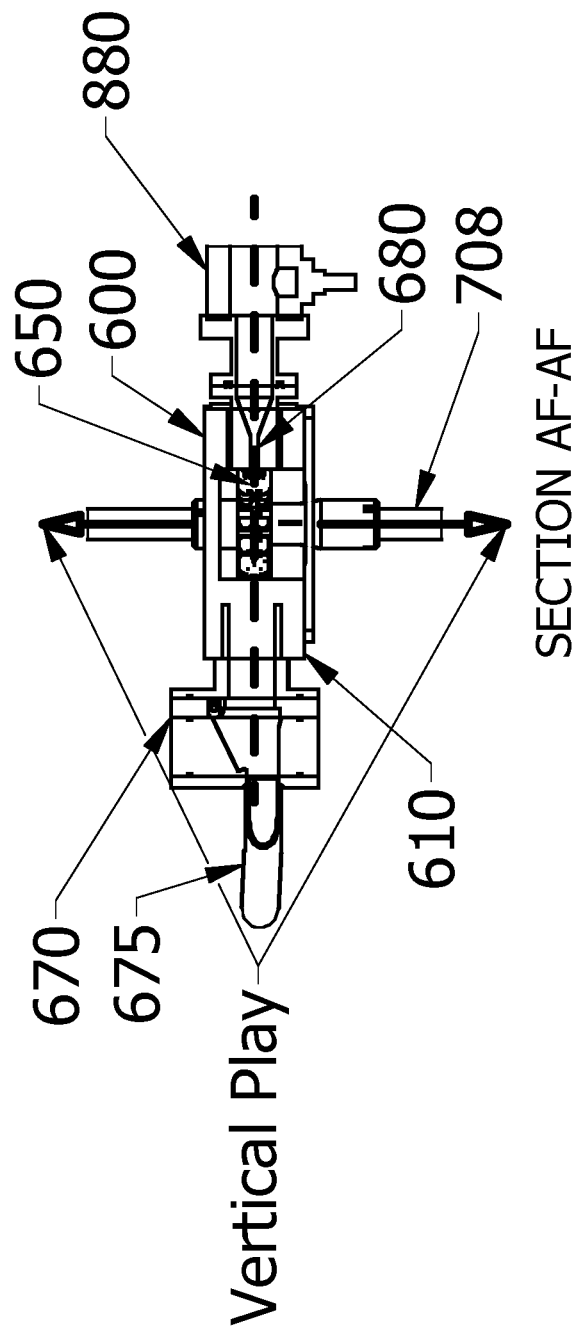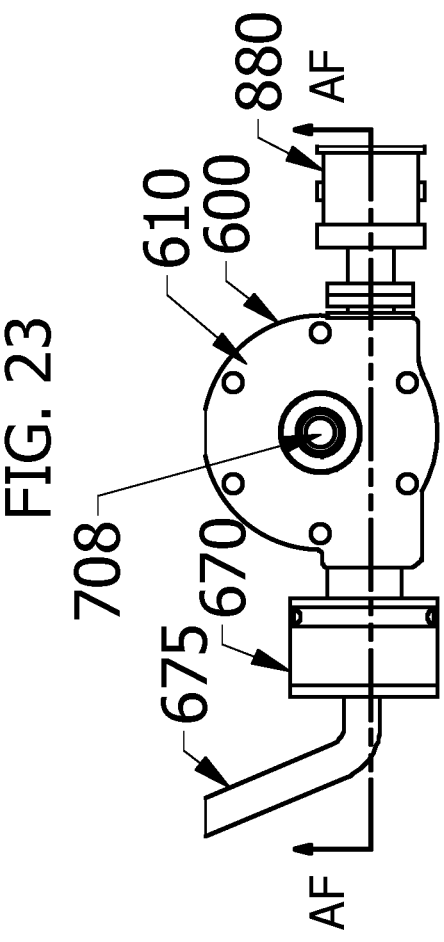

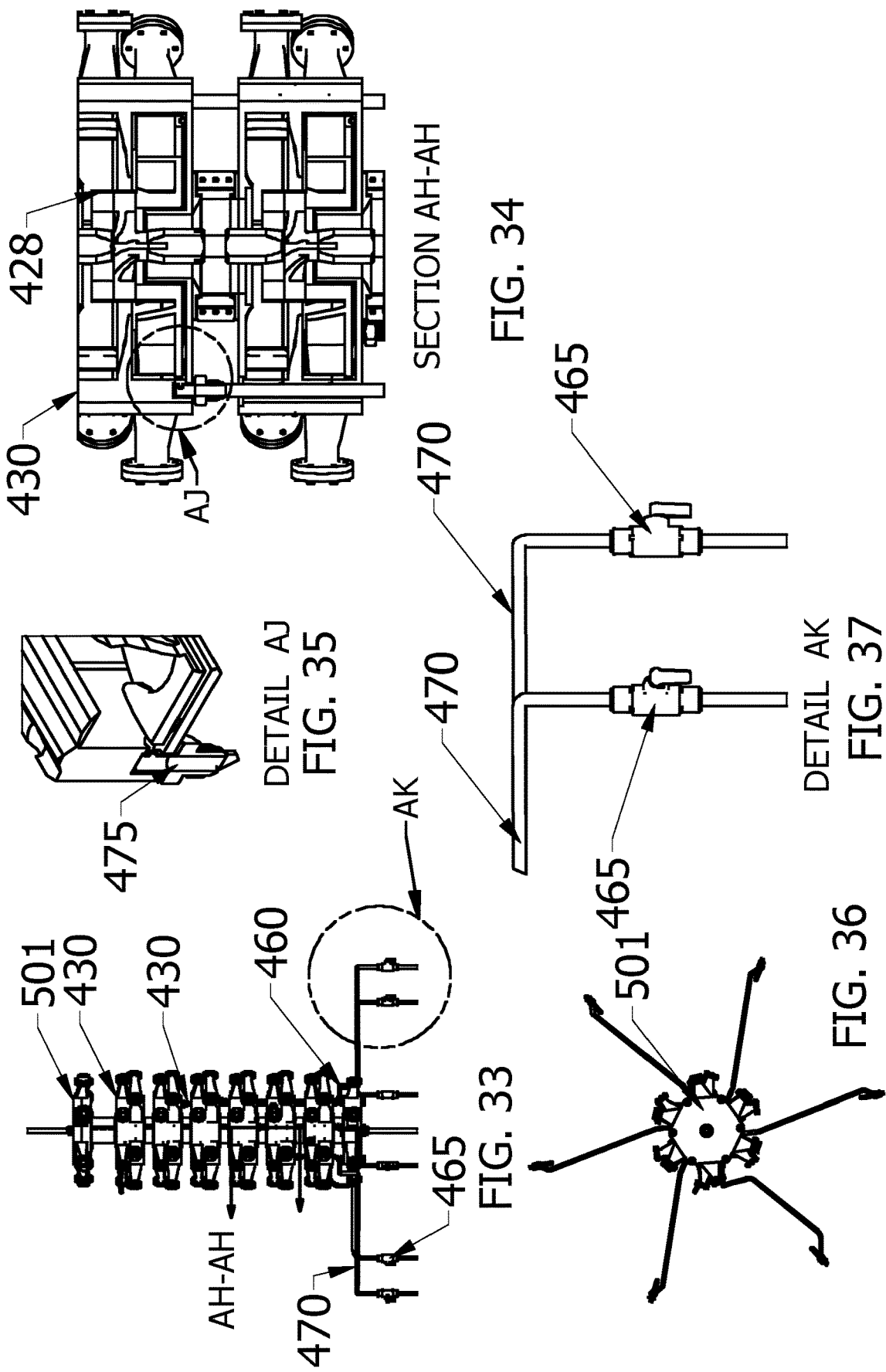

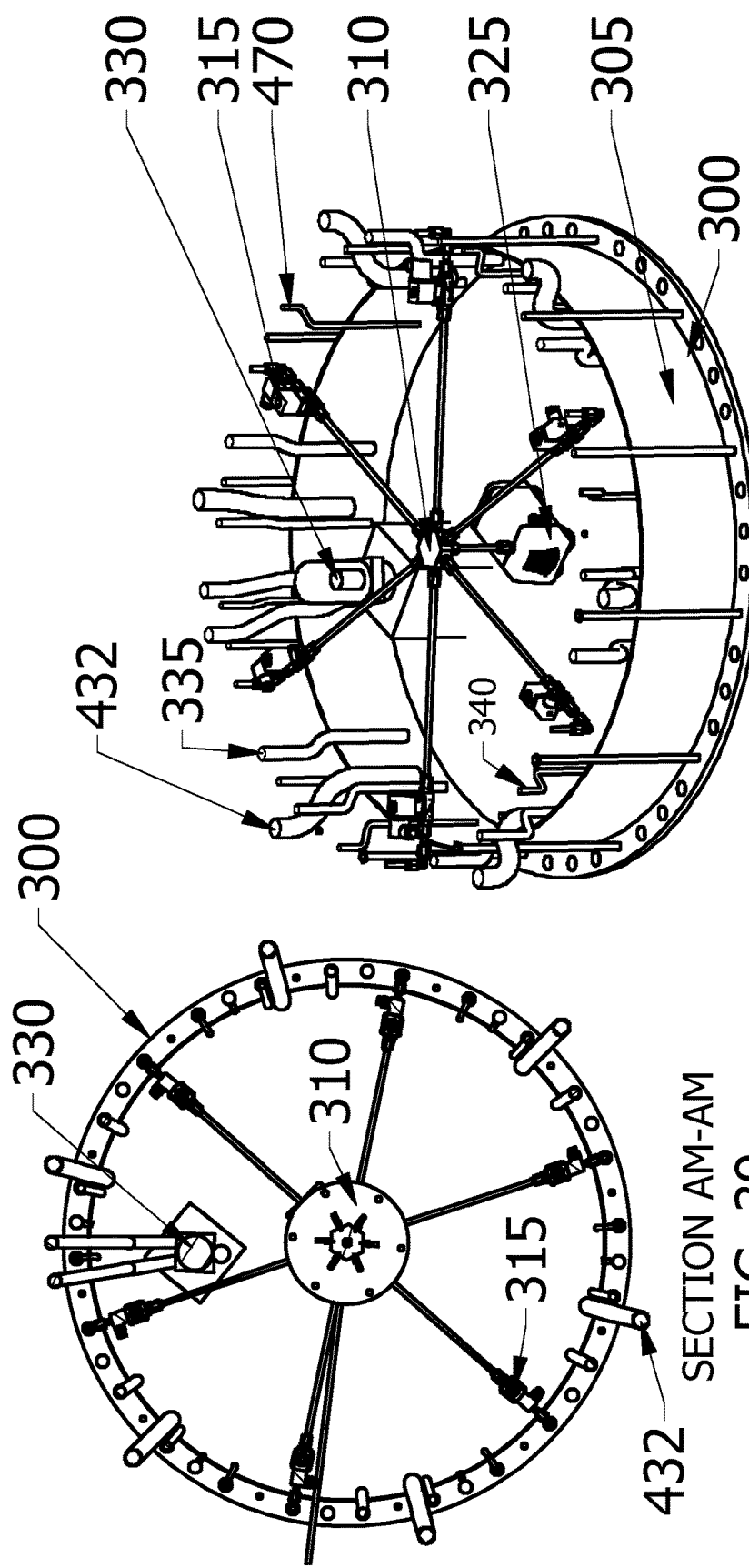

Hydraulic Assembly

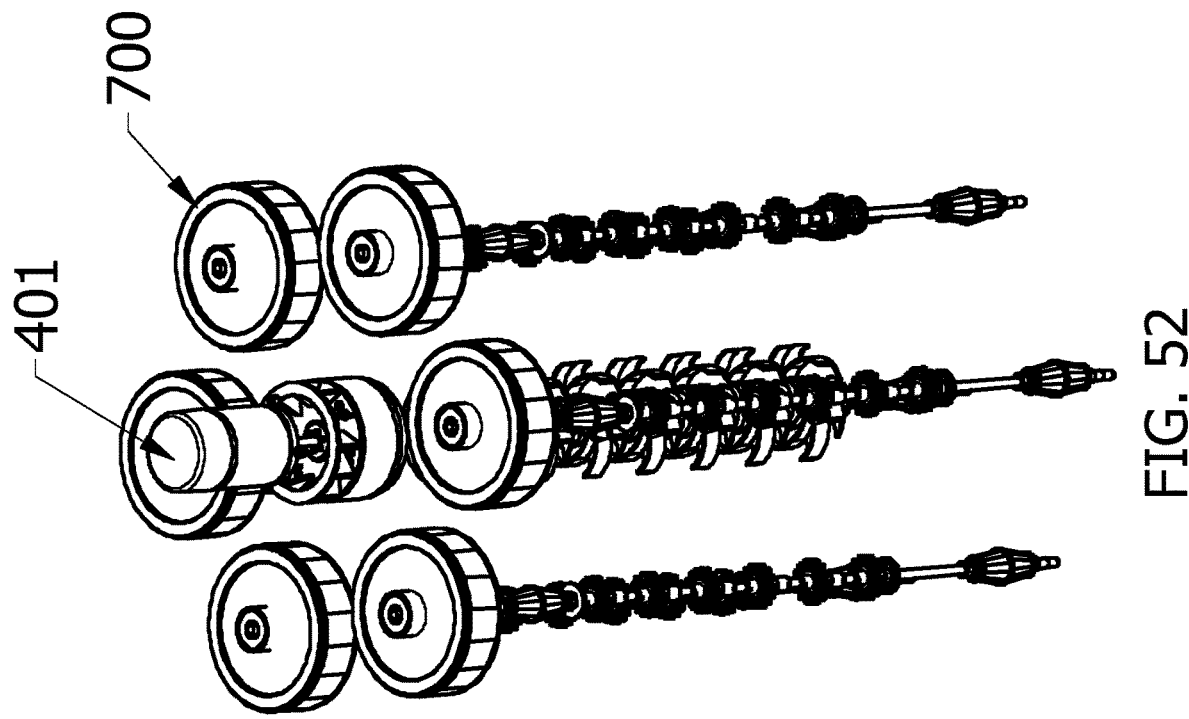
FIG. 52
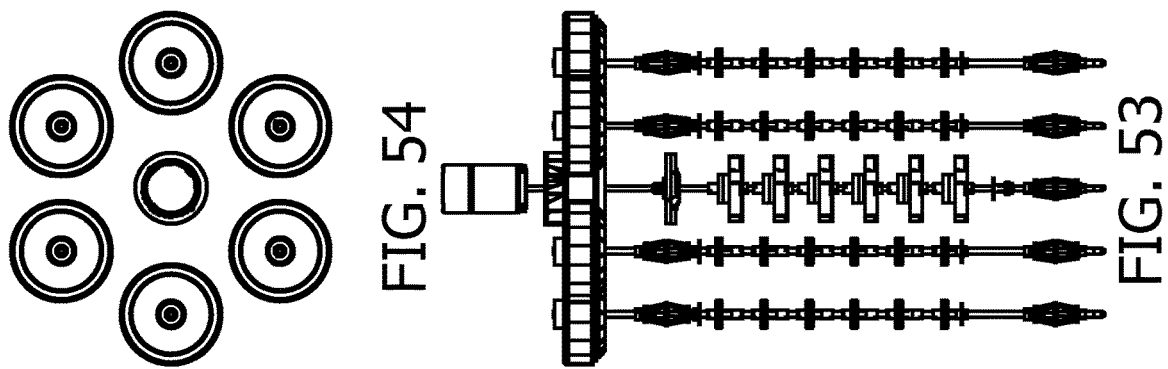
FIG. 54
FIG. 53

SECTION C-C

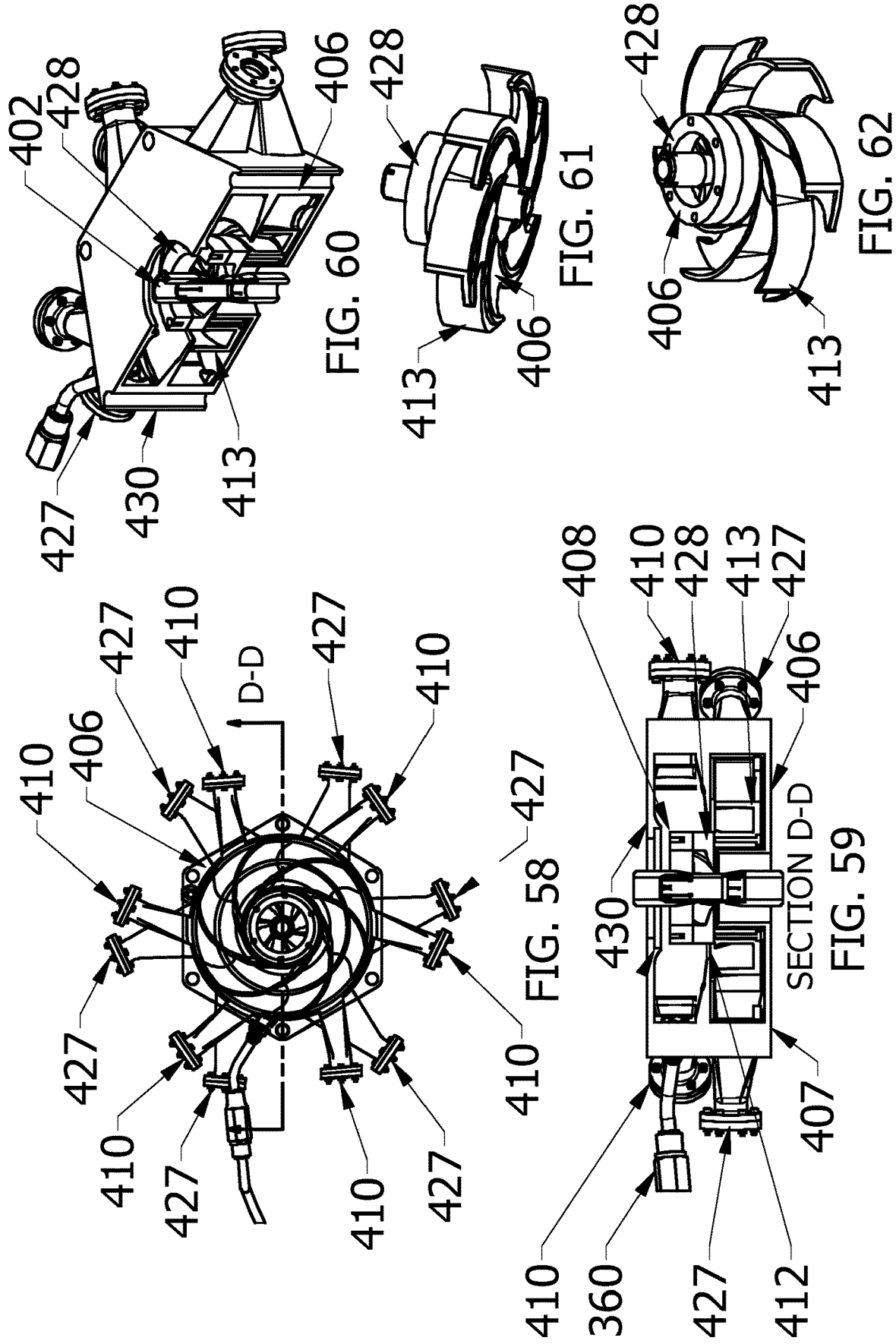

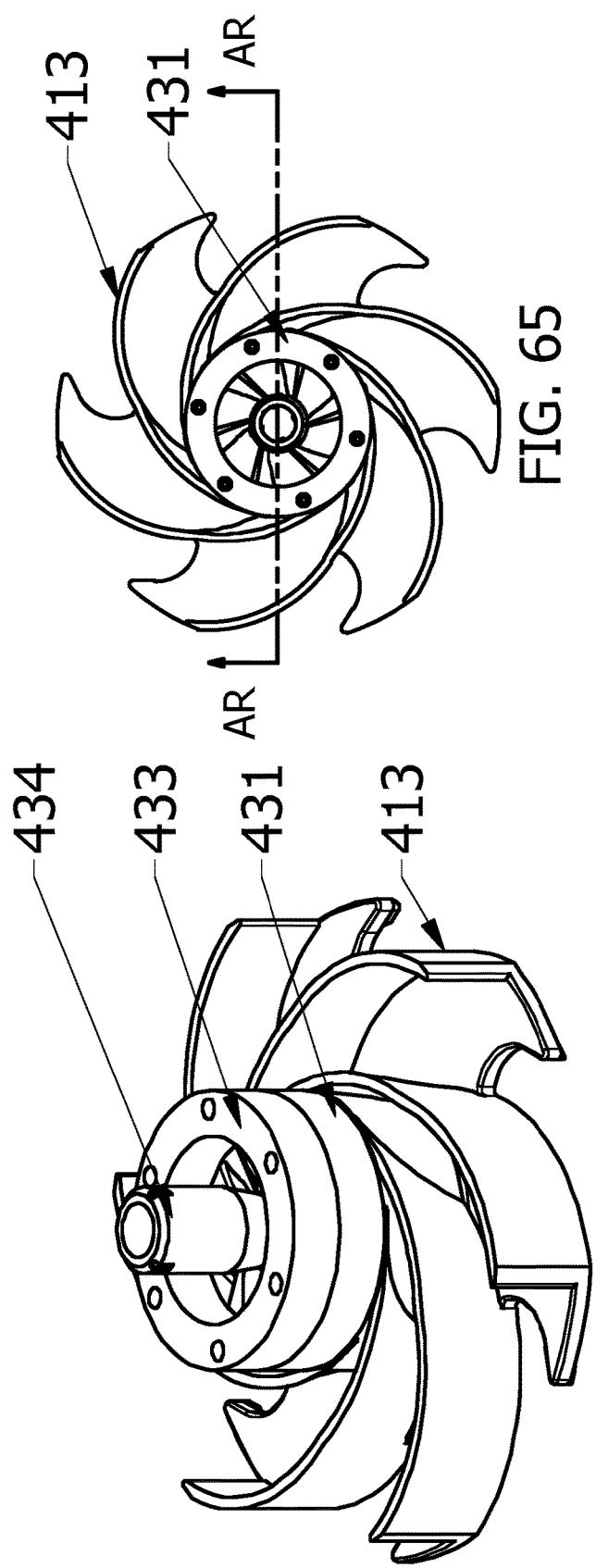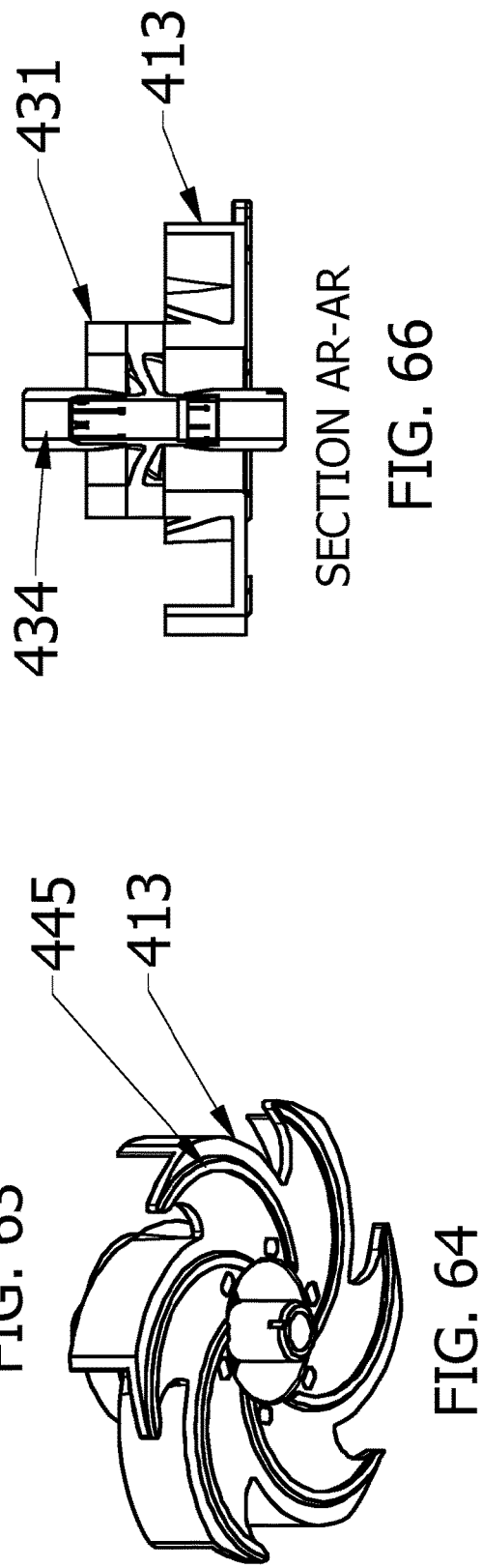

DETAIL H

DETAIL Z

Turbine Rotational Assembly

DETAIL M

DETAIL P

SECTION T-T

SECTION R-R

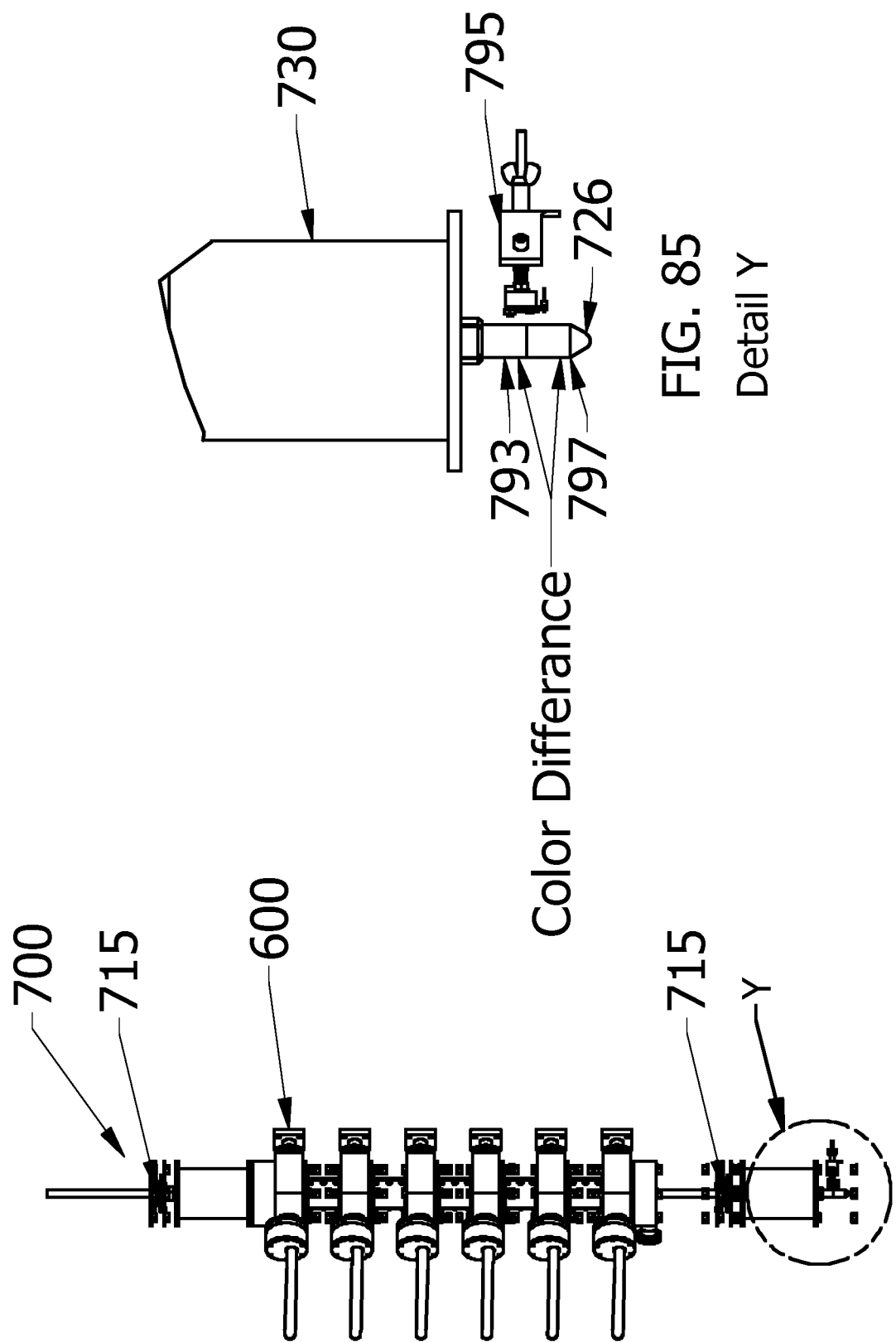

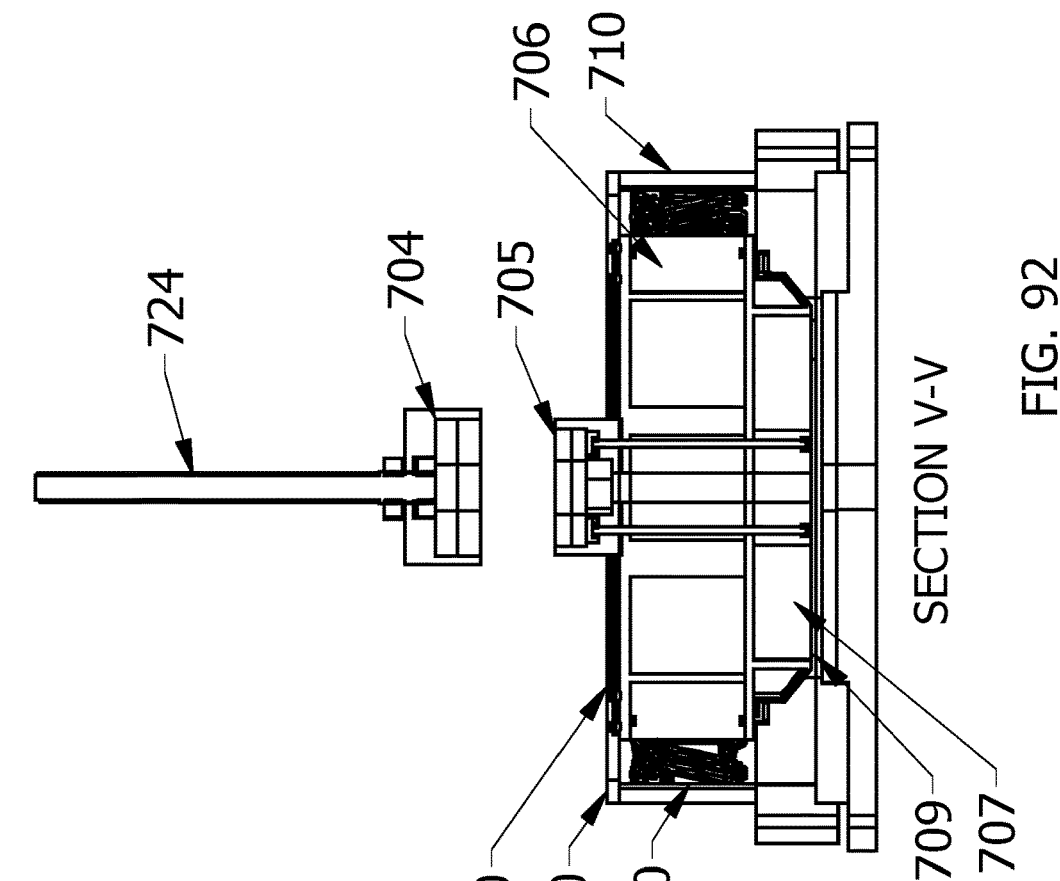
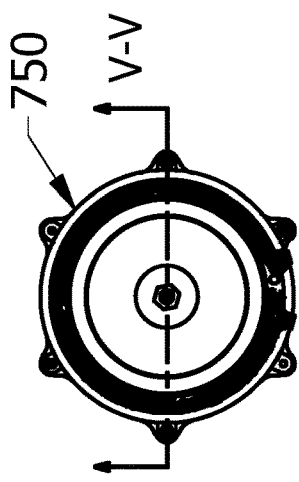
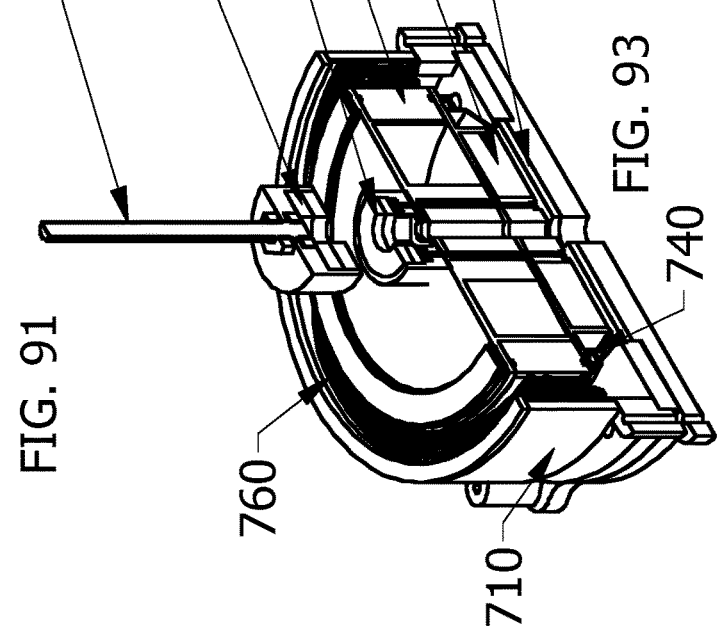
FIG. 91
FIG. 92
FIG. 93

SECTION AD

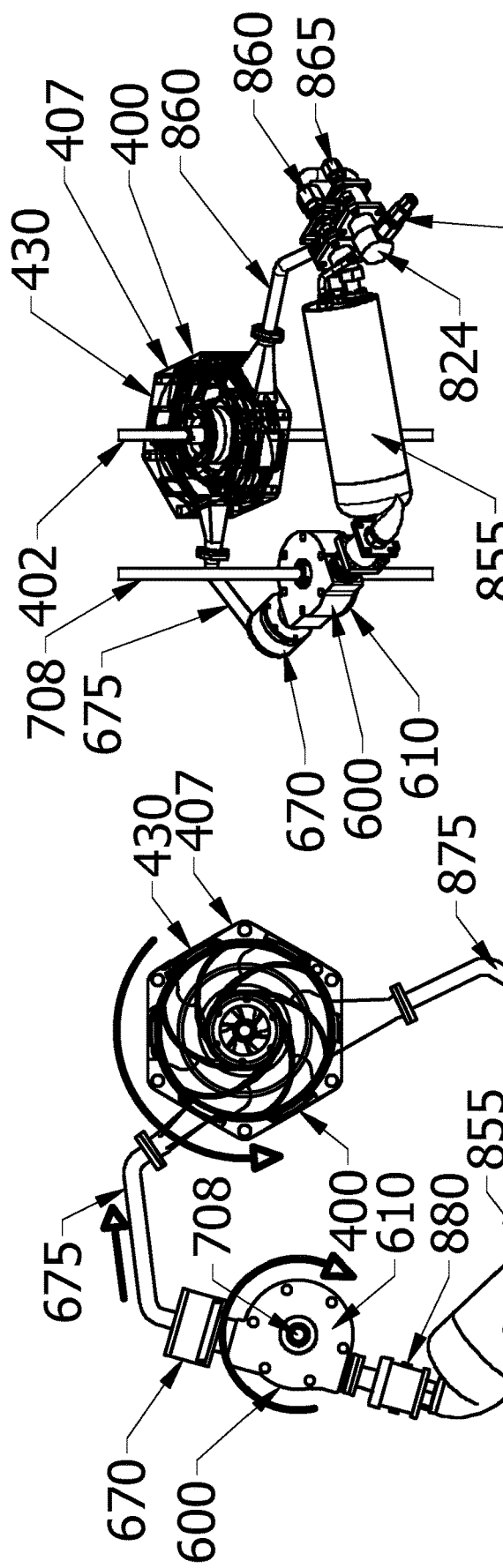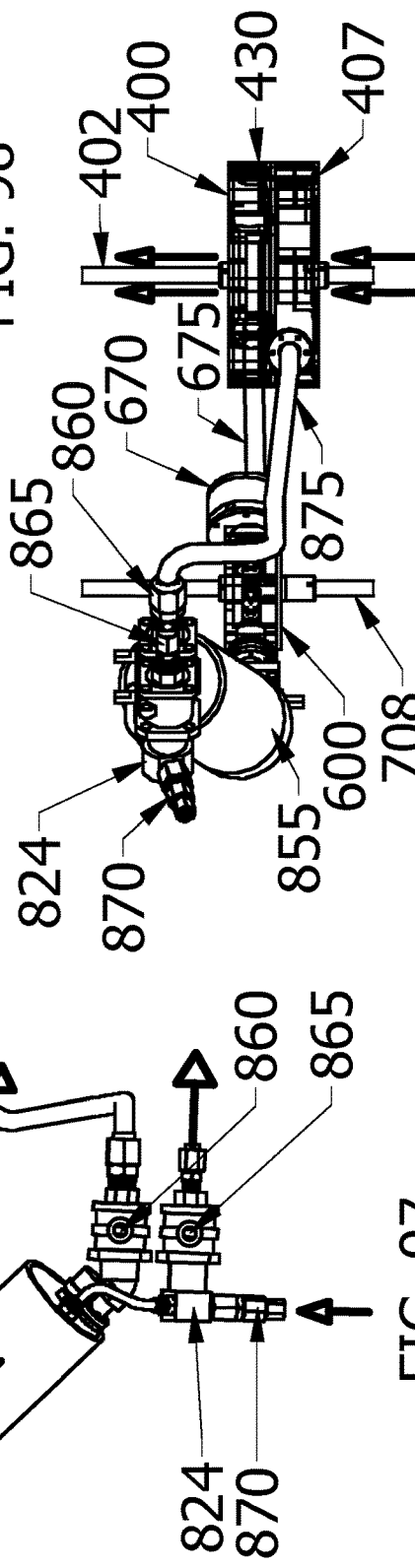

SECTION AJ-AJ

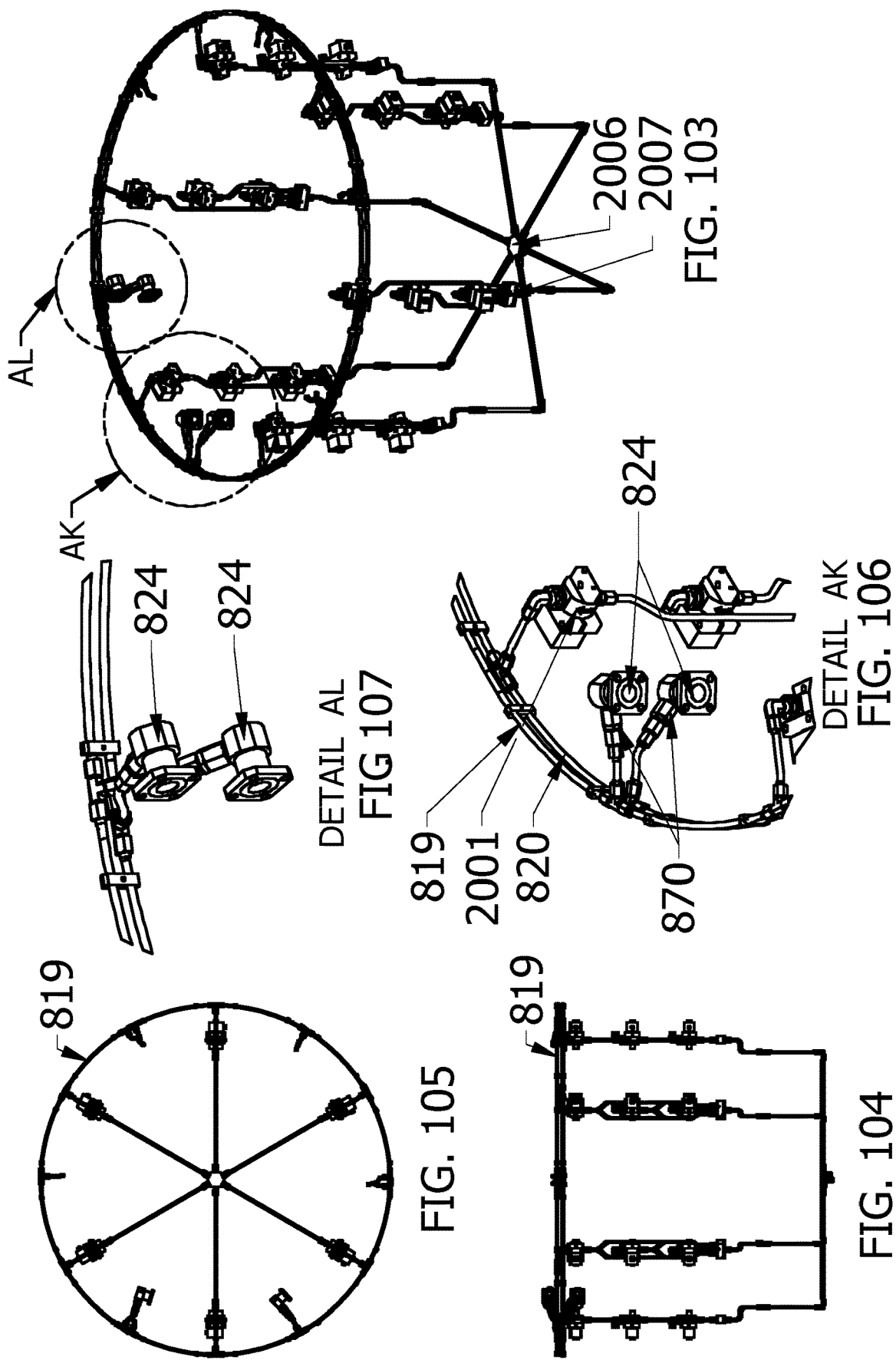

SECTION A7-A7

SECTION RR-RR

DETAIL NN

DETAIL GG

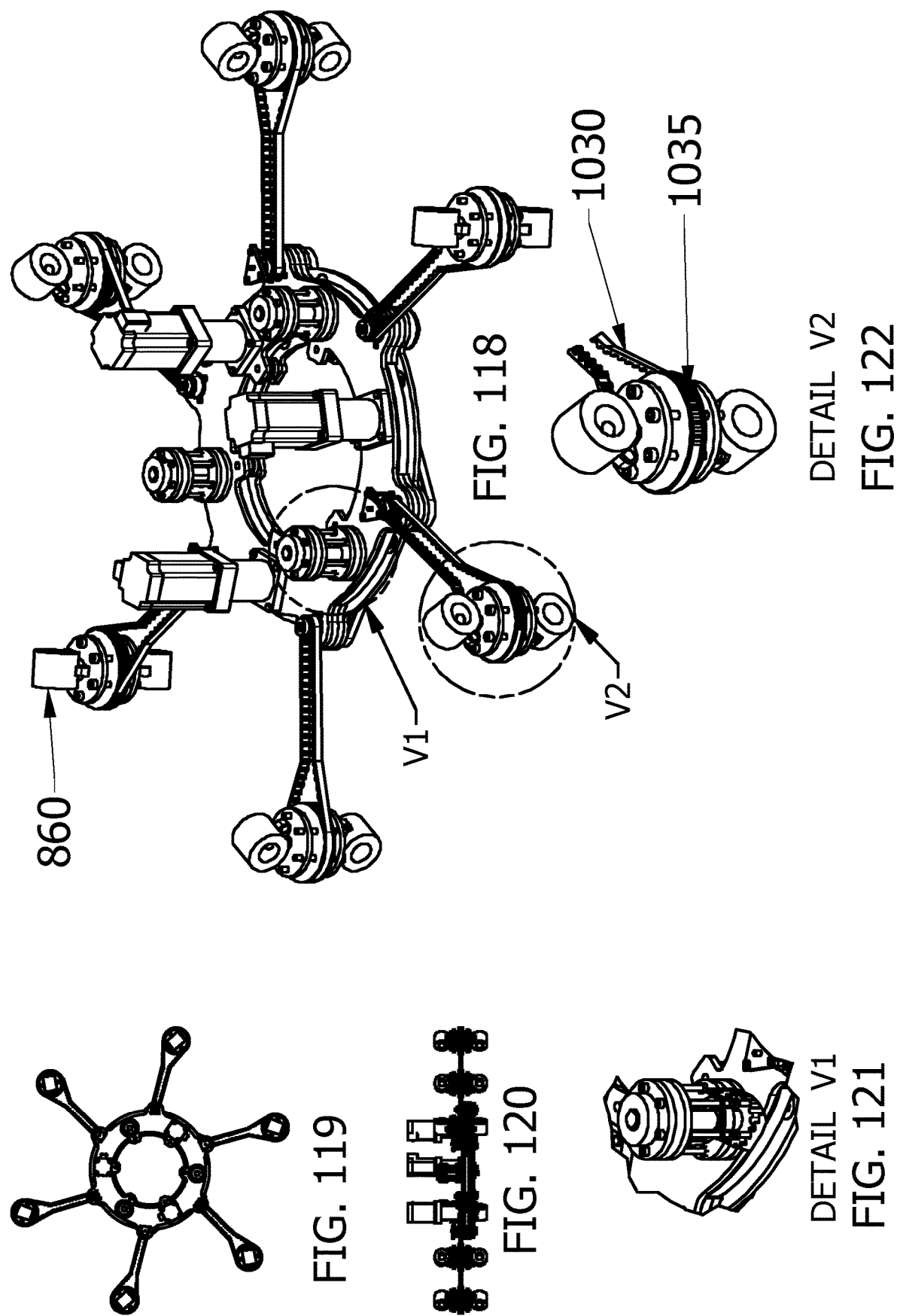

Two & Four Valve Actuator Assemblies

DETAIL BG

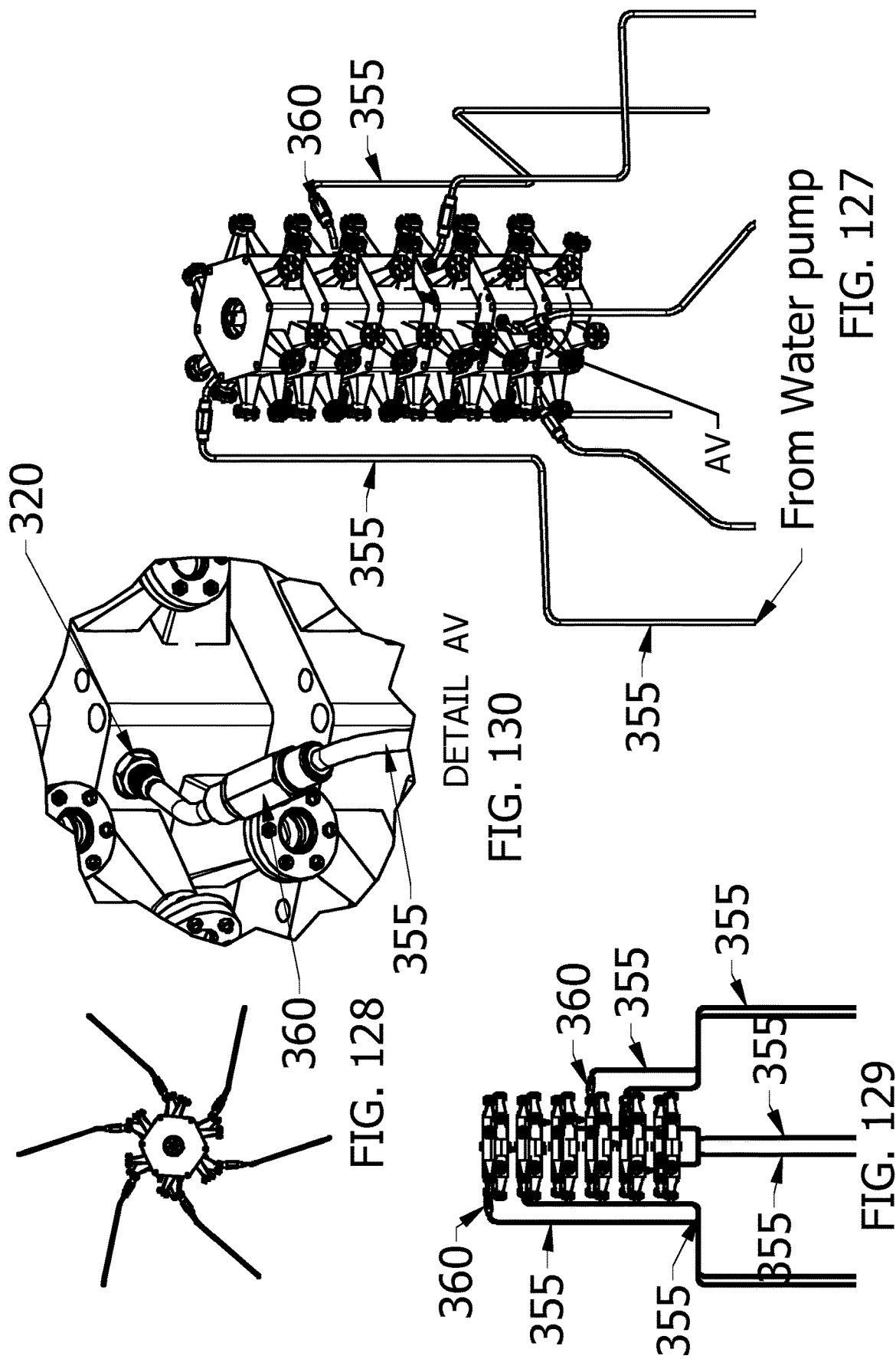

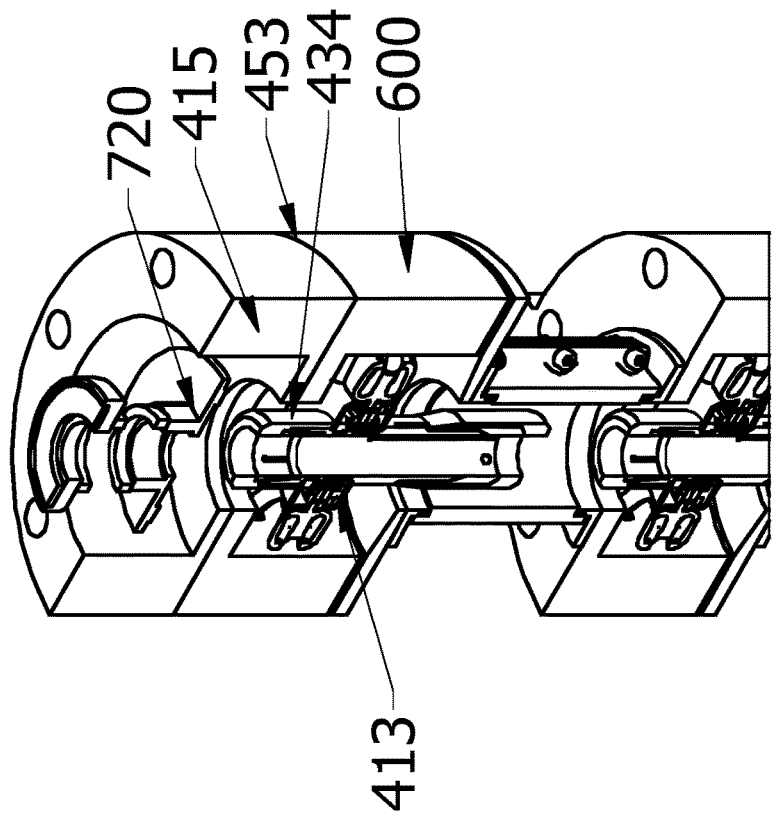
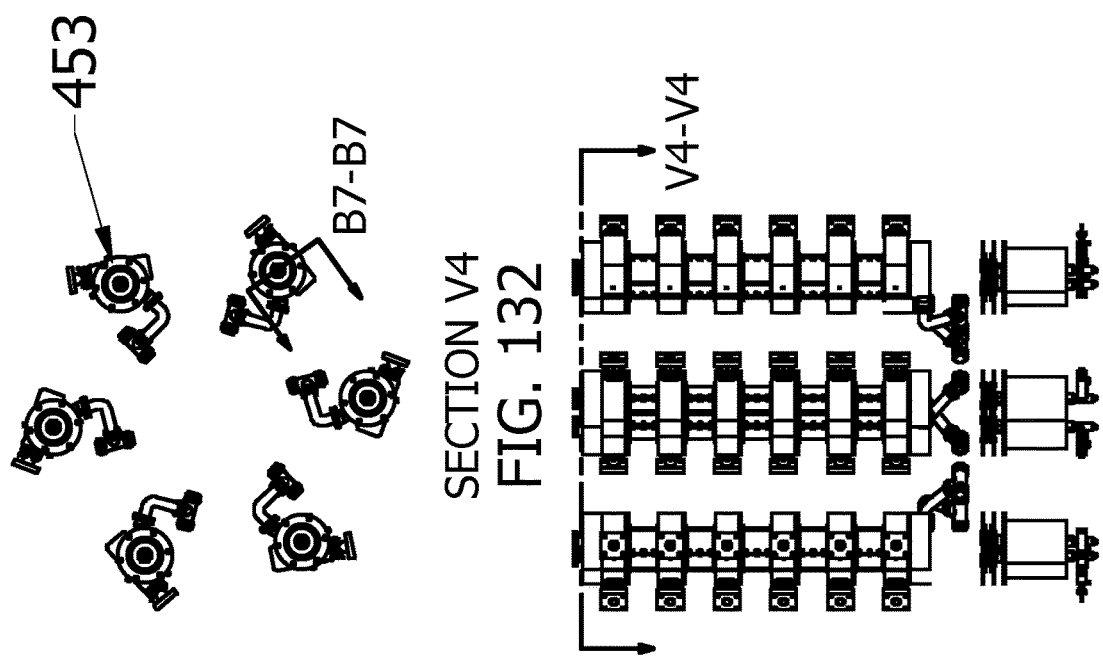
SECTION B7-B7
FIG. 133
SECTION V4
FIG. 132
FIG. 131

ELECTROMAGNETIC TURBINE AND FLUID RECIRCULATION SYSTEM

CROSS-REFERENCE TO RELATED APPLICATION

This application claims benefit under 35 U.S.C. § 119(e) of U.S. Provisional Application having Ser. No. 63/006,459 filed Apr. 7, 2020, which is hereby incorporated by reference herein in its entirety.

FIELD

The subject disclosure relates to turbines, and more particularly, to an electromagnetic turbine and fluid recirculation system.

BACKGROUND

The field of turbines includes fluid circulation systems designed for different purposes. In some systems, fluids are kept separated while they are circulated because of their different purposes. Generally, turbines generate electricity but suffer from many parasitic forces in the system as friction and other drag generates unwanted heat and inefficient output from the generating elements. The current driving techniques are also inefficient and may require a lot of wasted fuel to drive the generation.

Aspects of the subject disclosure address these issues.

SUMMARY

In one aspect of the disclosure, an electromagnetic turbine system is disclosed. The system comprises: a plurality of first conduit lines for a compressed gas; a plurality of second conduit lines for a liquid; a plurality of pressure chambers connected to the first conduit line and to the second conduit line, wherein the pressure chambers are configured to combine the compressed gas with the liquid into pressurized fluid; a plurality of electromagnetic turbine modules, wherein each electromagnetic turbine module includes a turbine impeller, a turbine shaft coupled to the turbine impeller, an electromagnetic turbine generator coupled to the turbine shaft, and wherein each pressure chamber is in fluid communication with respective turbine impellers of respective electromagnetic turbine modules for driving respective turbine impellers with the pressurized fluid to turn respective turbine shafts and generate power from respective electromagnetic turbine generators, and wherein the pressurized fluid is expelled from respective turbine impellers; a centrifuge coupled to a fluid outlet from each of the electromagnetic turbine modules, wherein the centrifuge is configured to: collect the pressurized fluid expelled from respective turbine impellers, separate the compressed gas from the liquid; route the compressed gas away from the liquid, and route the liquid out of the centrifuge; and an outlet conduit connected to the centrifuge, wherein the liquid is routed back to the second conduit lines.

In another aspect of the disclosure, an electromagnetic turbine is disclosed. The electromagnetic turbine, comprises: a turbine impeller; a turbine shaft coupled to the turbine impeller; an electromagnetic turbine generator coupled to the turbine shaft, wherein the electromagnetic turbine generator comprises: a rotor and stator assembly; a cylindrical set of magnets under the rotor, and a conductive platform positioned below the cylindrical set of magnets, wherein a rotation of the turbine shaft generates a repelling force between the cylindrical set of magnets and the conductive platform; and a pressurized fluid source in fluid communication with the turbine impeller configured to drive the turbine impeller, the turbine shaft, and the electromagnetic turbine generator to generate an electrical output.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5 is a cross-sectional view taken along the line A-A of FIG. 3.

FIG. 6 is an enlarged partial view of a valve in the circle C in FIG. 5.

FIG. 7 is a cross-sectional view taken along the line B-B of FIG. 3.

FIG. 8 is an enlarged partial view of the circle D in FIG. 8.

FIG. 14 is a cross-sectional view taken along the line A5-A5 of FIG. 4.

FIG. 15 is an enlarged partial view of the circle K in FIG. 14.

FIG. 20 is a cross-sectional view taken along the line A1-A1 of FIG. 4.

FIG. 21 is an enlarged partial view of the circle AB in FIG. 20.

FIG. 22 is an elevation view of a turbine impeller assembly in accordance with an embodiment.

FIG. 23 is a cross-sectional view taken along the line AF-AF of FIG. 22.

FIG. 33 is a side view of a fluid separator module with catchment and drainage components, removed from the rest of the turbine system of FIG. 1 in accordance with an embodiment.

FIG. 34 is an enlarged sectional view of the box AH of FIG. 33.

FIG. 35 is an enlarged view of the circle AJ of FIG. 34.

FIG. 36 is a top view of the separator module of FIG. 33.

FIG. 37 is an enlarged view of the circle AK of FIG. 33.

FIG. 38 is a perspective top view of a reservoir assembly in accordance with an embodiment.

FIG. 39 is a cross-sectional view taken along the line AM-AM of FIG. 2.

FIG. 40 is a side view of the assembly of FIG. 38.

FIG. 52 is a top perspective view of the turbine modules of FIG. 45 and including a fluid rotational module in accordance with an embodiment.

FIG. 53 is a side view of the turbine modules and fluid rotational module of FIG. 52.

FIG. 54 is a top view of the turbine modules and fluid rotational module of FIG. 52.

FIG. 58 is a top view of a fluid separator module in accordance with an embodiment.

FIG. 59 is an enlarged cross-sectional view taken along the line D-D of FIG. 58.

FIG. 60 is a front perspective view of the module of FIG. 59.

FIG. 61 is a bottom perspective view of the module of the separator device in FIG. 58 outside of a casing.

FIG. 62 is a top perspective view of the device of FIG. 61.

FIG. 63 is an enlarged detail view of the device of FIG. 62.

FIG. 64 is a shrunken bottom perspective view of the device of FIG. 63.

FIG. 65 is a bottom view of the device of FIG. 63.

FIG. 66 is a side view of the device of FIG. 63.

FIG. 84 is a side view of a turbine module extracted from the system of FIG. 1 in accordance with an embodiment.

FIG. 85 is an enlarged view of a vertical alignment sensor shown in the circle Y of FIG. 84.

FIG. 91 is a top view of a turbine rotor assembly is a perspective right side view in accordance with an embodiment.

FIG. 92 is a cross-sectional view taken along the line V-V of FIG. 91.

FIG. 93 is a top perspective view of the turbine rotor assembly of FIG. 92.

FIG. 97 is a top view of a fluid circuit in accordance with an embodiment.

FIG. 98 is a perspective view of the fluid circuit of FIG. 97.

FIG. 99 is a side view of the fluid circuit of FIG. 97.

FIG. 103 is a perspective top view of a compressed air manifold assembly in accordance with an embodiment.

FIG. 104 is a side view of the compressed air manifold assembly of FIG. 103.

FIG. 105 is a top view of the compressed air manifold assembly of FIG. 103.

FIG. 106 is a sectional view of the of the compressed air manifold assembly of FIG. 103 shown in circle AK.

FIG. 107 is a sectional view of the of the compressed air manifold assembly of FIG. 103 shown in circle AL.

FIG. 118C is a side view of the assemblies of FIG. 118A.

FIG. 119 is a top view of the valve actuator assembly of FIG. 118.

FIG. 120 is a side view of the valve actuator assembly of FIG. 118.

FIG. 121 is an enlarged partial view from the circle V1 of FIG. 118.

FIG. 122 is an enlarged view from the circle V2 of FIG. 118.

FIG. 123 is a front perspective view of a liquid collection assembly in accordance with an embodiment.

FIG. 124 is a top view of the liquid collection assembly of FIG. 123.

FIG. 125 is a side view of the liquid collection assembly of FIG. 123.

FIG. 126 is an enlarged view from the circle BG of FIG. 123.

FIG. 127 is a side perspective view of a liquid filling system in accordance with an embodiment.

FIG. 128 is a top view of the liquid filling system of FIG. 127.

FIG. 129 is a side view of the liquid filling system of FIG. 127.

FIG. 130 is an enlarged partial view from the circle AV of FIG. 127.

FIG. 131 is a side view of turbine modules with overspray casings and liquid catchment modules in accordance with an embodiment.

FIG. 132 is a top view of the turbine impellers and fluid circulation ports of FIG. 131.

FIG. 133 is an enlarged cross-sectional view taken along the line B7 of FIG. 131.

Figure 134:
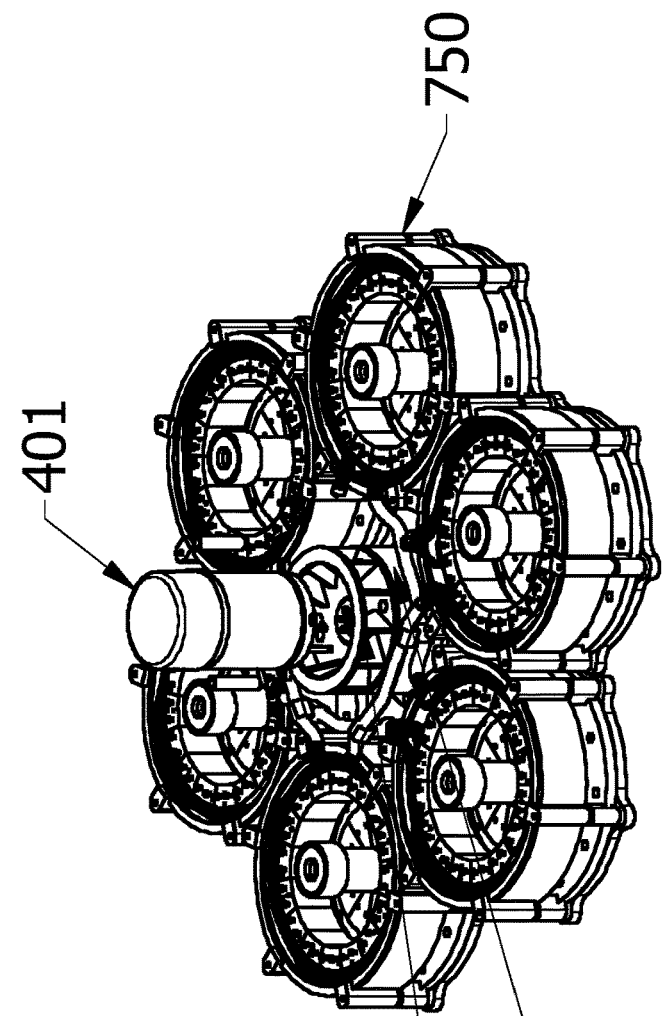

FIG. 134 is a top perspective view of a turbine generator assembly in accordance with an embodiment.

Figure 135:
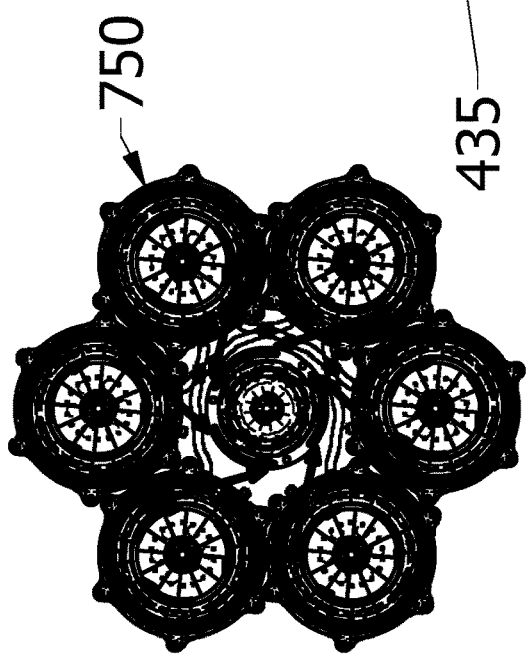

FIG. 135 is a top view of the turbine generator assembly of FIG. 134.

Figure 136:
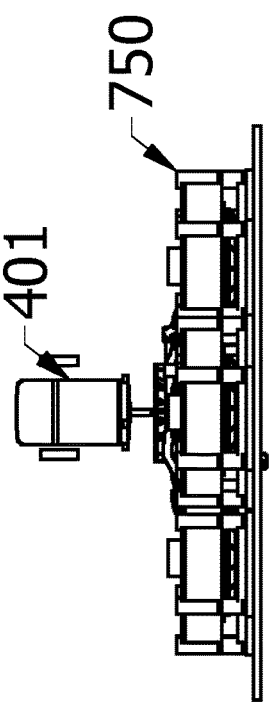

FIG. 136 is a side view of the turbine generator assembly of FIG. 134.

Figure 1:
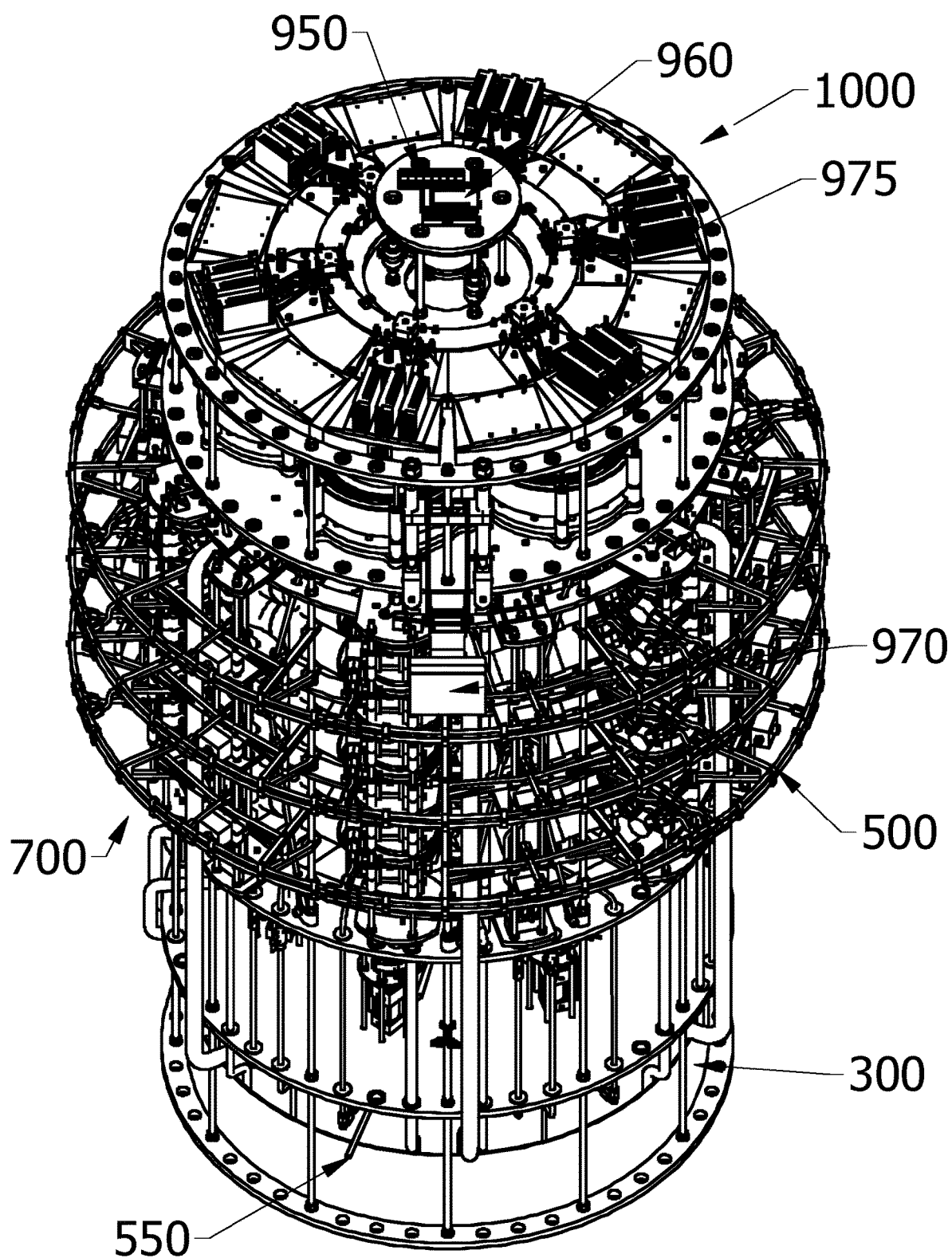
FIG. 1 is a top perspective view of an electromagnetic turbine system in accordance with an aspect of the subject technology.
Figure 2:
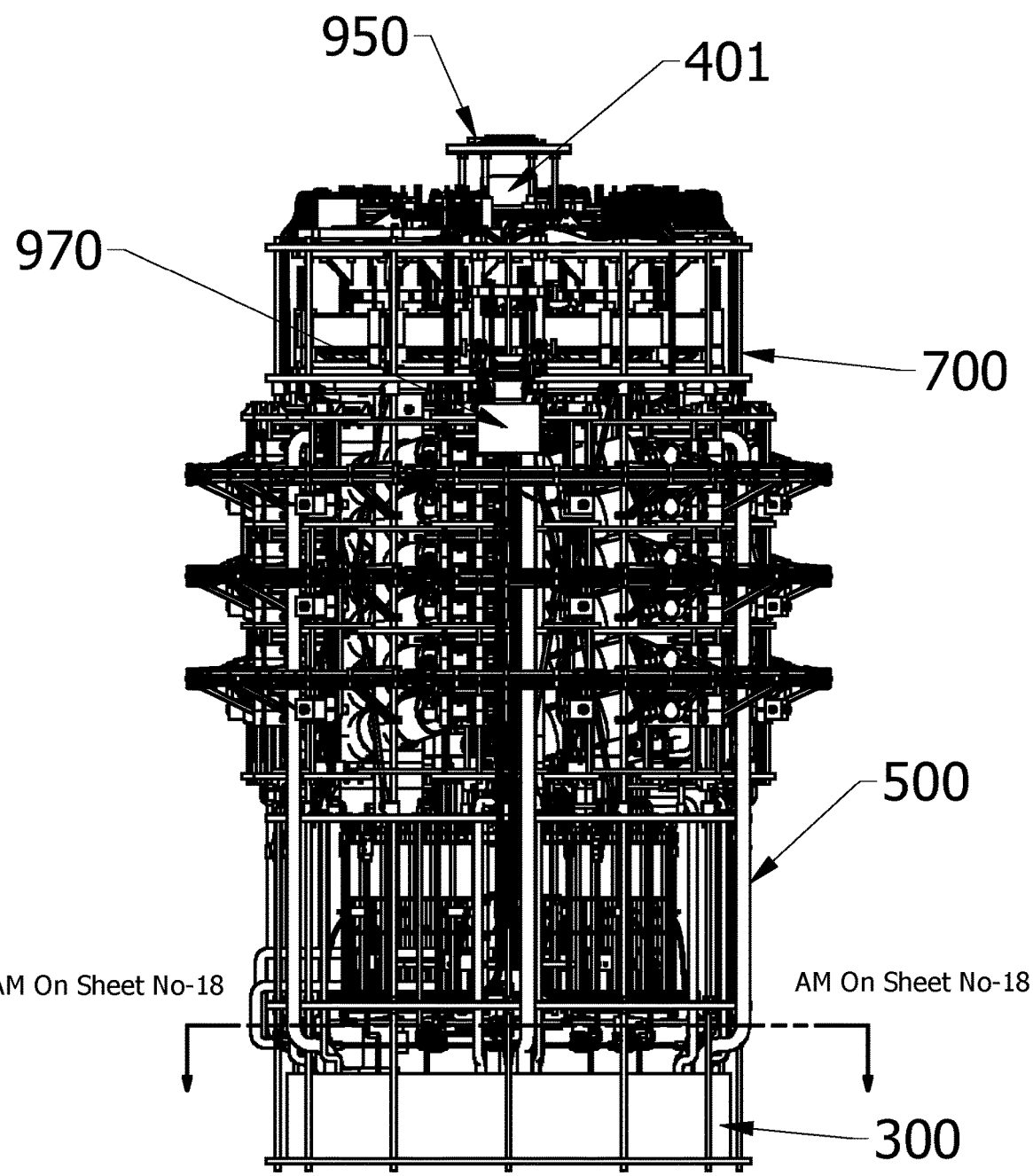
FIG. 2 is a side view of the system of FIG. 1.
Figure 3:
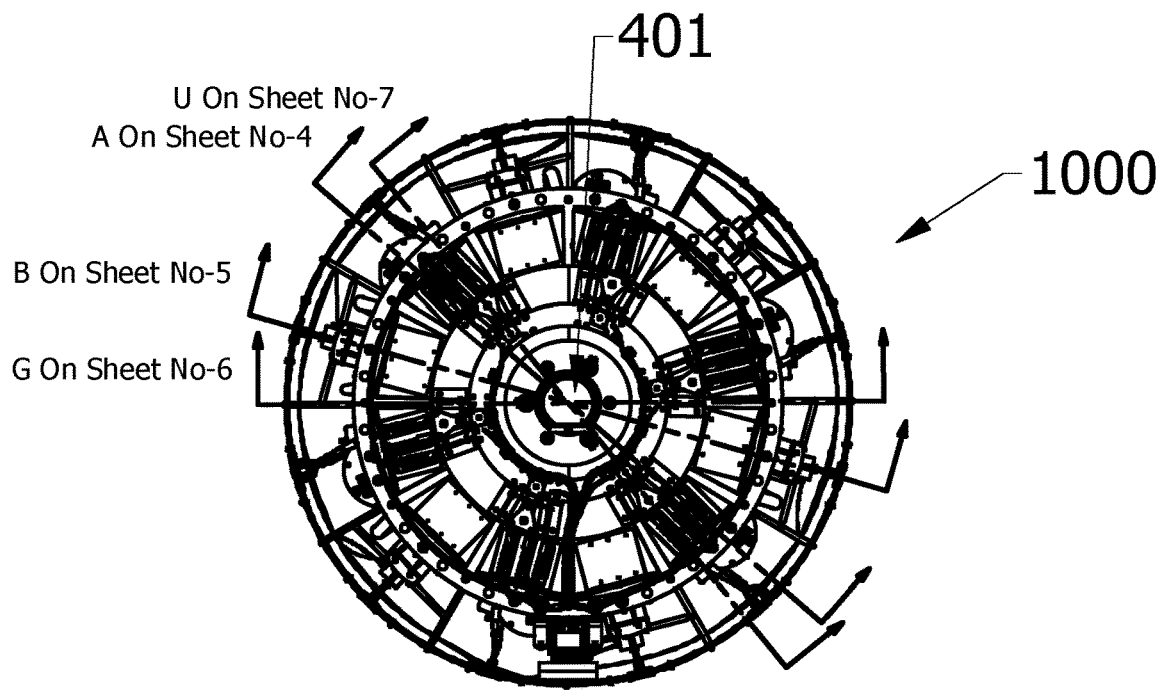
FIG. 3 is a top view of the system of FIG. 1.
Figure 4:
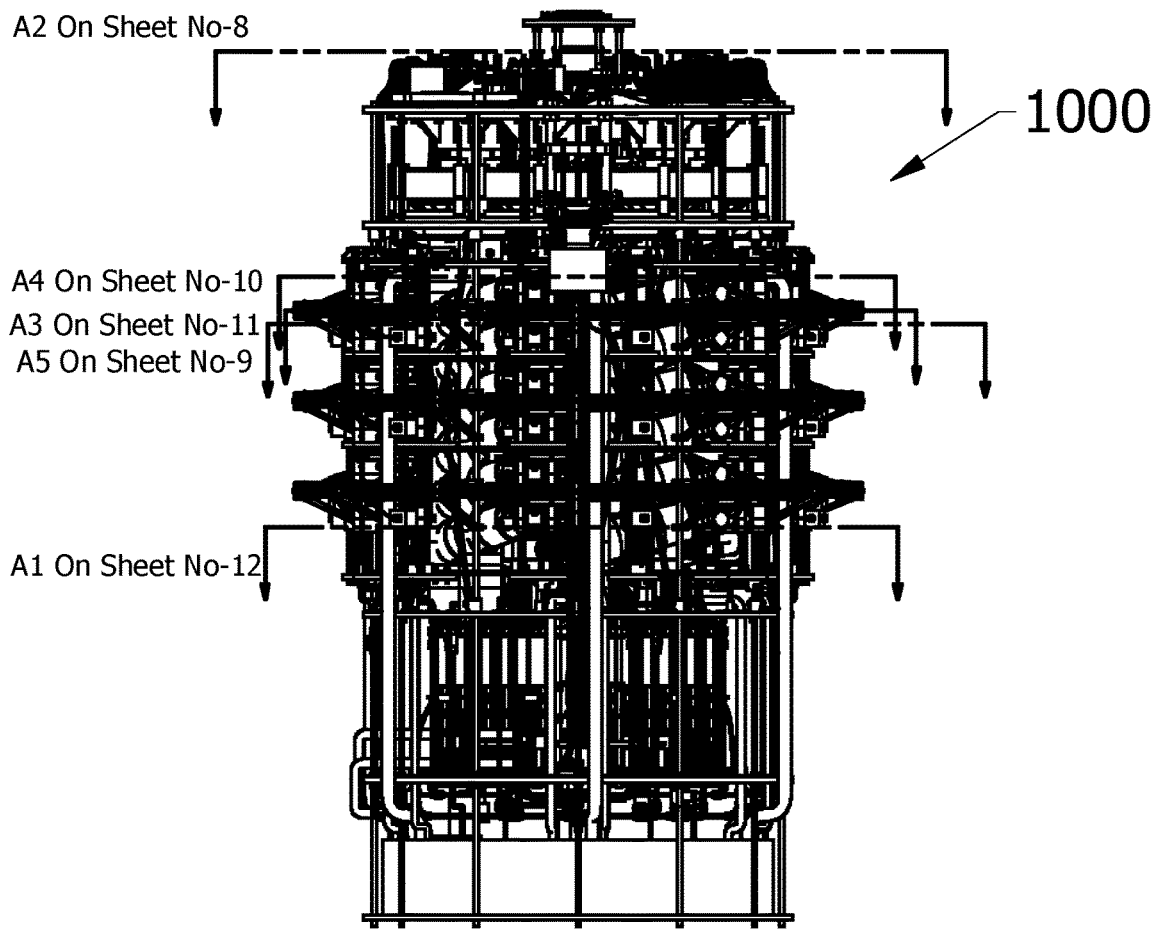
FIG. 4 is a side view of the system of FIG. 1.
Figure 10:
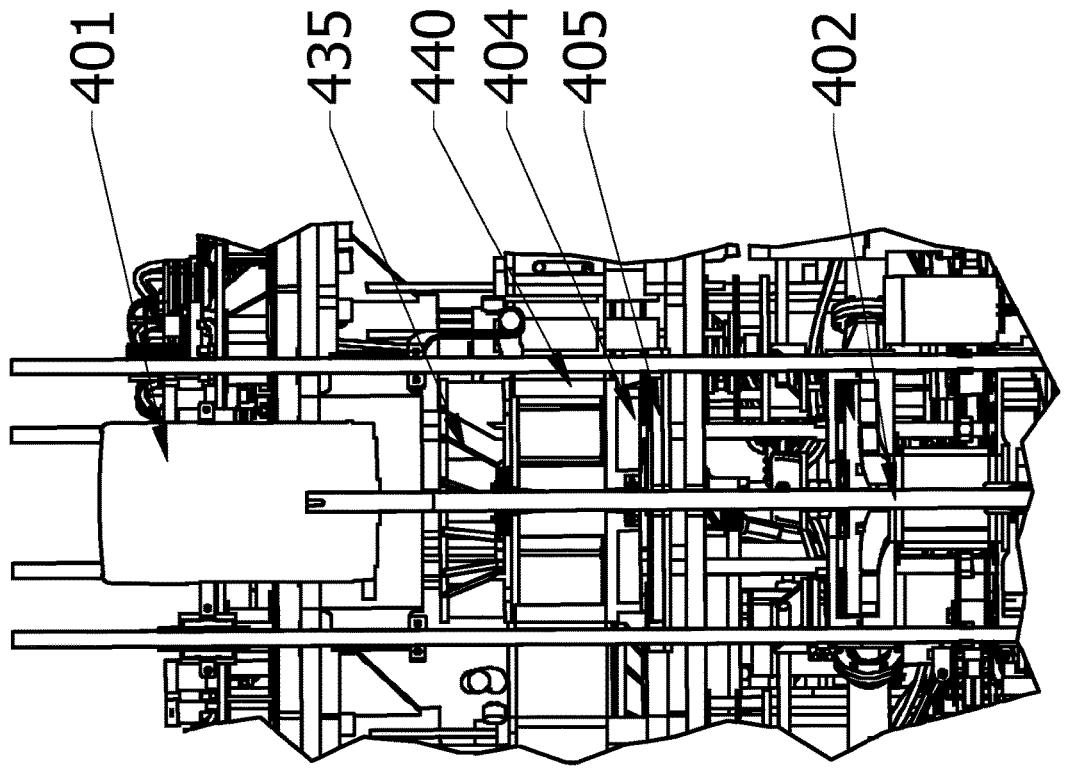
FIG. 10 is an enlarged partial view of the cross-section taken along the line H-H of FIG. 9.
Figure 9:
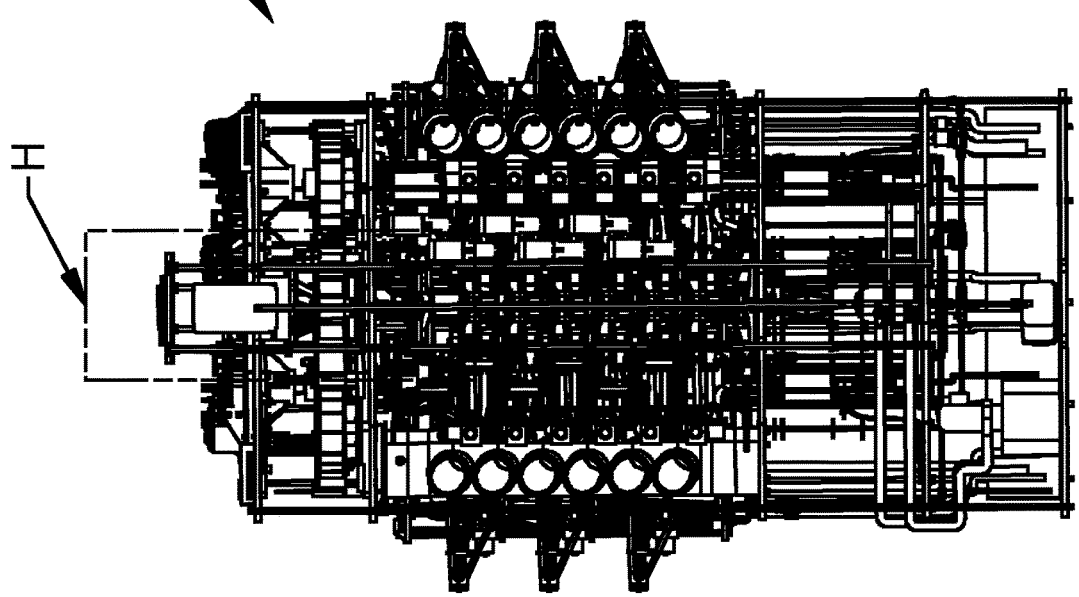
FIG. 9 is cross-sectional view taken along the line G-G of FIG. 3.
Figure 137:
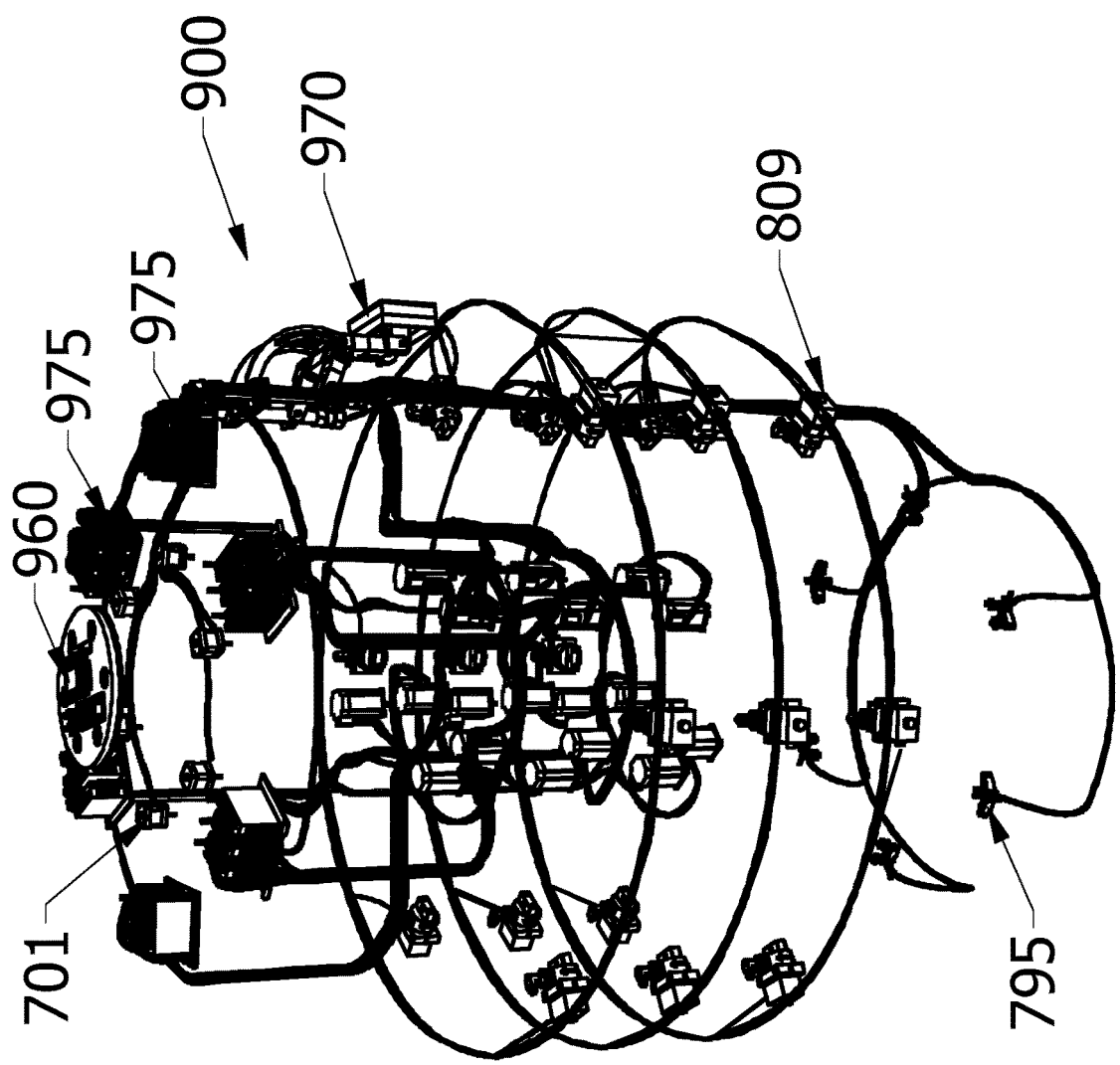

FIG. 137 is a front perspective view of an electrical wiring assembly for the system of FIG. 1 in accordance with an embodiment.

Figure 138:
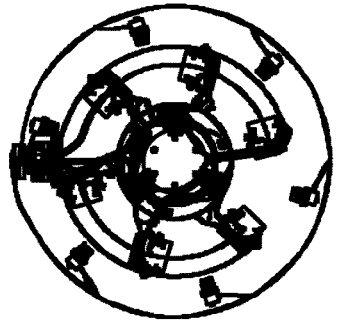

FIG. 138 is a top view of the electrical wiring assembly of FIG. 137.

Figure 139:
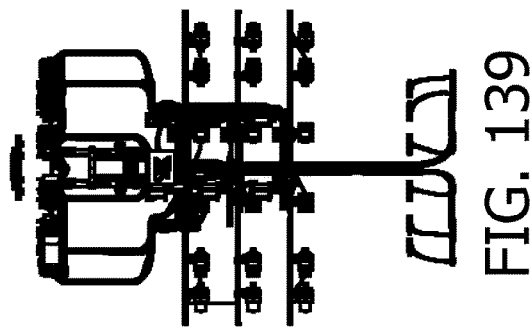

FIG. 139 is a side view of the electrical wiring assembly of FIG. 137.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, and referring to the Figures, exemplary embodiments of the subject technology provide an electromagnetic turbine system 1000 (sometimes referred to as the "turbine system 1000"), which generates power with improved efficiency. Referring to FIGS. 1-4, the turbine system 1000 can be seen according to an exemplary embodiment. The turbine system 1000 may generally include one or more electromagnetic turbine modules 700 and a fluid circulation system 500. The extent of the electromagnetic turbine modules 700 and fluid circulation system 500 may not be readily visible in FIGS. 1-4 because of the complexity of parts shown. So, it should be understood that the reference numbers 500 and 700 in FIGS. 1-4 point only to a point on each of the systems 500 and 700. The following disclosure and remaining figures will attempt to break down an exemplary arrangement of the parts that comprise the turbine system 1000, including the electromagnetic turbine modules 700 and fluid circulation system 500. Due to the complexity and number of parts that comprise the turbine system 1000, discussion of various aspects may be taken out of order from the order of the drawings. In addition, since the major subsystems of the turbine system 1000 are coupled together, there may be some redundancy or repetition in the discussion of figures that show elements in common between subsystems.

In some embodiments, the fluid circulation system may be adapted based on the number of turbine modules 700 present in any one embodiment. However, generally speaking, the fluid circulation system 500 may provide a fluid impetus to drive a turbine module(s) 700, separate the fluid into constituent gas and liquid components, and recirculate one or more of the fluid components to drive a turbine module 700 again or to use in another part of the turbine system 1000. In the exemplary embodiment shown, the turbine system 1000 includes six turbine modules 700. Accordingly, the description will disclose a fluid circulation system 500 that may likewise include six fluid sources for driving respective turbine modules 700. However, as will be understood, other embodiments may have as little as a single turbine module 700 which may need only a single fluid source arrangement. Likewise, embodiments with additional turbine modules 700 may include additional fluid sources driving the turbine modules 700. In addition, while the embodiments described below comprise a one-to-one relationship between a turbine module 700 and a fluid source, other embodiments may be modified so that the respective turbine modules 700 may be driven by a fluid source in common or by shared fluid sources.

Turbine Modules

Figure 44:
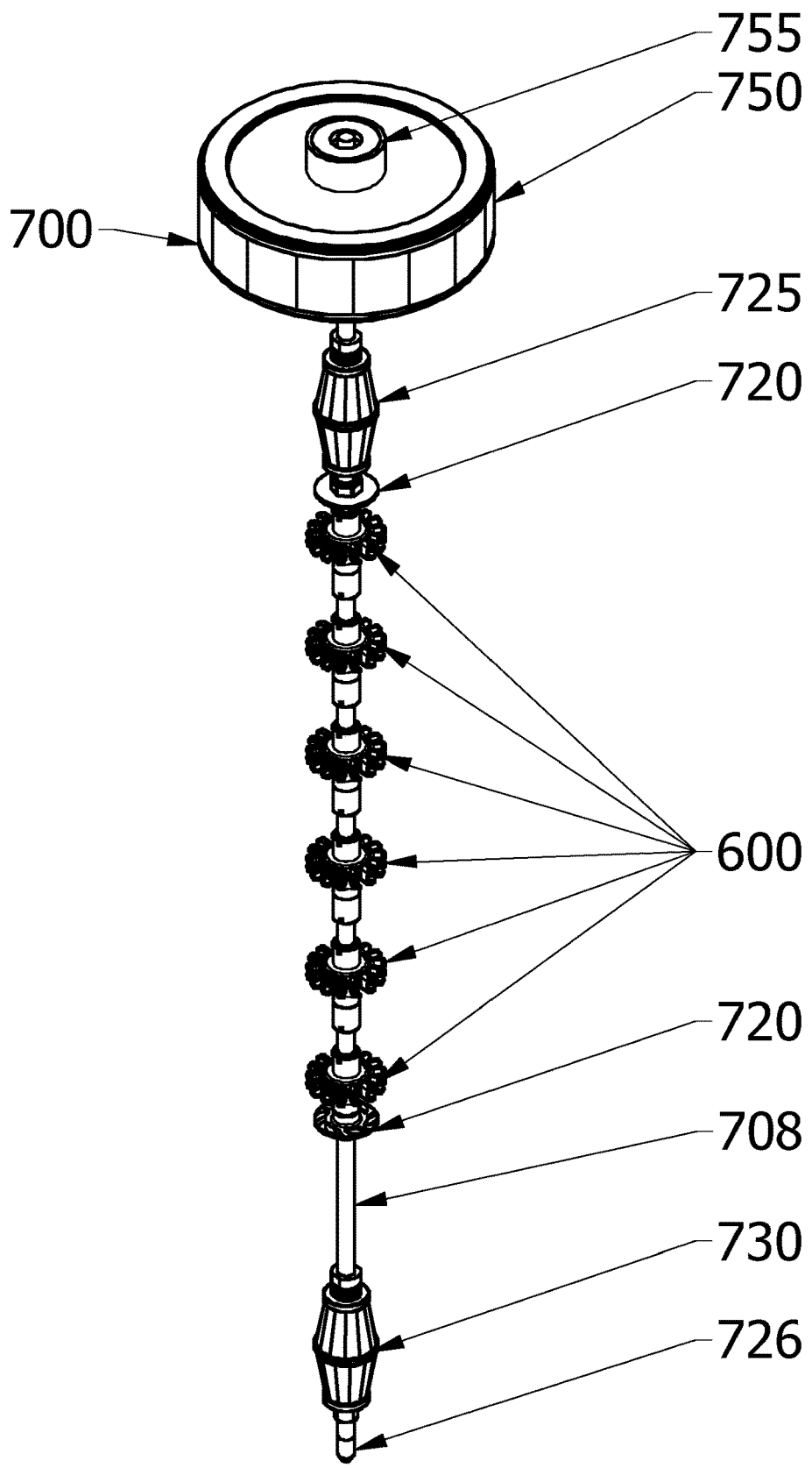
FIG. 44 is a front perspective view of a turbine module in accordance with an embodiment.
Figure 45:
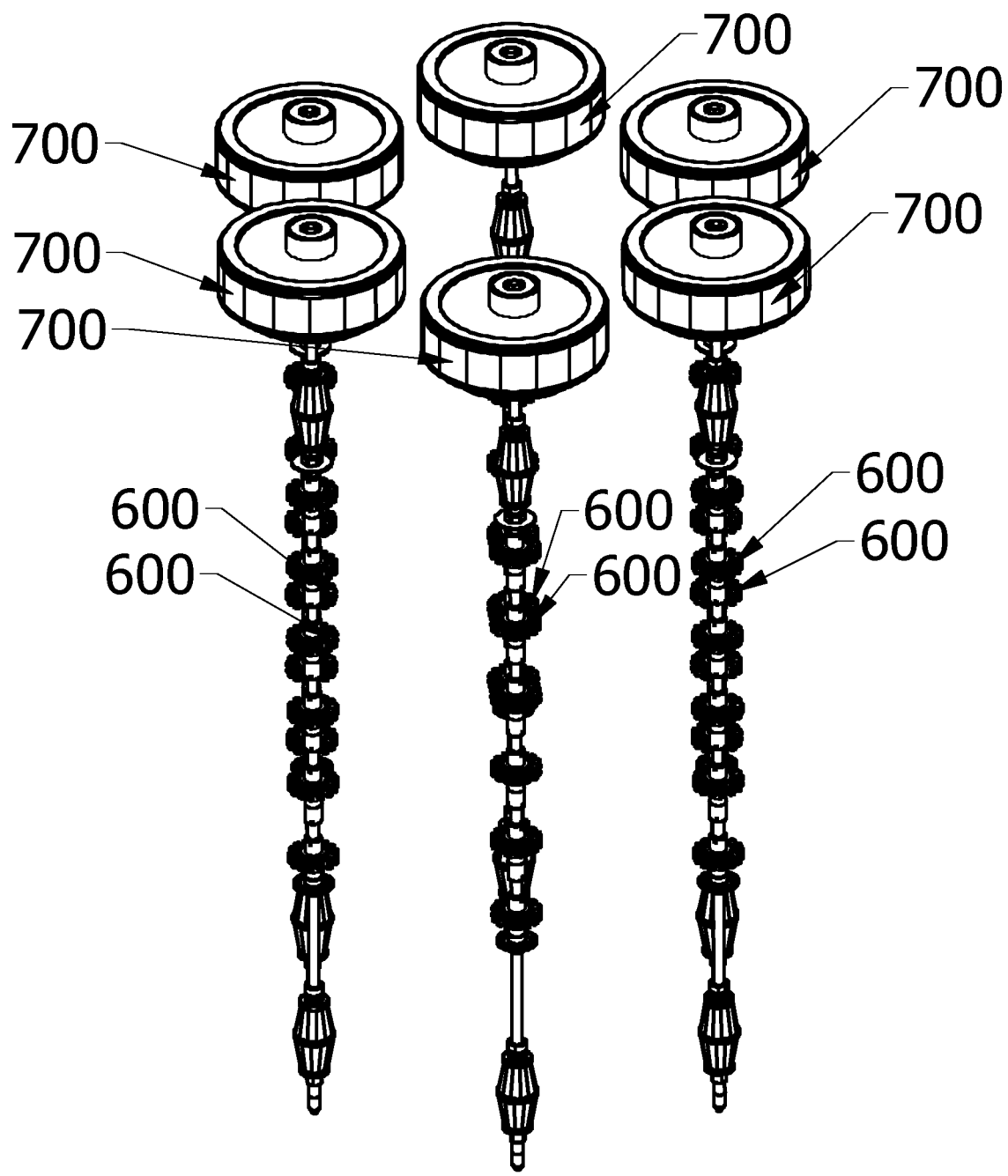
FIG. 45 is a front perspective view of a plurality of turbine modules extracted from the system of FIG. 1.
Figure 46:
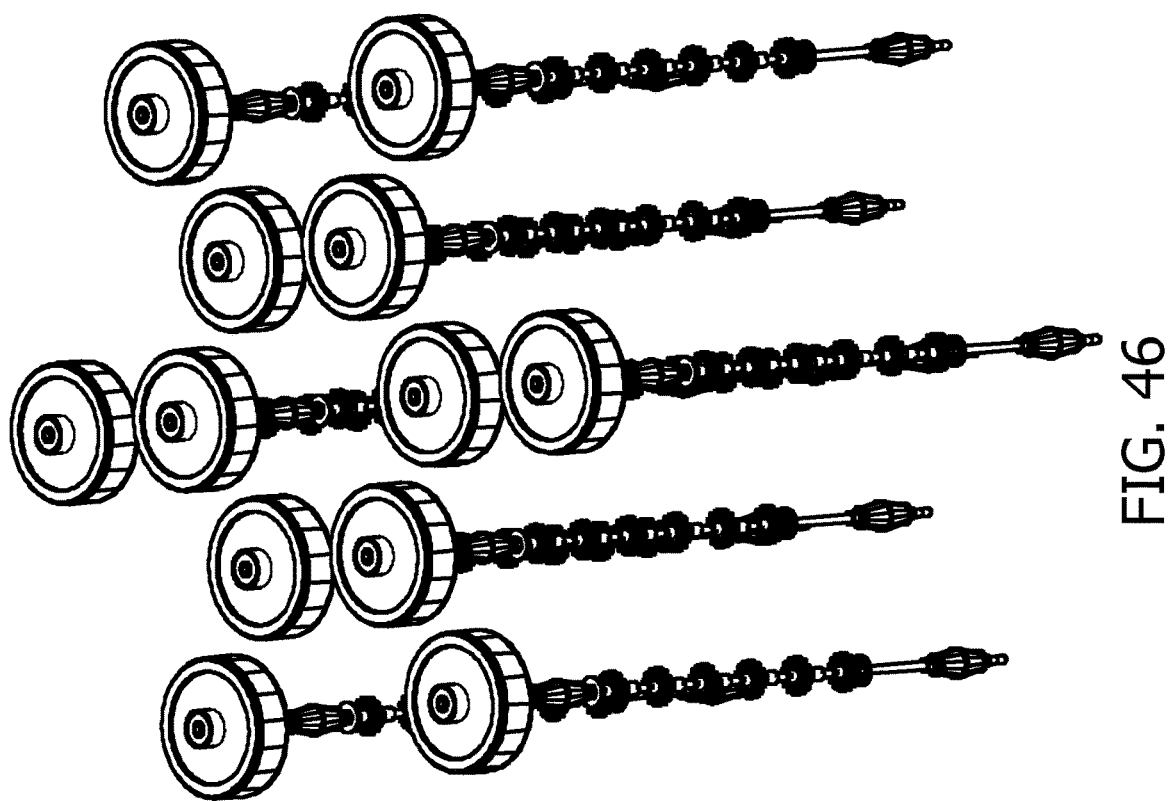
FIG. 46 is a top perspective view of a plurality of turbine modules in accordance with another embodiment.
Figure 48:
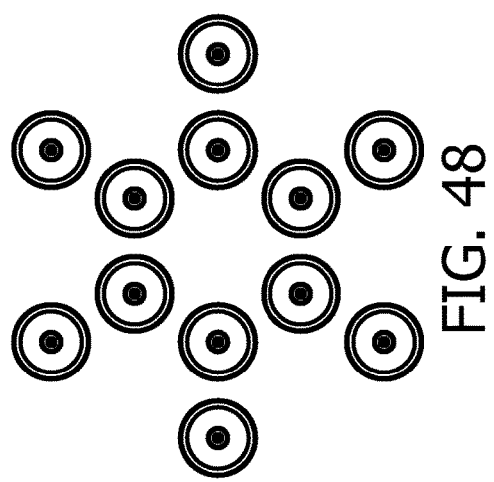
FIG. 48 is a top view of the modules of FIG. 46.
Figure 47:
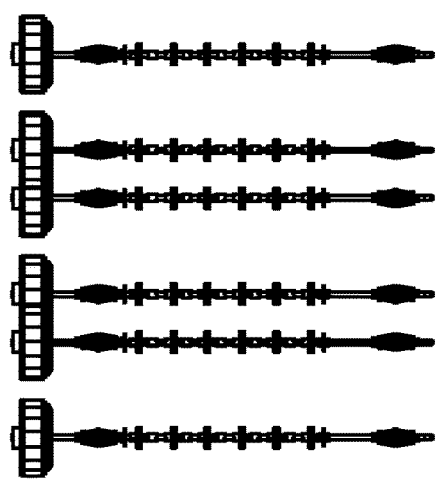
FIG. 47 is a side view of the modules of FIG. 46.
Figure 49:
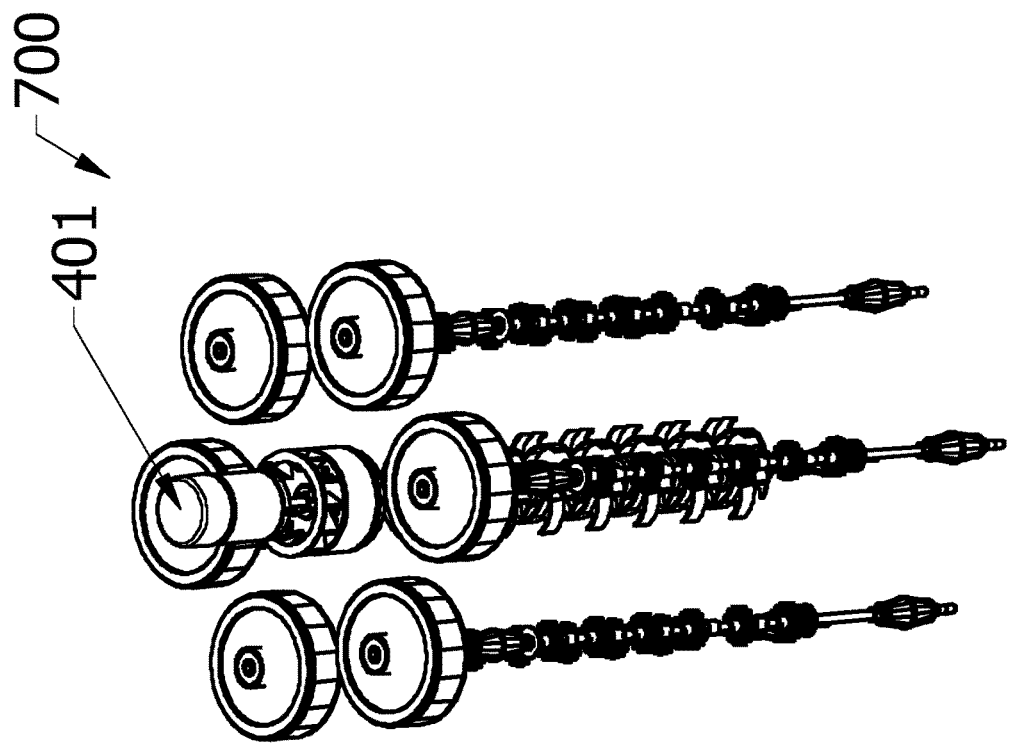
FIG. 49 is a top perspective view of the turbine modules of FIG. 46 and including a fluid rotational module in accordance with an embodiment.
Figure 51:
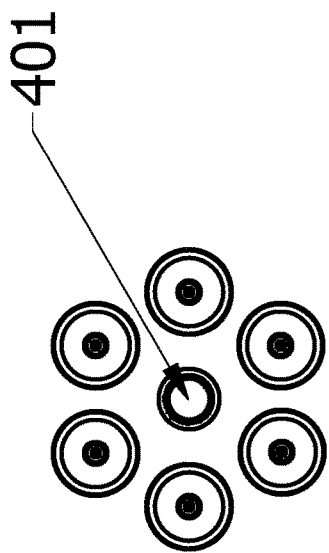
FIG. 51 is a top view of the turbine modules and fluid rotational module of FIG. 49.
Figure 50:
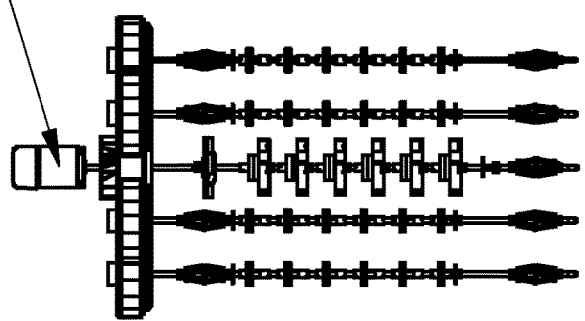
FIG. 50 is a side view of the turbine modules and fluid rotational module of FIG. 49.
Figure 57:
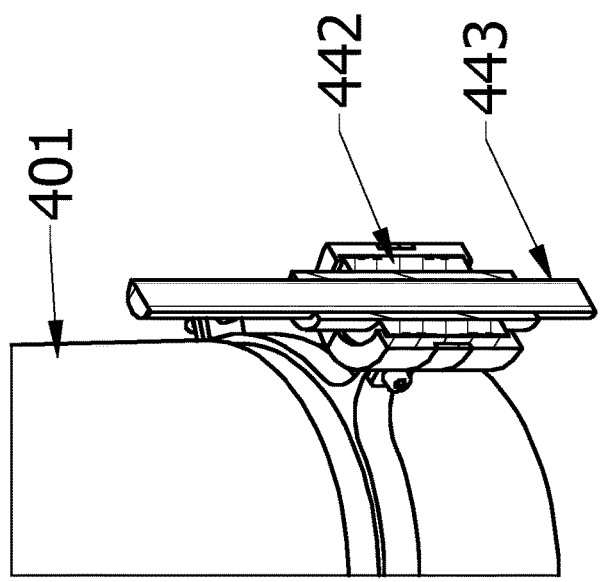
FIG. 57 is an enlarged partial perspective view of a liner bearing and support rod of FIG. 56.
Figure 56:
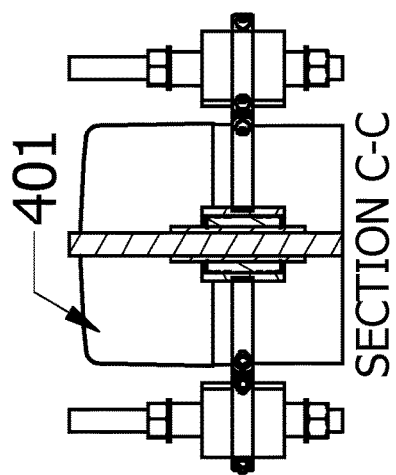
FIG. 56 is a cross-sectional view taken along the line C-C of FIG. 55.
Figure 55:
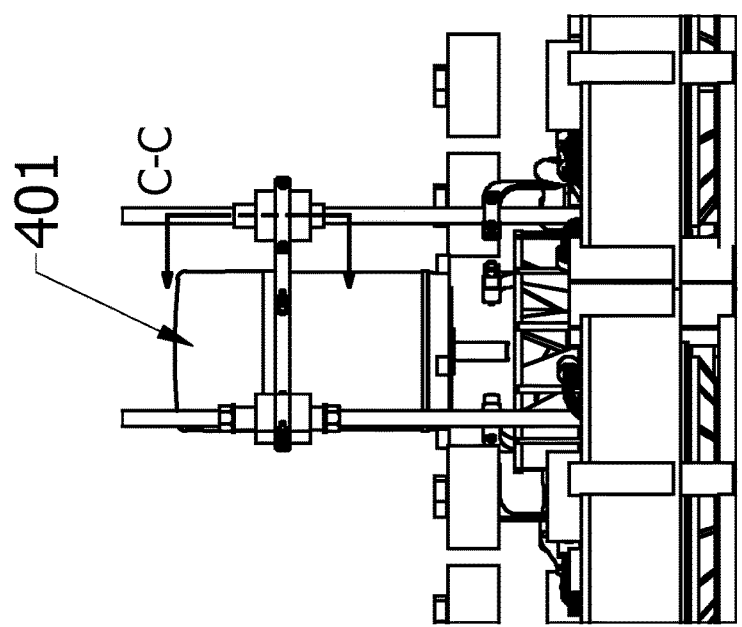
FIG. 55 is an elevation view of a floating motor assembly coupled to in accordance with an embodiment.
Figure 68:
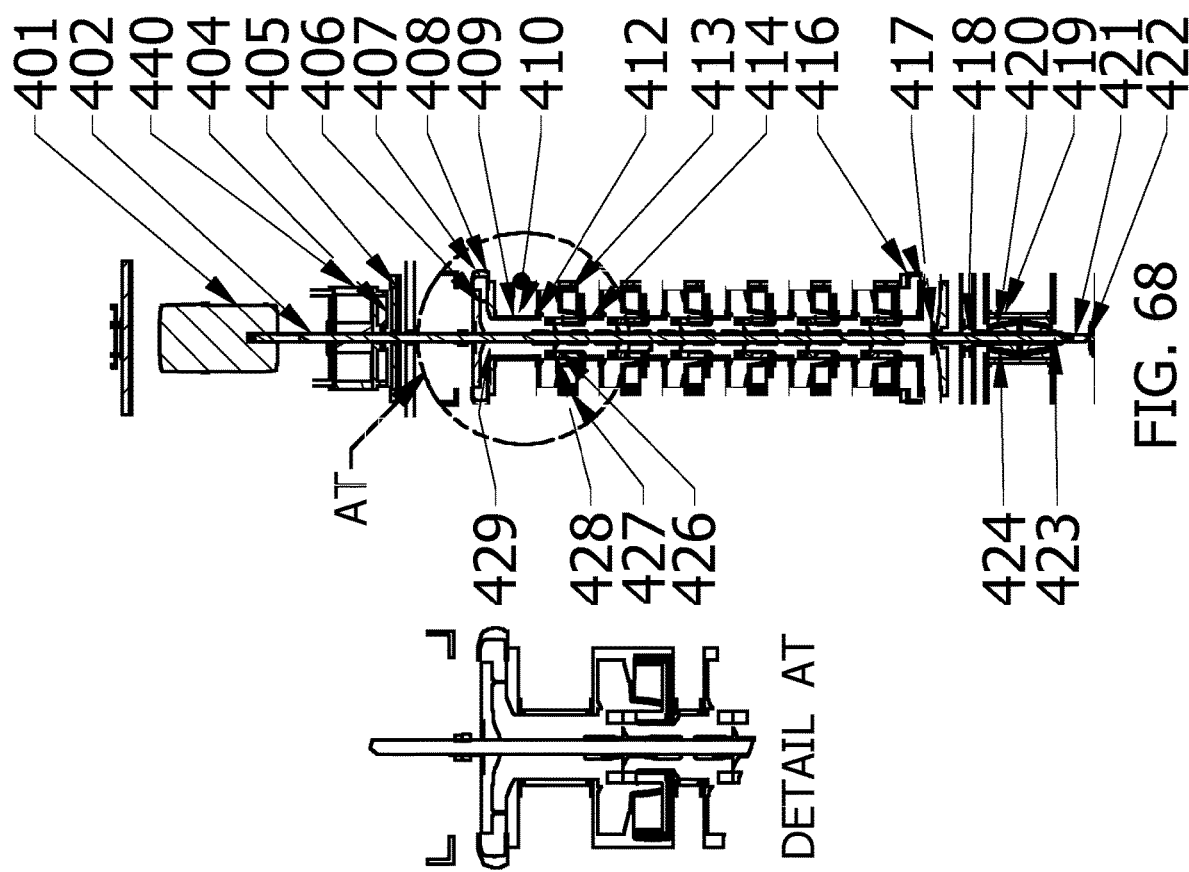
FIG. 68 is a cross-sectional view of a central section of the fluid circulation system of FIG. 67 with a secondary motor system added to a top section of the fluid circulation system in accordance with an embodiment.
Figure 67:
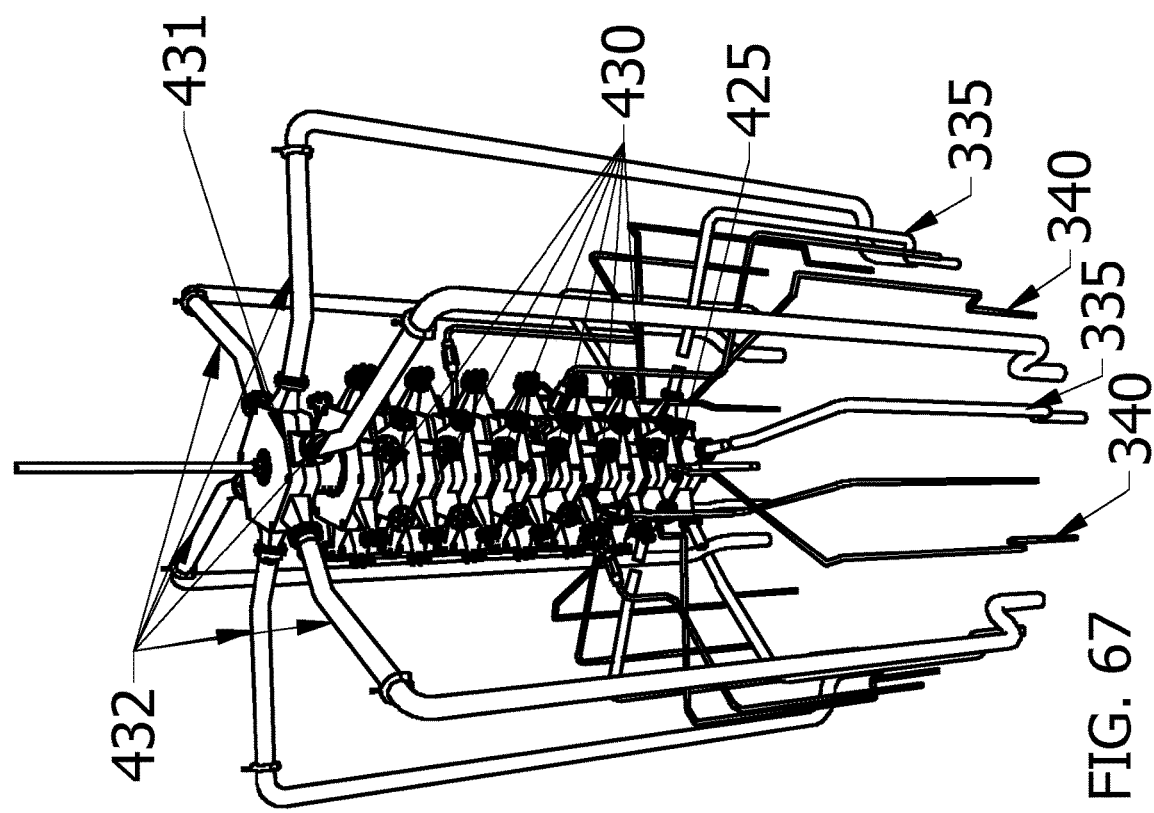
FIG. 67 is a side perspective view of a fluid circulation system sans the reservoir of FIG. 38 in accordance with an embodiment.
Figure 69:
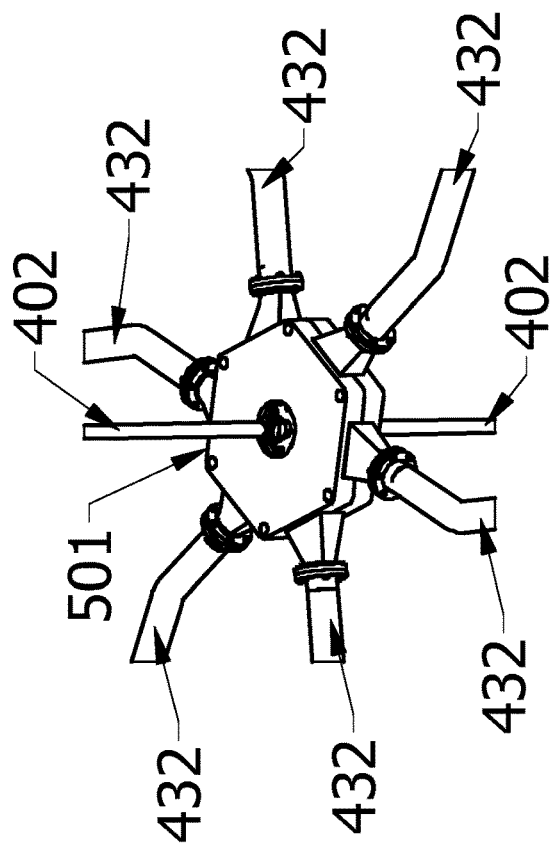
FIG. 69 is a top perspective view of a gas impeller assembly in accordance with an embodiment.
Figure 71:
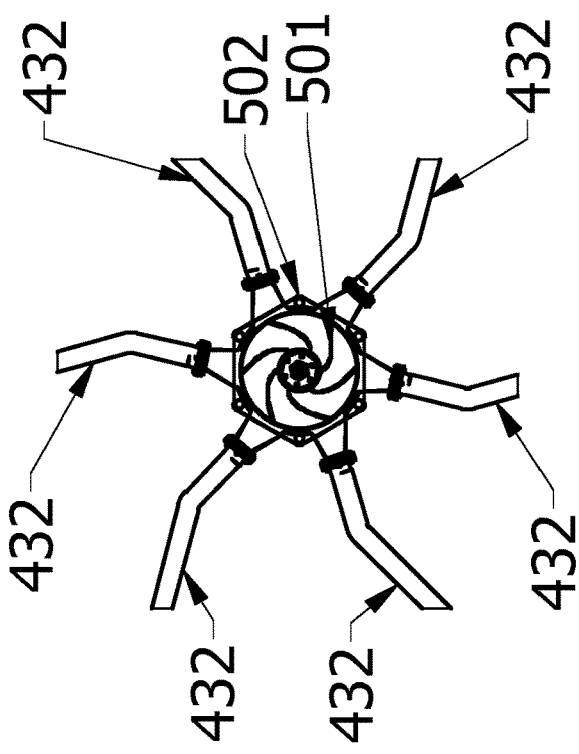
FIG. 71 is a top view of the gas impeller assembly of FIG. 69.
Figure 70:
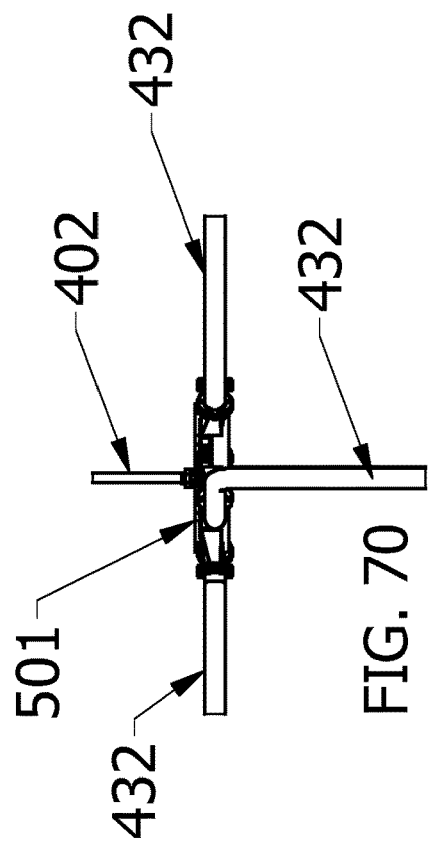
FIG. 70 is a side view of the gas impeller assembly of FIG. 69.
Figure 73:
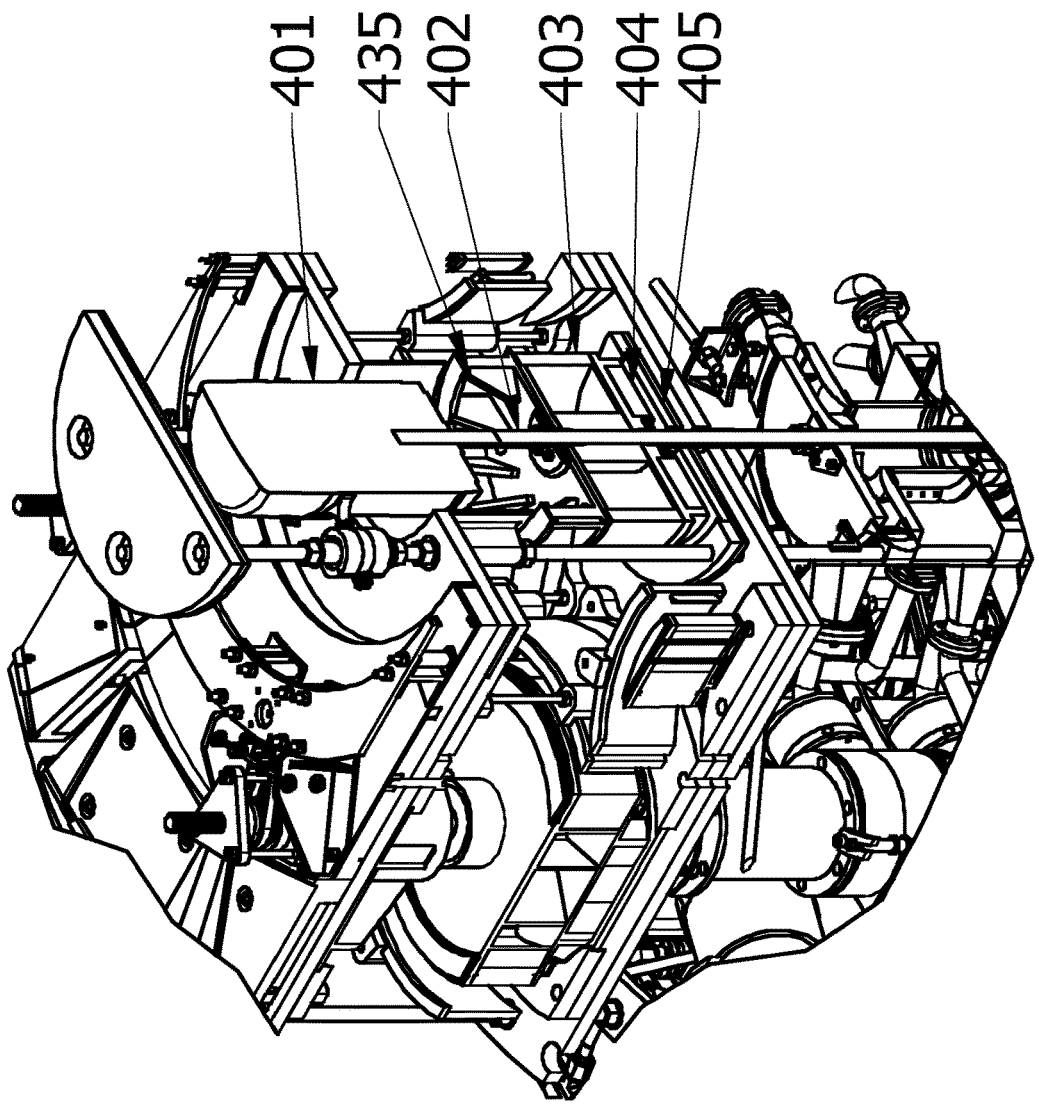
FIG. 73 is an enlarged view of the circle H of FIG. 72 showing the secondary motor system in accordance with an embodiment.
Figure 72:
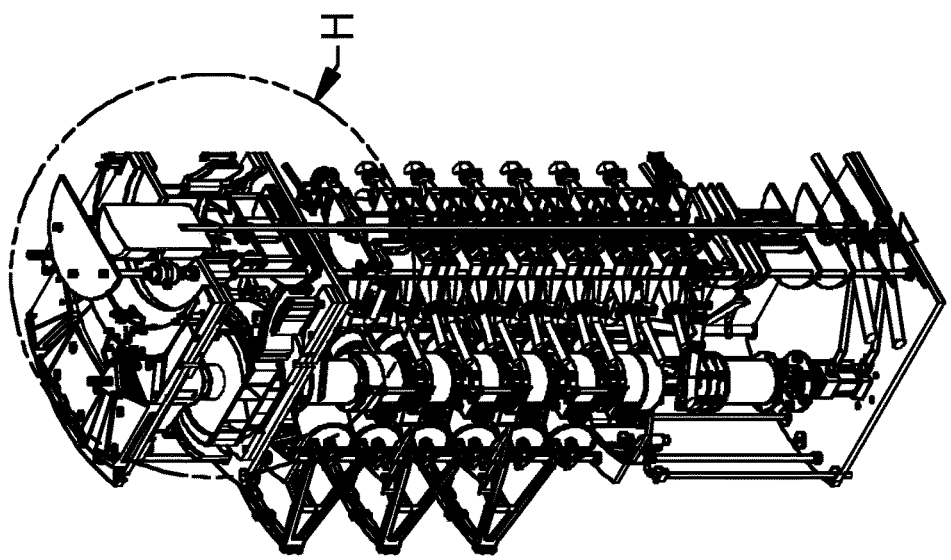
FIG. 72 is a partial sectional view of the system of FIG. 1 showing a fluid rotational assembly module in accordance with an embodiment.
Figure 74:
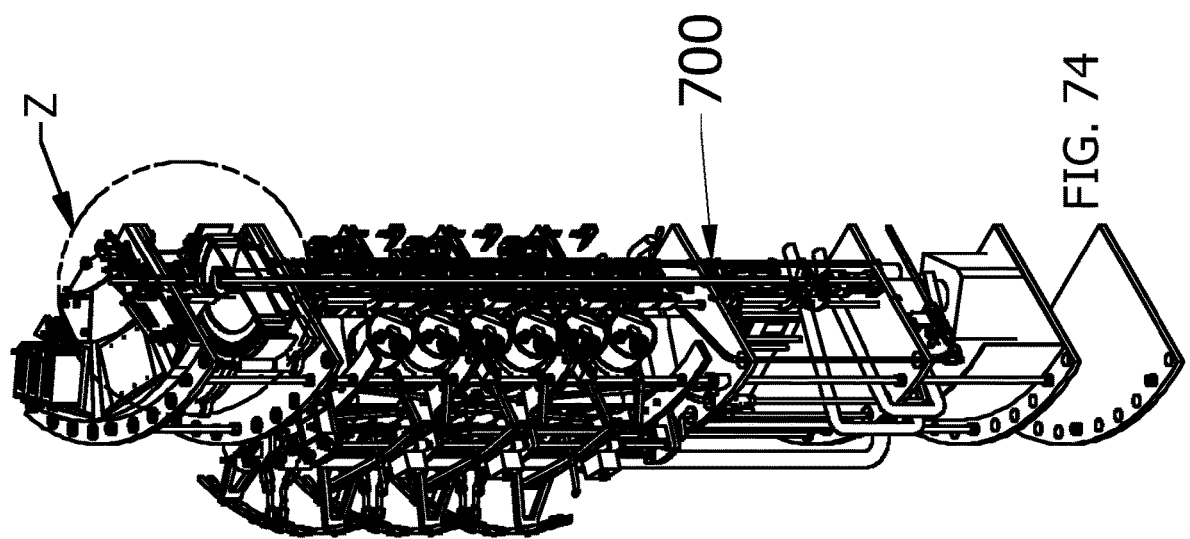
FIG. 74 is a partial sectional view of the system of FIG. 1 showing a turbine rotational assembly module in accordance with an embodiment.
Figure 76:
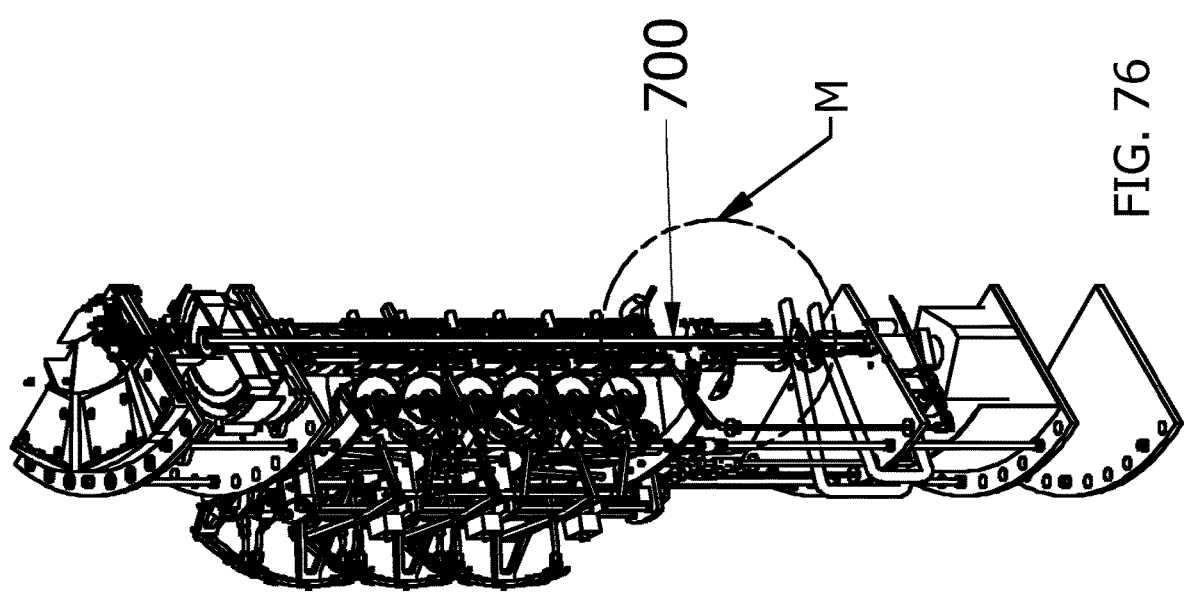
FIG. 76 is a partial sectional view of the system of FIG. 1 showing a turbine rotational assembly module in accordance with an embodiment.
Figure 78:
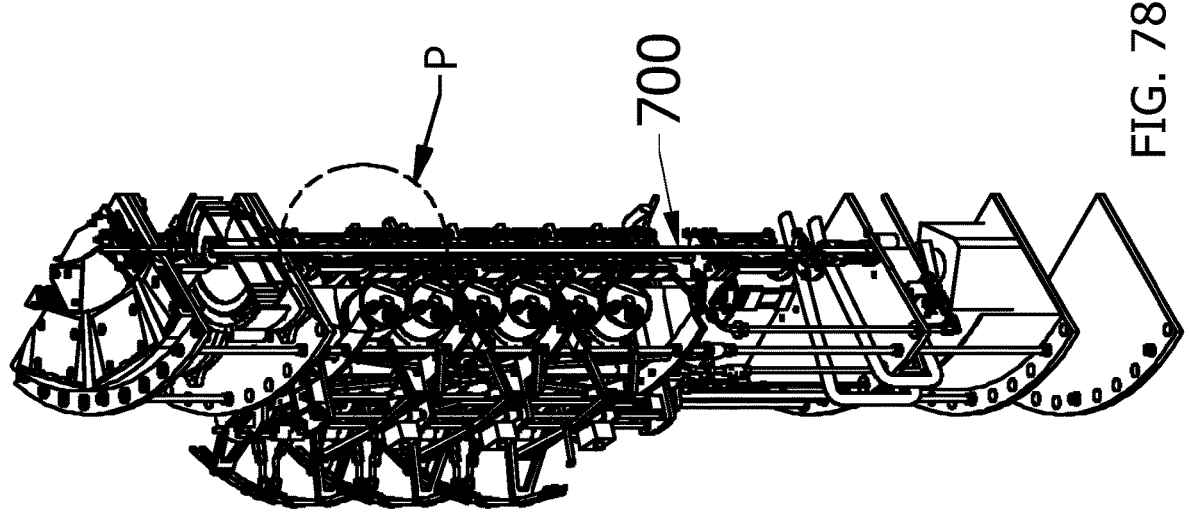
FIG. 78 is a partial sectional view of the system of FIG. 1 showing a turbine rotational assembly module in accordance with an embodiment.
Figure 81:
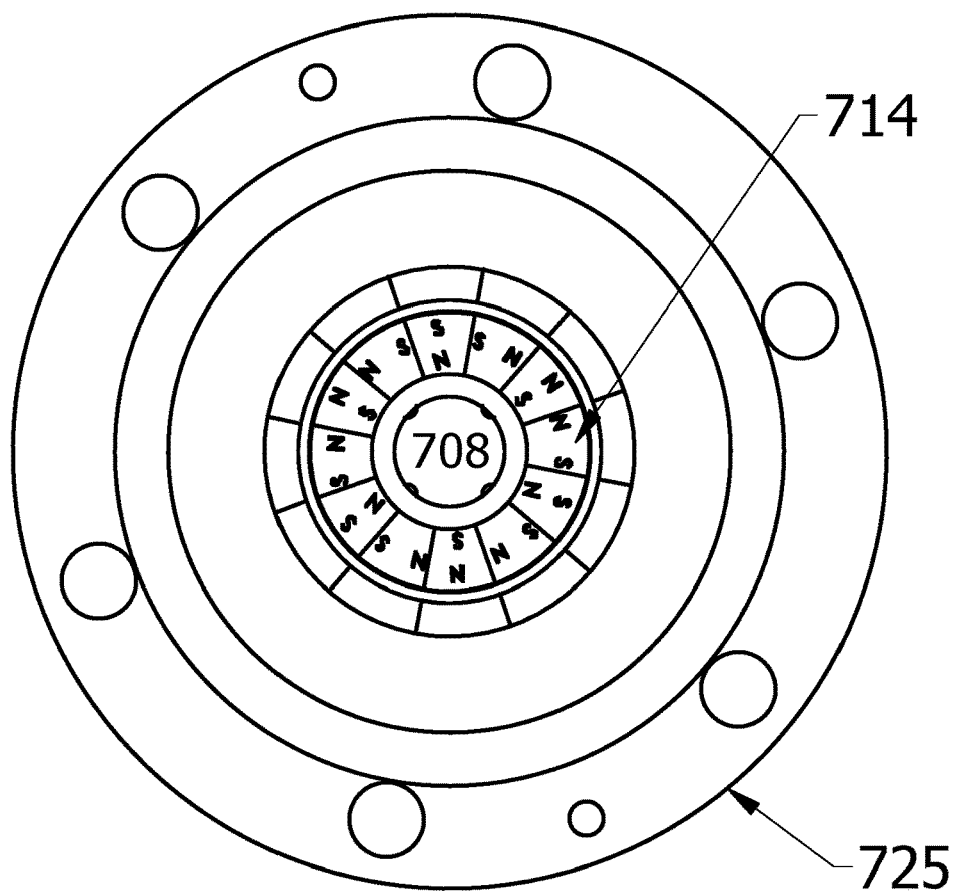
FIG. 81 is a cross-sectional view taken along the line T-T of FIG. 80.
Figure 80:
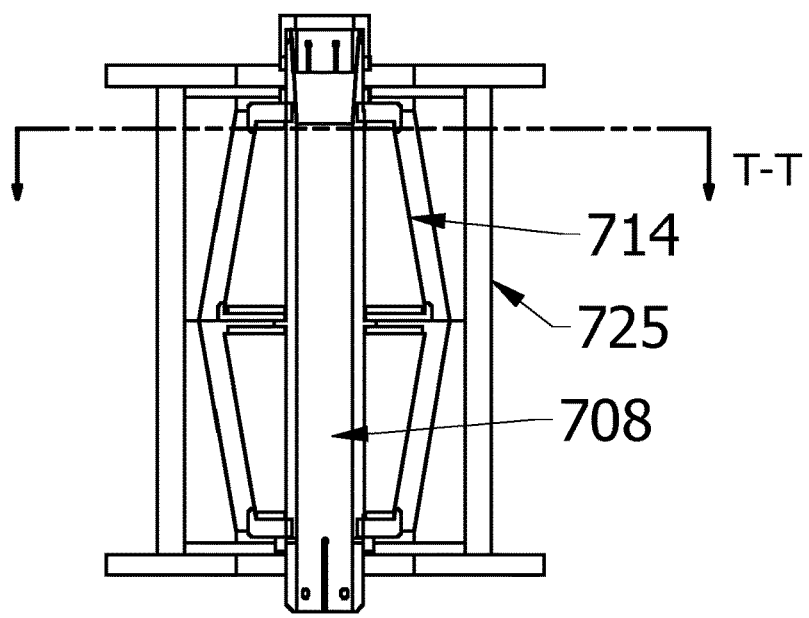
FIG. 80 is an elevation view of a magnetic bearing assembly in accordance with an embodiment.
Figure 82:
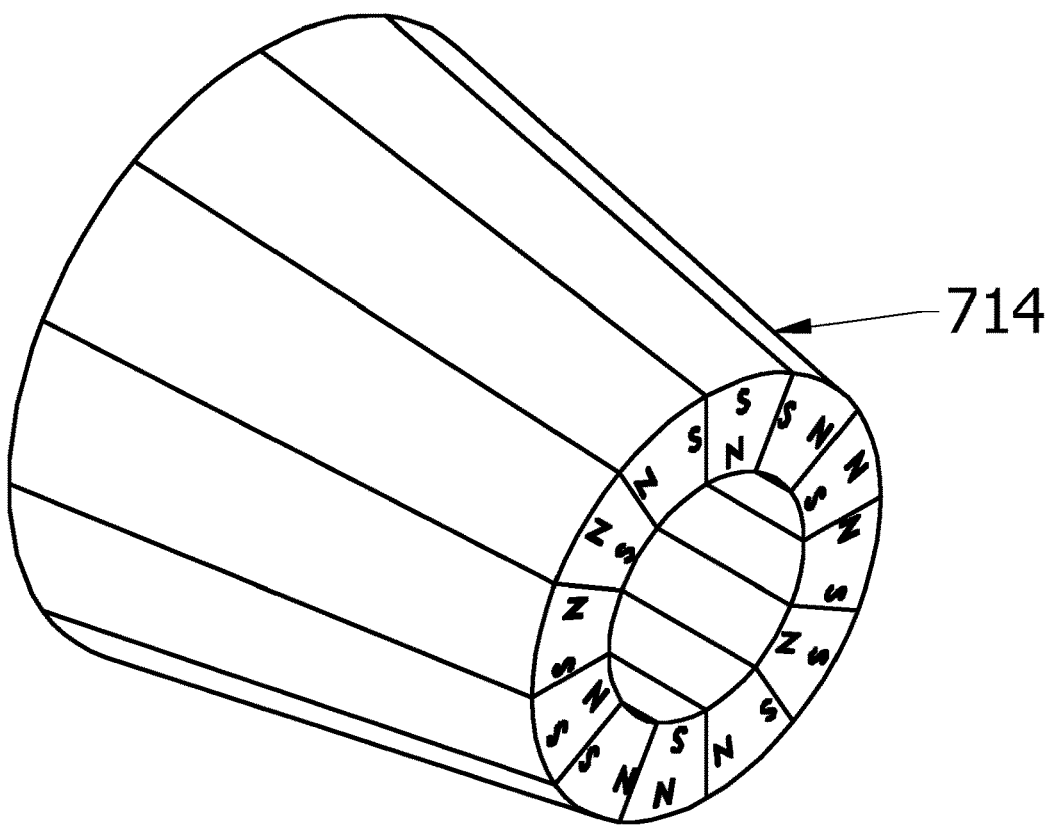
FIG. 82 is a side perspective view of a cylinder Halbach array in accordance with an embodiment.
Figure 83:
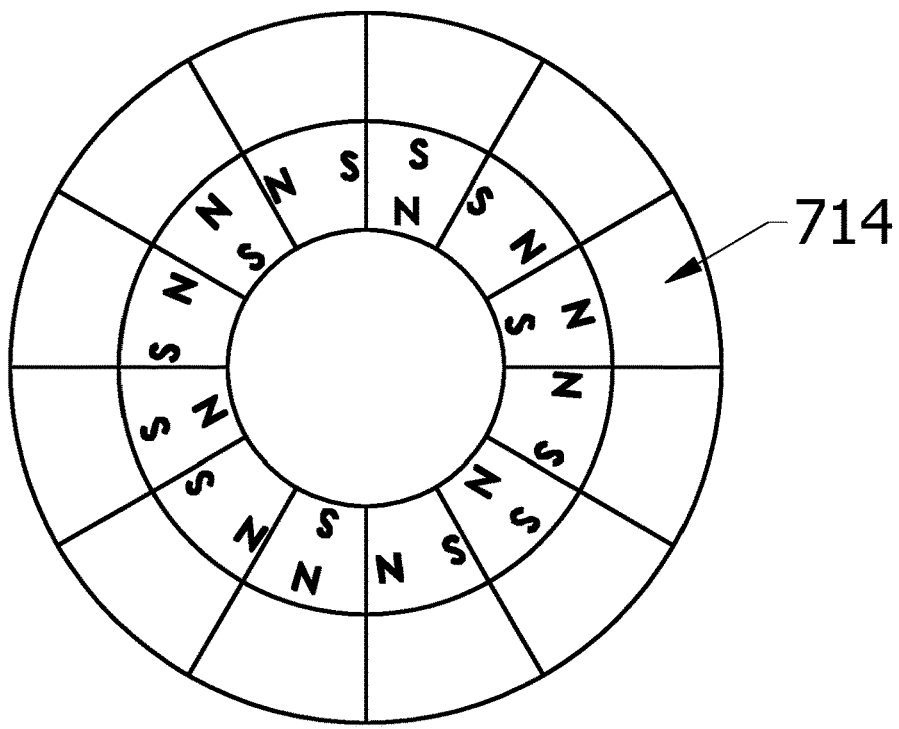
FIG. 83 is a top view of the Halbach array of FIG. 82.

Referring now to FIGS. 74, 76, and 78, one sixth of the turbine system 1000 is shown to highlight a single turbine module 700 for further details. The turbine module 700 (shown in cross-section) is the same module repeatedly shown in FIGS. 74, 76, and 78 but highlighting a different section of the module for additional details in an accompanying figure on the same sheet for the convenience of the reader. A turbine module 700 is shown intact and extracted from the surrounding supporting elements in FIG. 44. In an exemplary embodiment, the turbine module 700 includes a turbine shaft 708 and an electromagnetic generator module 750 coupled to the turbine shaft 708. While a single electromagnetic generator module 750 is shown, some embodiments may include multiple generator modules 750 with modifications to wiring to the system 1000 to extract the power generated from each generator module 750 as needed. The turbine module 750 may include a turbine impeller assembly (or a plurality of assemblies) 600 mounted to the turbine shaft 708. The general impetus to drive rotation of the turbine shaft 708 may come from a driving force turning the impeller assemblies 600 (discussed further below). In an exemplary embodiment, the turbine module 700 may include six impeller assemblies 600 mounted to the shaft 708. Referring temporarily to FIG. 45, accordingly, the turbine system 1000 may comprise six levels of impeller assemblies 600, wherein impeller assemblies 600 may be positioned approximately on a same horizontal level (plane) relative to the impeller assemblies 600 on an adjacent turbine shaft 708. Six impeller assemblies 600 on the same level (a second level from top to bottom) with assemblies on adjacent modules 700 are called out. Similarly, some embodiments may expand the power output of the turbine system 1000 by expanding the number of turbine modules 700 present. Referring for the moment to FIGS. 46-48, an embodiment with twelve turbine modules 700 is shown according to an exemplary arrangement. Generally speaking, the turbine modules 700 may be positioned so that impeller assemblies 600 of respective turbine shafts 708 may share a same level so that the source of the driving force (for example, the fluid source) may be configured to distribute the impetus fuel evenly on each level of the turbine system 1000.

Turbine Generator

Referring now to FIG. 75 and FIGS. 91-93, a turbine generator 750 may be seen in more detail according to an exemplary embodiment. The turbine generator module 750 may generally surround the shaft 708. The turbine generator module 750 may include a stator 710 positioned around a perimeter of a rotor assembly 740. Referring concurrently with FIGS. 24-32, a rotor assembly 740 is shown according to an exemplary embodiment. The rotor assembly 740 may comprise two arrays of magnets; an outer array of magnets 706 and an inner array of magnets 707.

The outer array of magnets 706 may be configured to generate electricity when rotated within the stator 710. In some embodiments, the outer array of magnets 706 may comprise magnets arranged in alternating fashion with the N-S poles being rotated north to south and east to west. For example, in FIGS. 27 and 28, the polarities are shown as alternating between being on the ends that touch an adjacent magnet and on the ends that face the exterior and interior open space of the array.

The inner array of magnets 707 may be configured to generate a levitating effect on the generator module 750 along the turbine shaft 708. For example, some embodiments may include a conductor plate 709 positioned below the array of magnets 707. The magnets may be positioned so that the poles may alternate between being oriented lateral to each other or vertical to each other. For example, in FIGS. 30 and 32, the magnets are shown with one magnet's poles facing away and toward gravity and adjacent magnets' poles facing toward and away from the first magnet. In addition, in some embodiments, a magnet with one pole facing away from gravity may have the opposite pole type on both sides of its upper half and the same pole type on both sides of its lower half. For example, a North pole facing upward (away from gravity) may be between two South poles on the upward facing surface of the array. A North pole on the downward facing surface of the array may be between to North poles of adjacent magnets. as may be appreciated, when this arrangement is positioned above a conductor plate 709, the net magnetic field produces a repulsion force against the conductor plate 709 causing the generator module 750 to move upward away from the conductor plate 709. This contributes to alleviating some drag on the turbine shaft 708 so that the less parasitic forces affect the power generated by the magnetic array 706.

Figure 86:
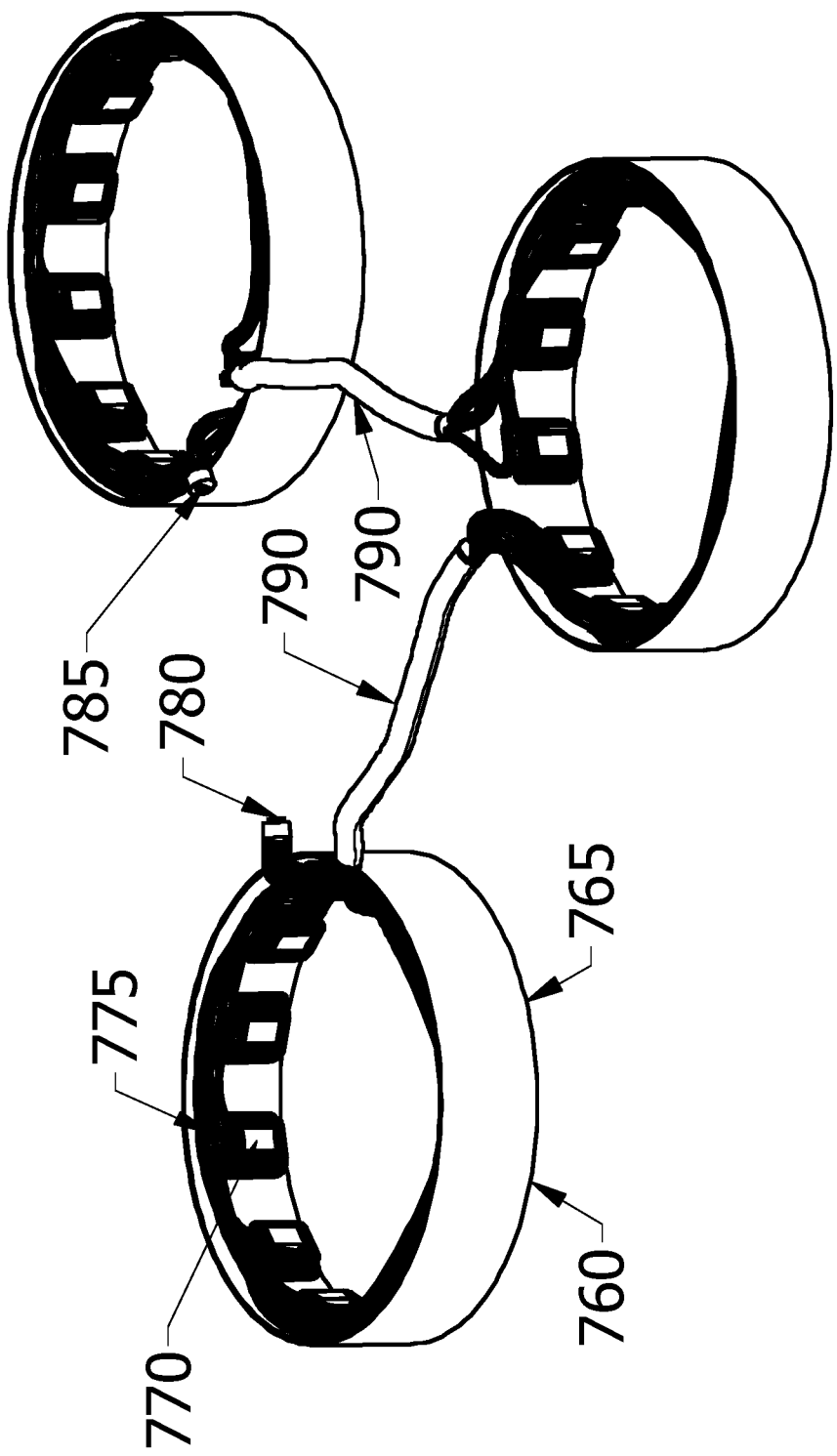
FIG. 86 is a perspective right side view of a three-coil assembly for connection to a turbine generator in accordance with an embodiment.
Figure 87:
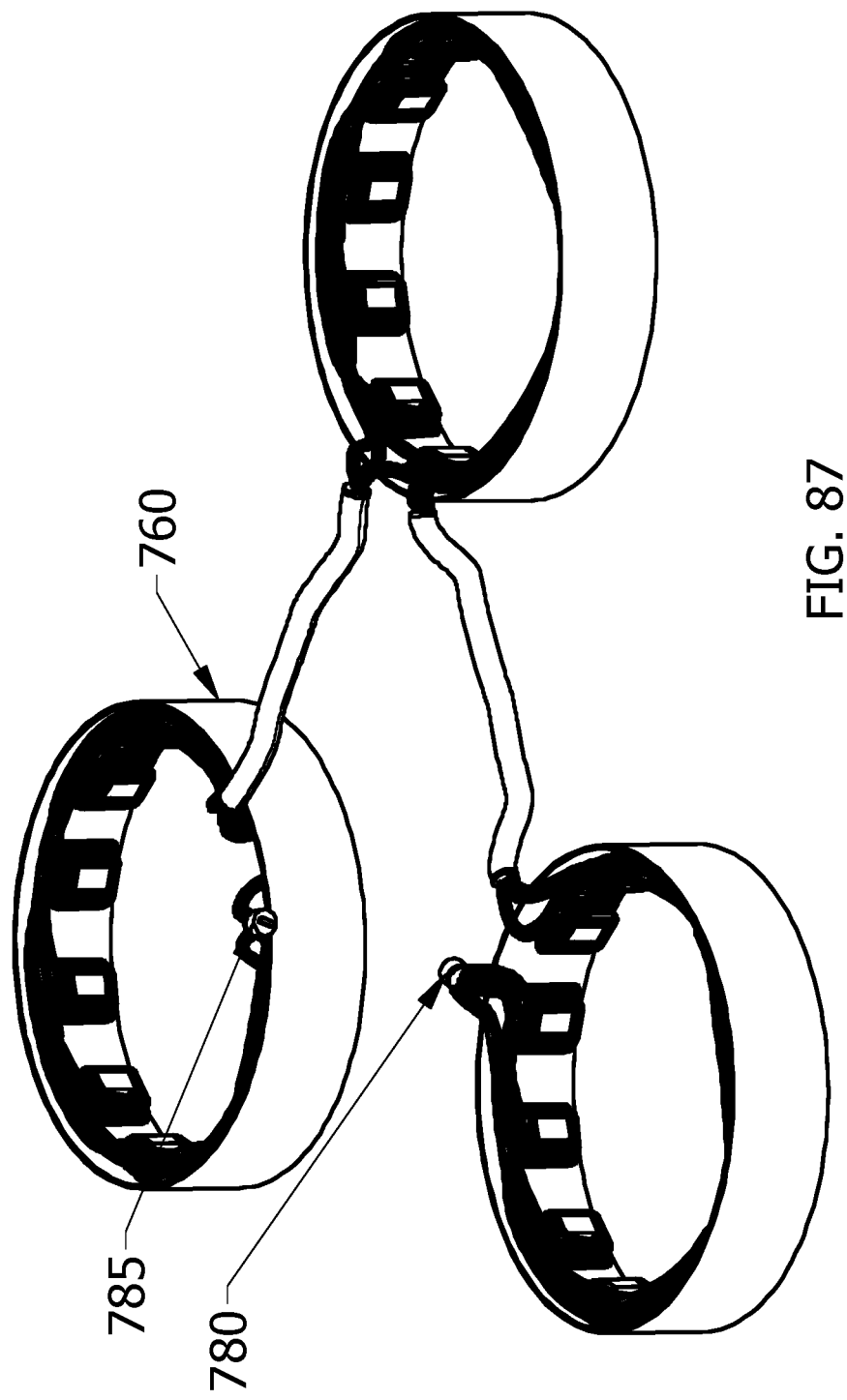
FIG. 87 is a perspective left side view of the coil assembly of FIG. 86.
Figure 88:
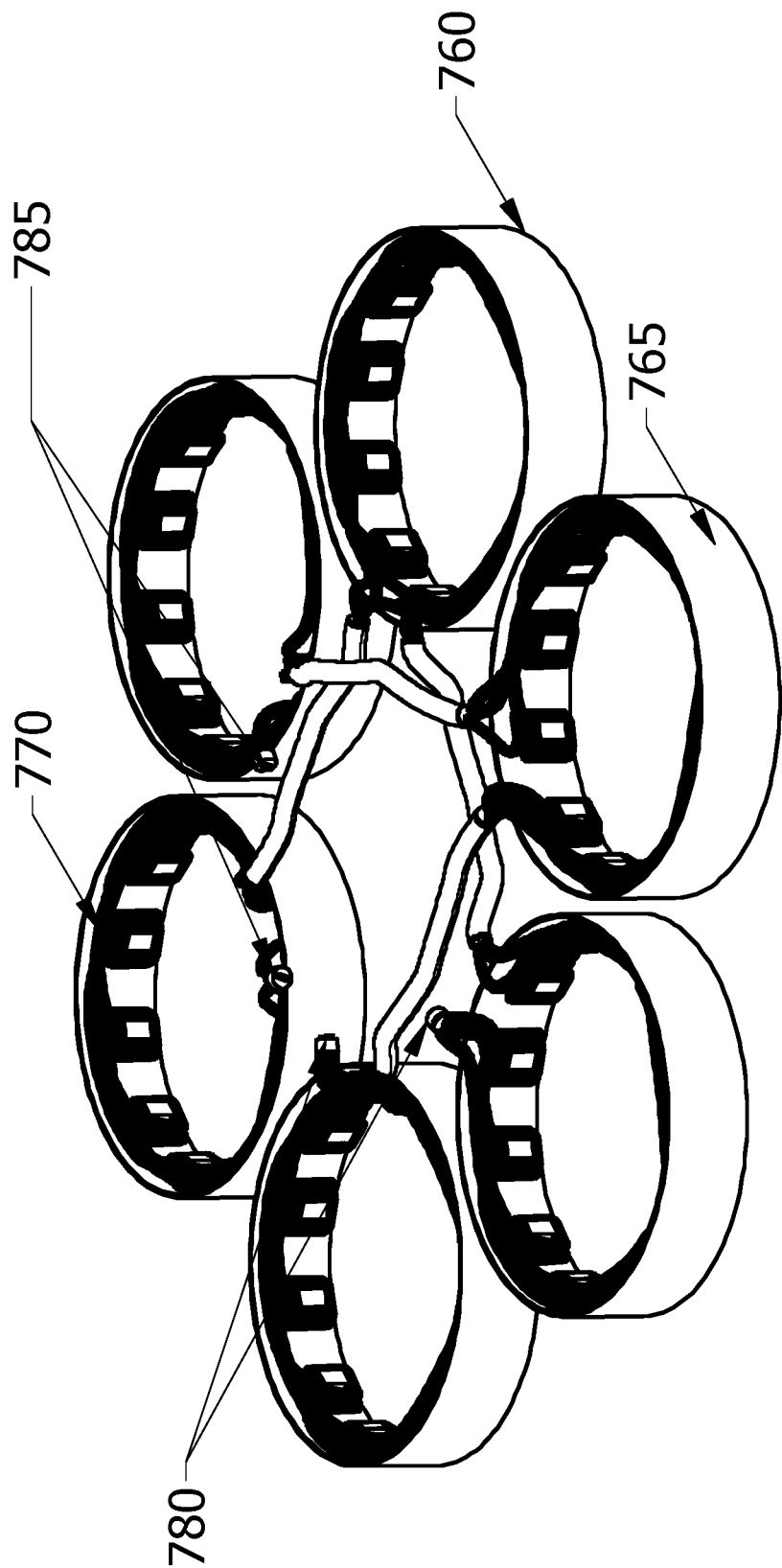
FIG. 88 is a perspective side view of a six-coil assembly for connection to a turbine generator in accordance with an embodiment.
Figure 89:
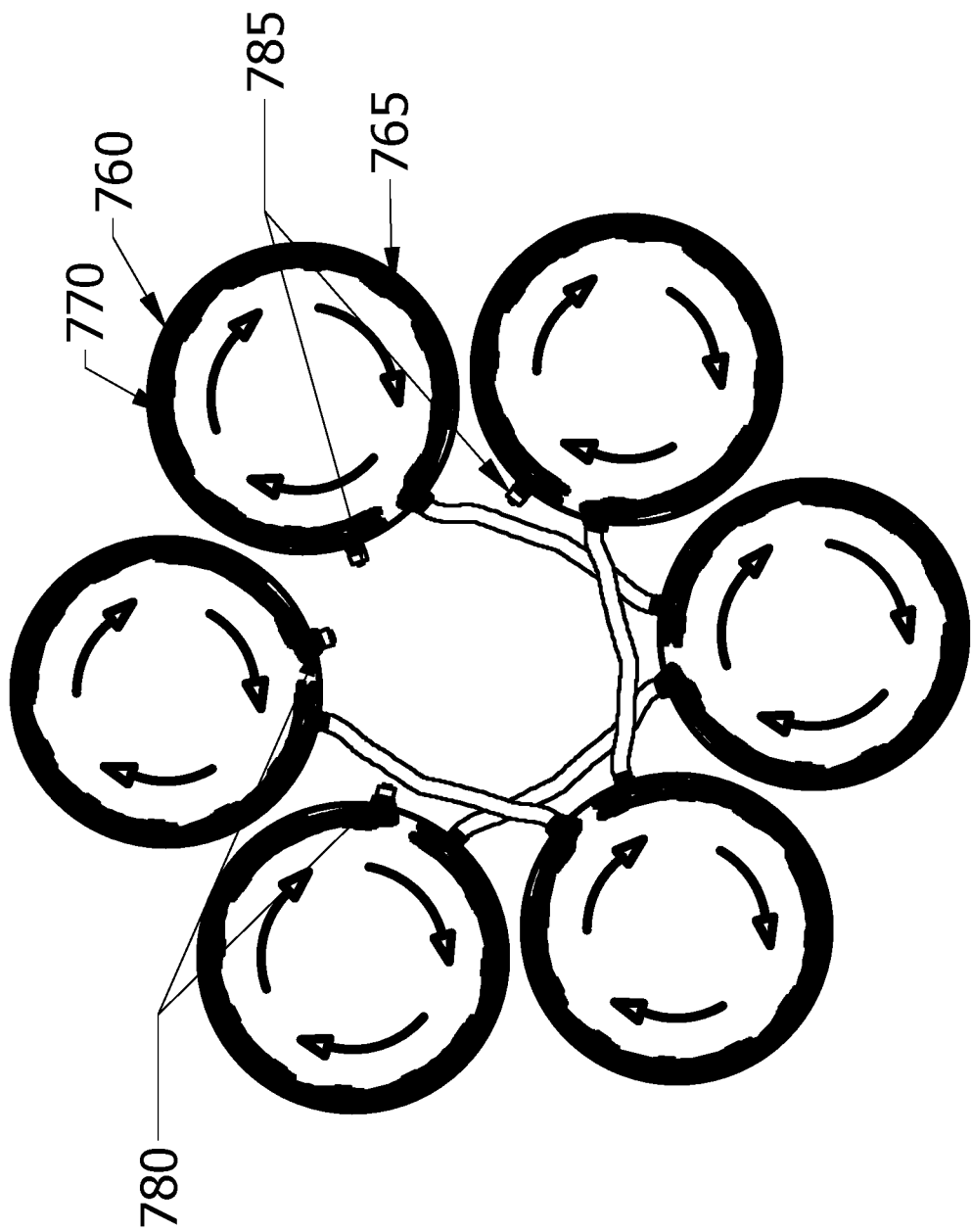
FIG. 89 is a top view of the coil assembly of FIG. 88.
Figure 90:
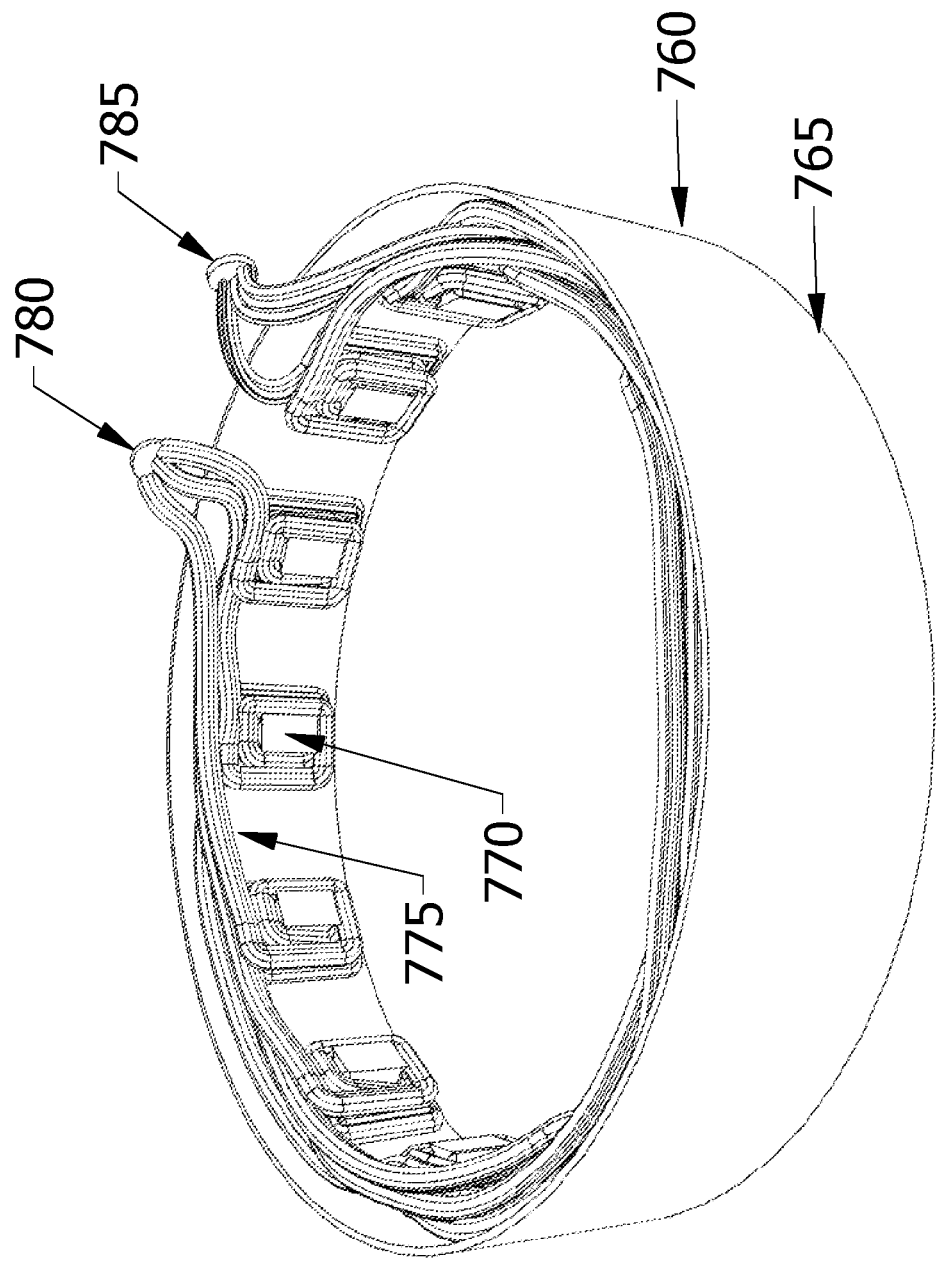
FIG. 90 is a front perspective view of a three-phase axial flux generator coil in accordance with an embodiment.

In some embodiments, the stator 710 may include a generator coil assembly 760 surrounded by a shroud 765. The generator coil assembly 760 may cooperate with the rotor 740 to generate electricity from rotation of the outer array of magnets 706. The generator coil assembly 760 may be positioned between the shroud 765 and the outer array of magnets 706. Referring to FIGS. 86-90, embodiments of coil assemblies 760 are shown. In FIG. 90, a single coil assembly 760 is shown according to an exemplary embodiment. The coil assembly 760 may include a conductive shroud 765 as a support element to which a plurality of magnets 770 may be attached to an inner surface of the shroud 765. Each magnet 770 may have wires connected to positive and negative lines on each respective magnet. In an exemplary embodiment, the magnets 770 are wired to produce a three-phase axial flux when electricity is produced by the interaction with the rotor 740. FIGS. 86 and 87 show the wiring along a line to a positive terminal 780 and a negative terminal 785 to which an output will be connected. Bundled wires may be protected by shielding 790. FIG. 88 shows a six-coil assembly using two groups of three-phase axial flux wiring. With two groups, there may be two positive terminals 780 and two negative terminals 785 each producing three-phase flux from their respective three-coil assemblies 760. FIG. 89 shows the direction of current within each coil assembly 760 when wired for three-phase axial flux. Referring to FIGS. 134, 135, and 136, a turbine generator system is shown implementing six turbine generator modules 750 into two three-phase axial flux systems as they may be housed within the turbine system 1000. The output of the turbine generator modules 750 may be used to wire to an electric motor or other components that require power in turbine generator system 1000.

Upper Magnetic Bearing

Figure 79:
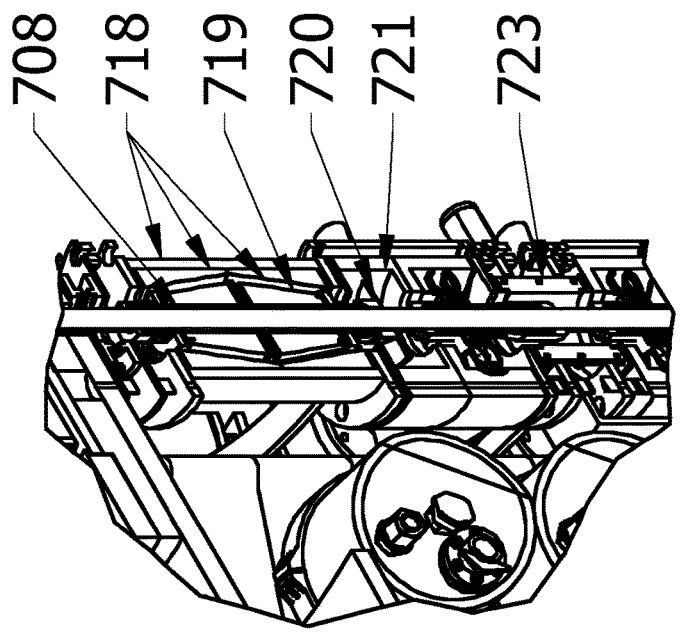
FIG. 79 is an enlarged view of the circle P of FIG. 78 showing a cross-sectional view of an upper magnetic bearing and a turbine impeller module on the turbine shaft in accordance with an embodiment.

In some embodiments, the turbine module 700 may include an upper magnetic bearing 725. See FIGS. 44, 78 and 79. The upper magnetic bearing 725 may surround the turbine shaft 708, positioned below the generator module 750. The upper magnetic bearing 725 may be configured to help keep the turbine shaft laterally aligned without making physical contact. In some embodiments, the magnet 719 may be surrounded by a conductor shroud 718. The upper magnetic bearing 725 may include a magnet or a magnet array 719. In some embodiments, the upper magnetic bearing may be above and adjacent a first turbine impeller 600. In this figure, a divertor fan 720 and the casing 721 for overflow are also called out to show some positioning relative to elements of the circulation components. If some spray scatters vertically up from impacting the turbine blades the divertor fan 720 may route the spray horizontally. This slows the spray down and helps keep it in the system. The liquid should drip down into the turbine casing below where the turbine blades can route the fluid through check valve 670. In some embodiments, there may be a coupling 723 coupling turbine casings together which may prevent some liquid droplets from escaping the system.

Lower Magnetic Bearing

Figure 77:
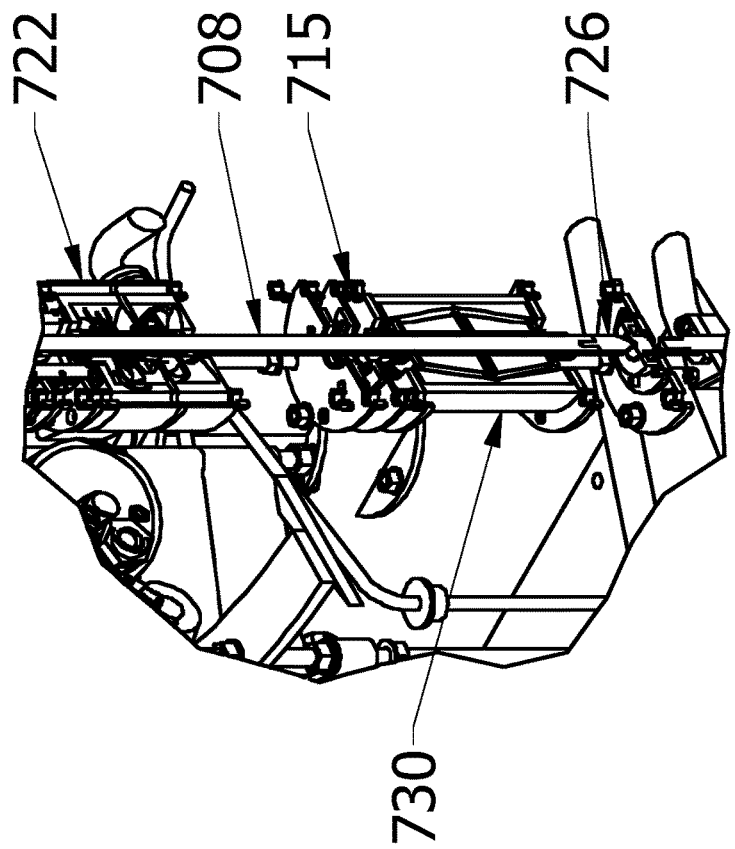
FIG. 77 is an enlarged view of the circle M of FIG. 76 showing a cross-sectional view of a lower magnetic bearing and surrounding elements on the turbine shaft in accordance with an embodiment.

Some embodiments may include a lower magnetic bearing 730. See FIGS. 44, 76, and 77. The lower magnetic bearing 730 may include a conductor shroud 713 and a magnet(s) 714 (similar to the shroud 718 and magnet(s) 719 of upper magnetic bearing 725). The lower magnetic bearing 730 may be positioned below a lowest turbine impeller 600. A drain outlet 711 and a drain/overflow line 712 from a turbine impeller 600 are also called out to show positioning relative to some circulation components of the system 500. The lower magnetic bearing 730 may be configured to help keep the turbine shaft laterally aligned without making physical contact.

Referring temporarily to FIGS. 80-83, in an exemplary embodiment, the magnetic bearings 725 and 730 may comprise a Halbach cylinder. In one embodiment, the bearing may comprise a pair of frusto-conical Halbach cylinders positioned so that the wider base of each face each other. As may be appreciated, the Halbach cylinder bearing may be configured to produce a zero field inside the central bore of the magnet array, producing a near frictionless relationship with the turbine shaft 708. In addition, the tapering sides of the frusto-conical shape and the angle of the taper changes the pressure of the resultant field along the sides. This helps the bearing stay centered around the shaft 708.

In some embodiments, the turbine shaft 708 may include a pointed tip 726 to reduce friction during the startup process.

Figure 30:
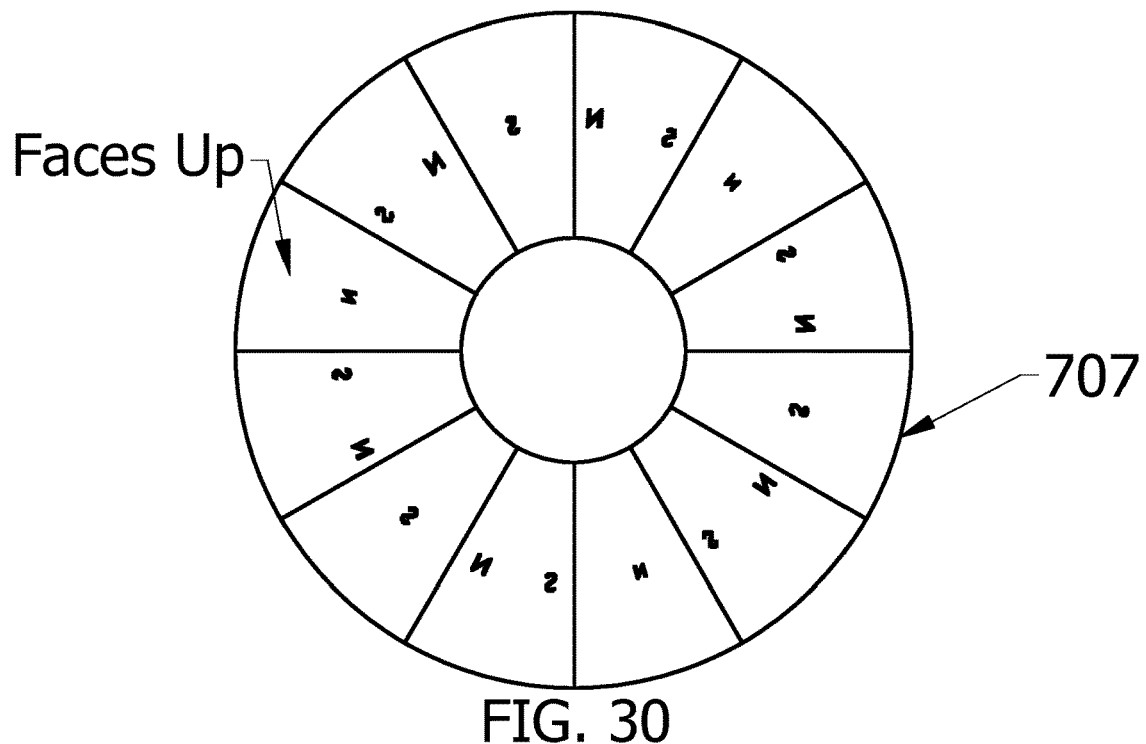
FIG. 30 is a top view of a turbine levitation array in accordance with an embodiment.
Figure 31:
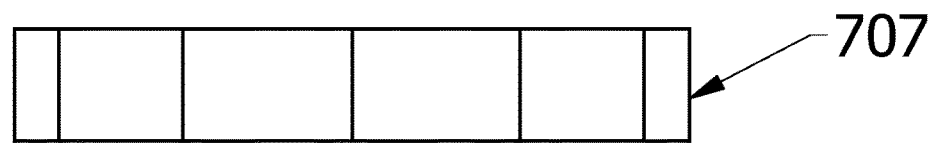
FIG. 31 is a side view of the levitation array of FIG. 30.
Figure 32:
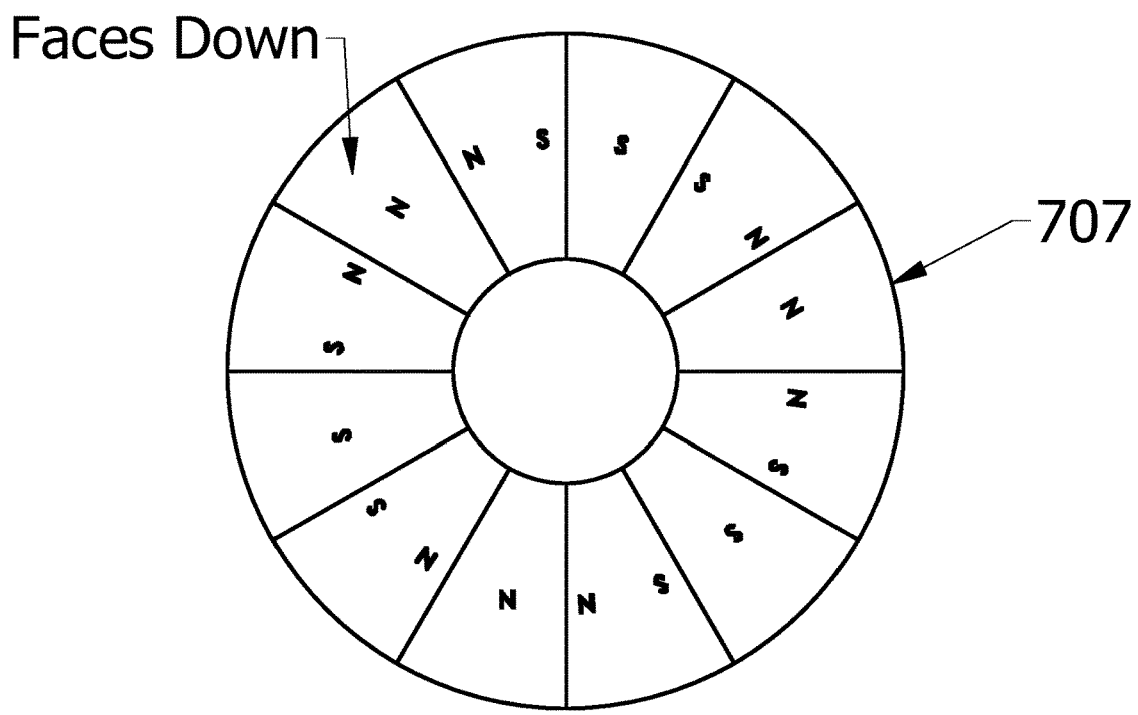
FIG. 32 is a bottom view of the levitation array of FIG. 30.
Figure 41:
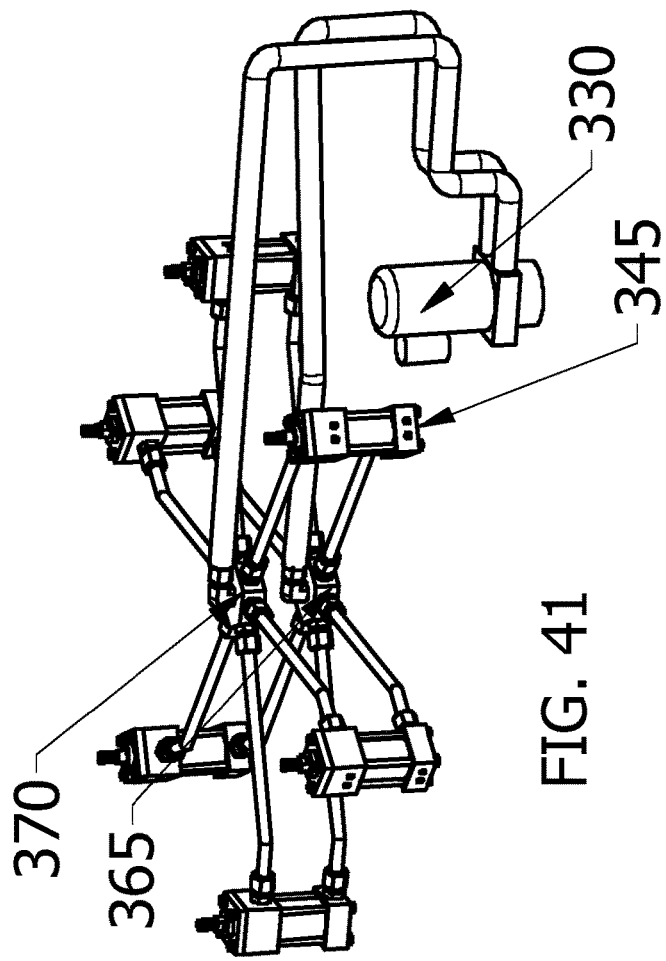
FIG. 41 is a perspective view of a hydraulic assembly in accordance with an embodiment. [0049] 42 is a side view of the assembly of FIG. 42.

Levitation Array, magnetic array depicted in FIGS. 30, 31, 32, situated around and attached to turbine shaft 708 can be a Halbach Array with the magnetic field facing downward towards a conductor plate 709. Once rotating at an adequate speed, the field interacting with the conductor plate 709 will create eddy currents and a repulsive force known to cause magnetic levitation. The operation of the magnetic array depicted in FIGS. 30, 31, 32 may create an air gap 422 between the tip 726 and a supporting platform. As may be appreciated, levitating the turbine module 700 may increase its efficiency by lessening the energy lost to friction spinning on the supporting platform.

Vertical Positioning System

Figure 75:
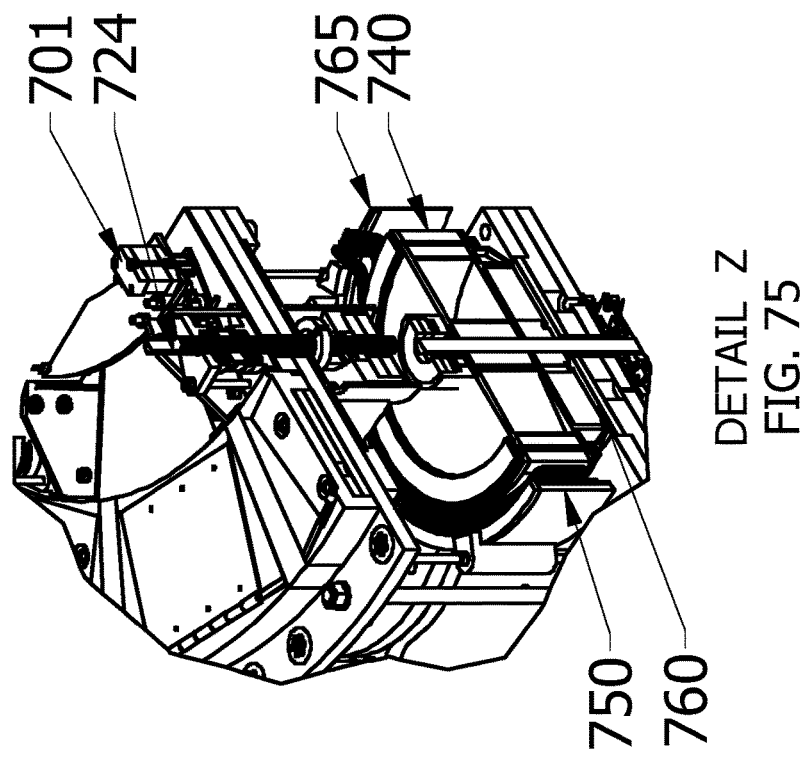
FIG. 75 is an enlarged view of the circle K of FIG. 74 showing a cross-sectional view of the turbine generator in accordance with an embodiment.

Referring now to FIGS. 75, 84 and 85, some embodiments may include a vertical positioning system for controlling the vertical travel of the turbine shaft 708 and turbine generator 750. Elevational control may prevent the turbine shaft from rising to high when levitated and colliding with elements above it. A vertical positioning system helps to keep the turbine blades 650 aligned at the proper elevation to receive pressurized fluid as depicted in FIG. 23 relative to 680. In an exemplary embodiment, the vertical positioning system may include an optical sensor 795 configured to detect changes in color (or some other light characteristic). The optical sensor 795 may be positioned proximate the pointed tip 726 (or another section of the shaft 708 clear of other components). The pointed tip 726 may include two different colored stripes 793 and 797. In a default state, the optical sensor 795 may detect that the shaft is in a safe state when the upper stripe 793 is detected. When the turbine shaft 708 rises so that the lower stripe 797 is detected, the optical sensor 795 may transmit a signal to a controller 960 indicating an excess of elevation of the shaft 708.

Referring to FIGS. 75, 92, and 93, on the upper end of the shaft 708, a set of apposing magnets 705 may be coupled to a housing on the turbine generator 750. The magnets 705 may be positioned proximate the upper tip of the shaft 708. Magnets 704 may be positioned above the upper tip of the shaft 708 in alignment with the magnets 705. A jack screw 724 may be coupled to the magnets 704. In response to the turbine shaft 708 levitating too high, some embodiments may operate a stepper motor 1006 to drive the jack screw 724 downward so that the magnets 704 create a repelling force with the magnets 705. The repelling force may drive or at least prevent the turbine generator 750 from travelling vertically higher.

Circulation System

Some embodiments of the turbine system 1000 include a circulation system 500. The circulation system 500 may include generally for example, a fluid source for driving the turbine impeller module 600, a fluid separator module 400, and a reservoir system 300 for collecting a liquid component of the driving fluid to recirculate back to the impeller module 600. In some embodiments, and as discussed in further detail below, the reservoir system may provide the liquid during a priming process during start-up of the turbine system 1000.

Turbine Impetus

Figure 11:
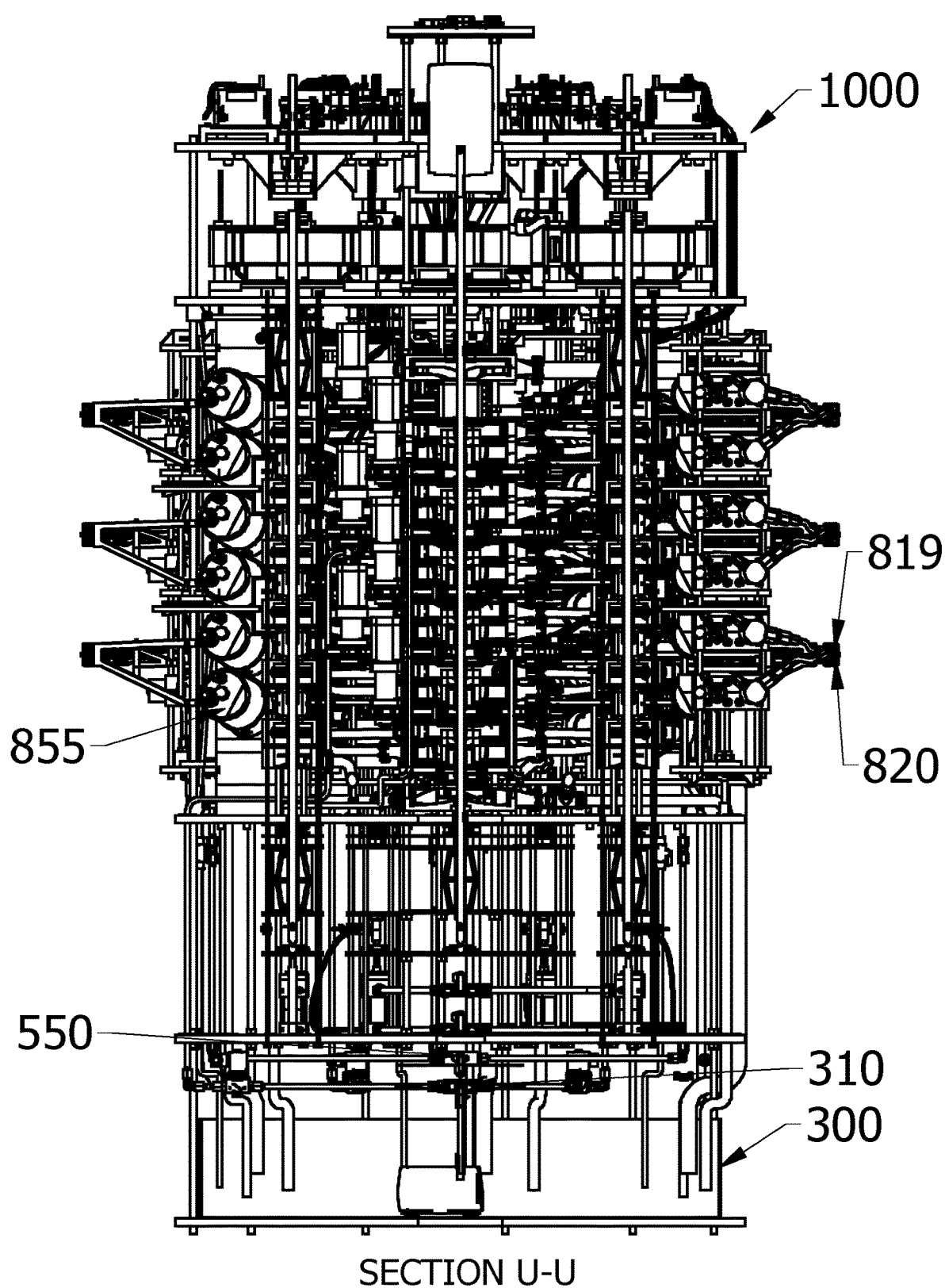
FIG. 11 is a cross-sectional view taken along the line U-U of FIG. 3.

Referring to FIGS. 5-8, 14-15, 22-23, 97-99, and 103-111, aspects of the fluid source and turbine module 600 are shown according to an exemplary embodiment. In an exemplary embodiment, the impetus for the turbine module 600 may be a pressurized fluid. Embodiments may generally use two fluid components where one component is generally incompressible relative to a compressible component. The fluid may be for example, a compressed gas that may be mixed with a liquid that is less compressible than the gas. The gas may be introduced into the turbine system 1000 from an external source through entry point 550 (see FIGS. 1 and 11) which is connected to gas line manifolds 819 and 820. The gas line manifolds 819 and 820 are shown as encircling the turbine system 1000 generally in FIGS. 1-18. In an exemplary embodiment, the manifolds 819 and 820 may be routed as pairs. FIGS. 103-107 show a paired set of manifolds 819; 820 connected to a six-to-one manifold 2006 (which may be connected to the gas entry point 550 shown in FIG. 1). A solenoid 2001 may control flow to the compressed air manifold it is connected to. Some embodiments may include a three-to-one manifold 2007 which may route gas between three levels of manifolds. See for example FIGS. 108-111.

Generally, the manifolds 819 and 820 may work as pairs fueling an upper and a lower level of pressure chambers 855. In embodiments with six turbine systems 700, each compressed air manifold 819 and 820 may be configured to provide gas to six pressure chambers 855; three pressure chambers 855 on the upper level and three pressure chambers 855 on the lower level. In an exemplary embodiment, a manifold (819 or 820) fuels every other pressure chamber 855 on a level while the other manifold fuels the other three pressure chambers 855 on the same level. Referring to FIGS. 97-99, in some embodiments, the gas may travel to a check valve 870 which may be connected to a pressure chamber 855. When compressed gas or liquid is introduced into the pressure chamber 855, ambient air may need to be flushed out. Ambient air may be drained through gas valve 865 until, for example, the pressure chamber is primarily filled with liquid. The pressure chamber 855 may be less than completely full of non-compressible fluid to leave room for a compressible gas. The liquid component may be routed from the fluid separator module 400 through conduit 875. Liquid entering the pressure valve 855 may be controlled by a liquid valve 860. When the system is ready to pressurize the liquid with the compressed air as a propellant, the compressed air may be introduced into the pressure chamber 855 through air manifold 824. The non-compressible fluid will tend to settle at the lower portion of pressure chamber 855. The pressurized gas will tend to fill the upper portion of pressure chamber 855 and provide the impetus to propel the non-compressible fluid. The compressed or pressurized fluid combination may be controllably released from the pressure chamber 855 by a pressure release valve 880 into the impeller module 600. In the impeller module 600, the pressurized fluid may drive blades turning the turbine shaft 708. The pressurized fluid may flow past the impeller module 600, which as a result of transferring force to the turbine shaft 708, loses pressure which may result in decompressed gas and/or liquid. In some embodiments, the fluid may flow into a decompressed fluid conduit 675 connected between the impeller module 600 and the fluid separator module 400. In some embodiments, a check valve 670 may be connected between the impeller module 600 and the fluid separator module 400. As will be discussed in further detail below, the fluid separator module 400 may separate the gas from the liquid component and recirculate at least the liquid component back to the pressure chamber 855 via a reclaimed liquid conduit 875.

Turbine Impeller

Referring now to FIGS. 1, 22, and 23, a turbine impeller module 600 is shown according to an exemplary embodiment. The turbine impeller module 600 may be a *nexus* between the fluid circulation system 500 and the turbine module 700. The impeller module 600 may include a Pelton turbine impeller 650 housed within a sealed casing 610. The turbine shaft 708 may be connected to the impeller module 600 through the center of the impeller fan 650. In an exemplary embodiment, there may be six turbine impeller modules 600 per turbine shaft 708. In some embodiments, there may be six turbine impeller modules 600 per cross-section level of the turbine system 1000. However of course, the total number of impeller modules 600 per level and per system 1000 may depend on the number of turbine modules 700 present in the system 1000. For example, FIGS. 46-51 show embodiments with twelve turbine modules 700 which may include twelve impeller modules 600 per level. Fluid may be introduced into the impeller casing 610 interior through a 680 or nozzle 680 connected to the valve 880. As the fluid flows through the casing 610, the fluid turns for example, fan blades on the impeller fan 650 causing rotation in the turbine shaft 708.

Fluid Separator Module

Referring to FIGS. 9-11, 33-34, 36, 58-70, 97-99, and 127-130, a fluid separator system 400 is shown according to an exemplary embodiment. The fluid separator system generally includes one or more separator modules 430. In the exemplary embodiment shown, there are six separator modules 430; one for each level of turbine impellers 600. In general, the separator modules 430 may separate the gas component from the liquid component (or the compressed component from the less compressible component) so that at least one fluid component is recirculated back to the turbine module 700 for driving the turbine shaft(s) 708. In the exemplary embodiment shown, the separator module 430 collects the liquid component and recirculates it back to the pressure chamber 855.

Referring to FIGS. 58-66, a separator module 430 is shown in detail according to an exemplary embodiment. The separator module 430 may include a plurality of fluid inlets 410 coupled to casing 407, providing fluid from the impeller modules 600. The number of inlets 410 shown is based on the number of impeller modules 600 present on the level of the turbine system 1000 for the exemplary embodiment described. After separation, liquid may be released through liquid exit(s) 427. Fluid from the inlet(s) 410 may be collected through liquid passage 412 into a centrifuge system 406. The centrifuge system 406 may comprise an outer impeller 413 and an inner impeller 428 situated above and aligned with the center of the outer impeller 413. The inner impeller 428 and the outer impeller 413 may be coupled to a central shaft 402 that runs most of the vertical extent of the separator system 400. As the outer impeller 413 and the inner impeller 428 rotate. The heavier liquid component of the fluid may naturally sink into the lower, outer impeller 413. The gas component may be separated from the liquid and routed vertically along shaft 402 via inner impeller 428. Inner impeller 428 may allow for decompressing gas to pass vertically along shaft 402 when multiple modules 430 are vertically oriented around shaft 402. See FIG. 11, 33, 68. Impeller 428 may route decompressing gas out of the module casing 407 and out a gas exhaust channel 408 and vertically along shaft 402. Some embodiments may include fins 445 on a bottom surface of the impeller 413. See FIG.

64. The fins 445 may provide a barrier against liquid that may seep under the impeller 413 and prevent the liquid from the liquid from encountering and travelling down the shaft 402.

Some embodiments may include a coupling 409 which may couple the top air/water separator 430 with the gas extraction assembly 501 above. The coupling seals the decompressing gas in the corridor so it can be routed to the impeller in gas extraction assembly 501. As decompressed air impacts impeller 501 it may help rotate shaft 402. Coupling 414 between air/water separator(s) 430 seals the decompressing gas along the shaft corridor per the same function as coupling 409.

Storage, Drainage and Fill

Figure 43:
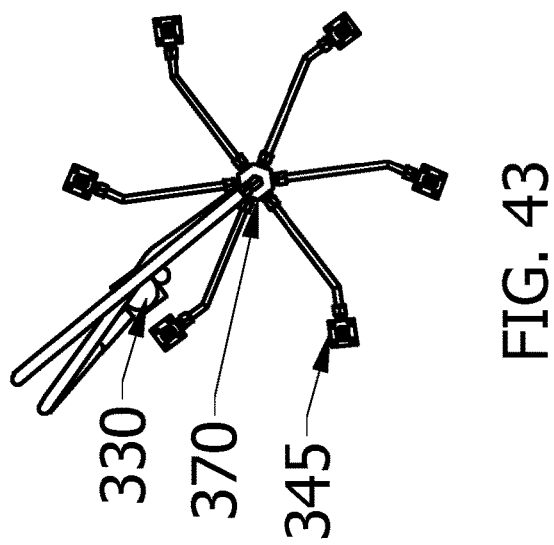
FIG. 43 is a top view of the assembly of FIG. 42.
Figure 42:
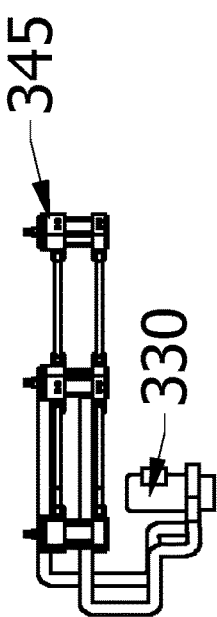

Some embodiments may include a reservoir 300 which collects excess liquid that may inadvertently spray or escape. When rotating assemblies are both magnetically levitated and aligned, there are air gaps in which droplets may escape. Reservoir 300 can collect these droplets for reuse in the system. Referring to FIGS. 1, 2, 5, 7, and 38-42 a reservoir 300 with accompanying fill and drain elements is shown according to an exemplary embodiment. The reservoir 300 may include a perimeter wall 305 defining the storage area for the liquid. The reservoir 300 may include a pump 325 which may pump the liquid into a six to one manifold 310 connected to solenoids 315 that control the flow into fill lines 355 (FIG. 129). The fill lines 355 may be connected to check valves 360 (FIG. 59 and FIG. 129) leading into the separator module 430. Some embodiments may include a hydraulic pump 330 which may control a hydraulic assembly (seen in FIGS. 41-43). The hydraulic assembly may be positioned on a level above the manifold 310 as shown for example, in FIGS. 7 and 11. The hydraulic assembly may include a lifting manifold 365 for adding hydraulic pressure raising the elements on the shaft 708. The hydraulic assembly may position the impeller fan 650 blades at the correct elevation relative to the point in which pressurized fluid enters the turbine chamber 855. Ideally, the pressurized fluid should impact the center of the turbine blades. The hydraulic assembly lifts the turbine system 700 to that ideal height. Once magnetic levitation is in effect the hydraulics may no longer be needed. The hydraulic assembly may include a retracting manifold 370 for releasing hydraulic pressure applied to the turbine system 700, lowering the hydraulics after magnetic levitation takes over. When operating the lifting manifold 365, the lifting manifold 365 may include a piston(s) attached to a rod (shown in FIGS. 41 and 42) which pushes up against the platform under the turbine shafts 708 (see for example, FIG. 76). The retracting hydraulic manifold 370 applies pressure to the top of the piston(s) drawing the rod back down and so there is an air gap between the turbine shaft point 726 and the platform below it during operation of the turbine module 700.

Catchment

Figure 123:
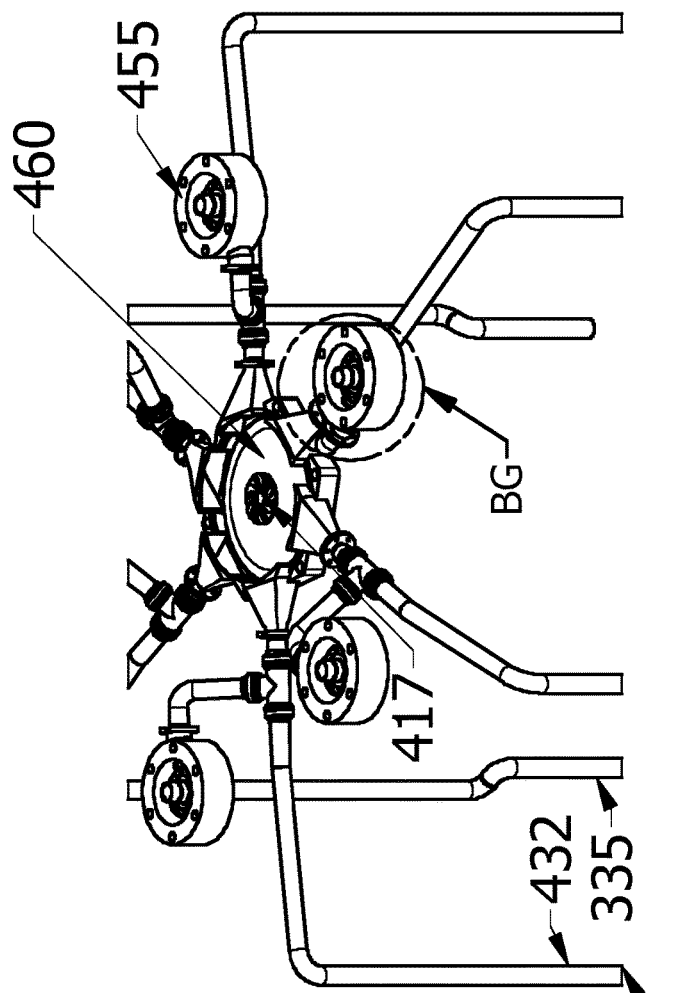
Figure 126:
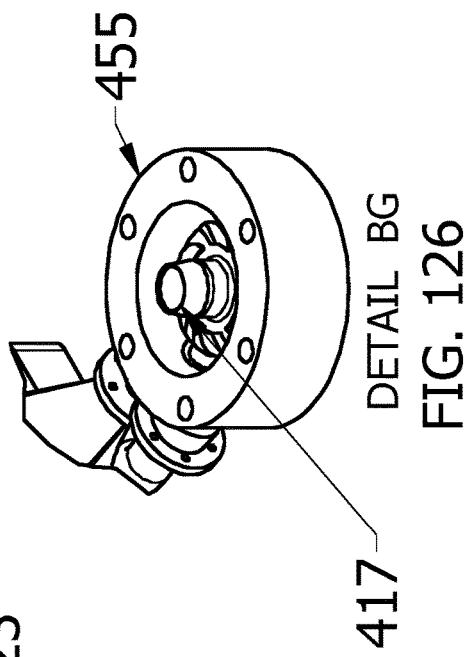
Figure 124:
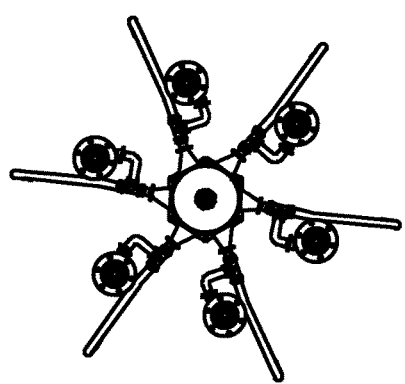
Figure 125:
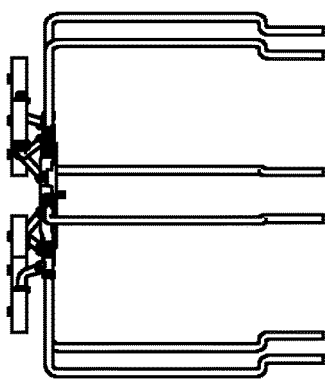

In some embodiments, the fluid separator system 400 may include catchment devices for collecting liquid. For example, referring to FIGS. 123-126 and 132-133, on the top end of every turbine shaft 708, and at the bottom of shafts 708, there may be catchment devices 455 which collect liquid that escapes from the separator modules 430 and may leak down the shaft 402. This may happen if the pump was falling behind for the amount of liquid entering the system. As mentioned briefly above with regard to divertor fan 720, some spray on the top end may be collected and it drips down. The liquid collected may be returned to the reservoir 300 by drains 335. In some embodiments, the drainage system may include a manual drain line 470 connected to the fluid separator system 400 (see FIGS. 33-37). Liquid from the separator module 430 may flow out a drain 475 in the separator module casing (see FIG. 35). Manually operated drains 465 may be opened to decrease the liquid present in the system 1000 as needed. Referring to FIGS. 132-133, on the top end of the separator system 400, there may be an overspray module 453. The overspray module 453 may include a casing 415. The casing 415 may surround the shaft 402 positioned above one or more of the separator modules 430 to catch any liquid that spins out of the outer impeller 413. The casing 415 may flow the liquid down to drain 475 and back down to the reservoir 300. The divertor fans 417 in the catchment devices 455 function similarly to the fan 720 on the turbine shaft 708, except that once liquid gets to that low point it will drain into the reservoir 300. On the bottom end of the shaft 402, there may be a catchment module 460 (see FIGS. 33 and 123).

Gas Extraction

In some embodiments, the gas components may be extracted in the separator module 430 by the inner impeller 428. Referring to FIGS. 16, 33, 36, and 68-71, some embodiments may include a gas extraction assembly 501 which may collect extracted gas and route it to exhaust lines 432. The escaping gas impacts impeller inside assembly 501 thereby helping shaft 402 to rotate. In some embodiments, the exhaust lines 432 may be routed down to the reservoir 300 in case some droplets of liquid escape up the central shaft 402. The escaped liquid is captured into the exhaust lines 432 and recovered by routing it to the reservoir 300.

Priming

In some embodiments, the turbine system 1000 may include a priming protocol to provide initial fluid to the impeller modules 600 and initial rotation to the rotating elements in the system. The system will require a source of power to prime the system. The system may be primed by rotating shaft 402 and activating pump 325. Solenoid valves 315 may be actuated one or more at a time to allow fluid to flow to the respective modules via conduit 355. See FIGS. 38, 58, 59, 60, and 127-130. The pump 325 may fill the separator module 430 with liquid that is routed further down to the pressure chambers 855. In addition, the motor 401 may operate assorted valves and solenoids described above to, for example, fill the turbine modules 700 with compressed air ready to fill the pressure chambers 855 or flush non-compressed air out of the pressure chambers 855. Another priming function includes lifting the separator system 400 including the shaft 402 by hydraulic power so that the shaft 402 is rotating out of contact from a supporting surface at start-up.

Control

Figure 13:
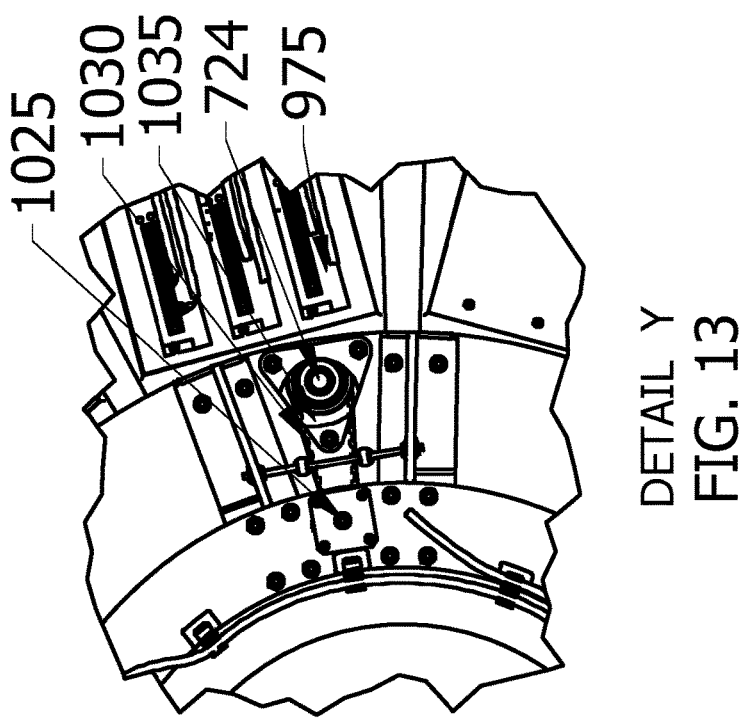
FIG. 13 is an enlarged partial view of the box Y in FIG. 12.
Figure 12:
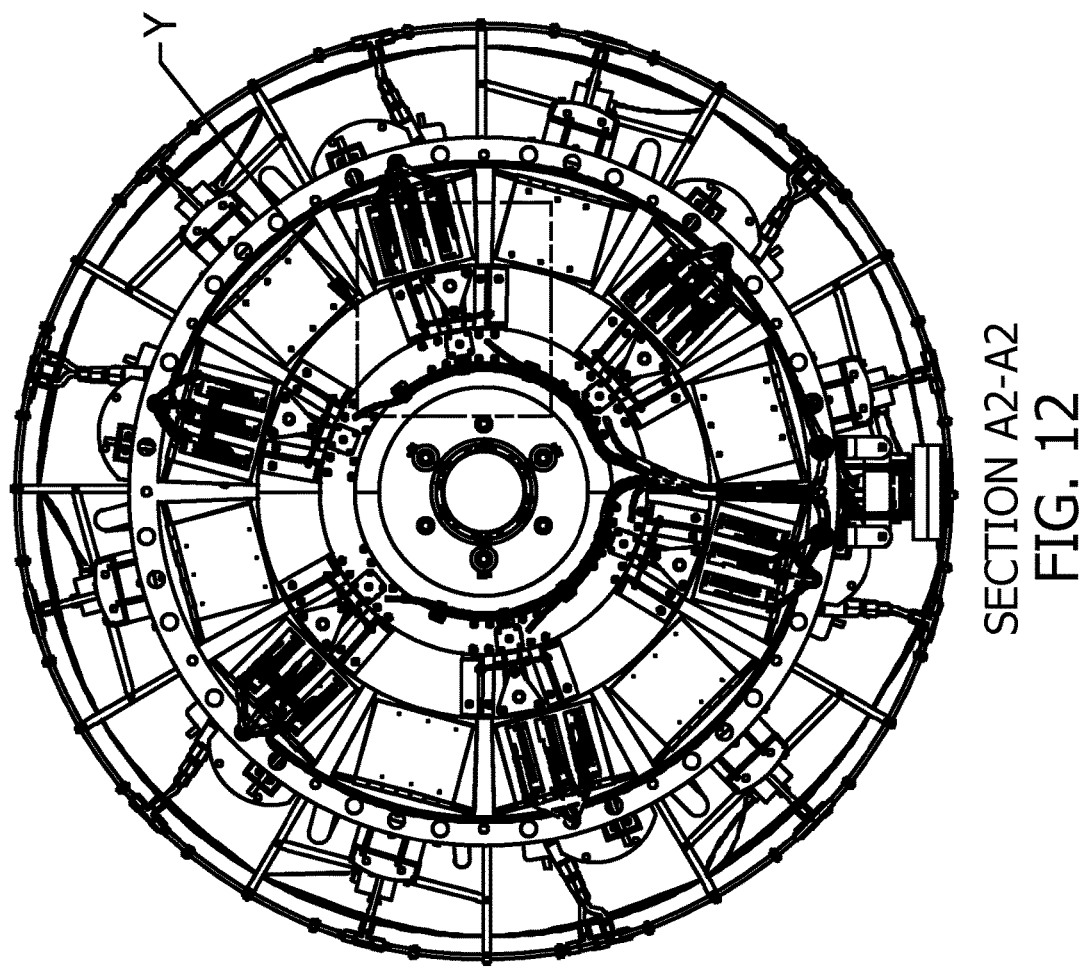
FIG. 12 is a cross-sectional view taken along the line A2-A2 of FIG. 4.
Figure 17:
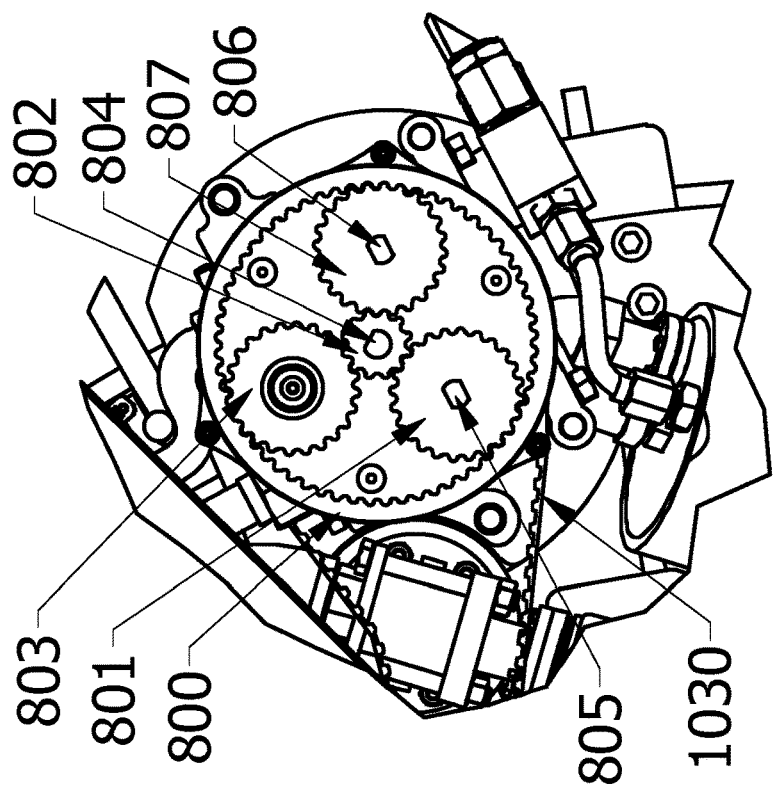
FIG. 17 is an enlarged partial view of the circle N in FIG. 16.
Figure 16:
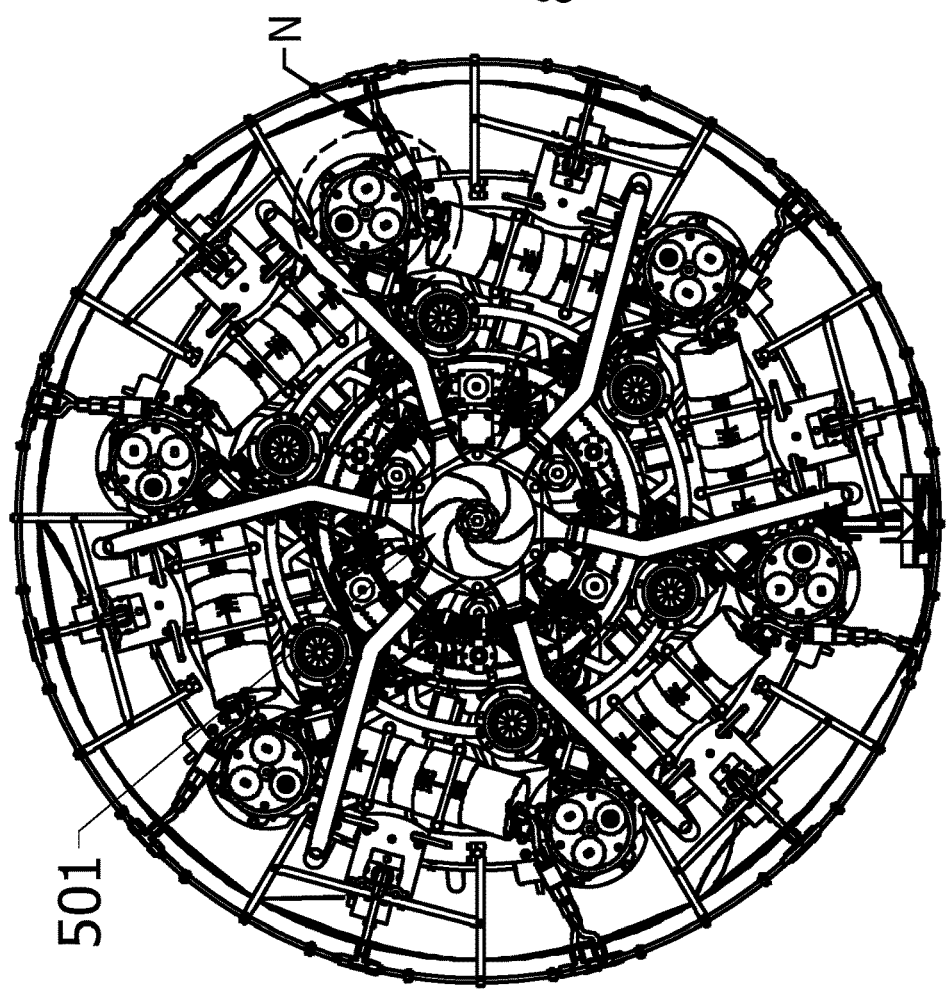
FIG. 16 is a cross-sectional view taken along the line A4-A4 of FIG. 4.
Figure 19:
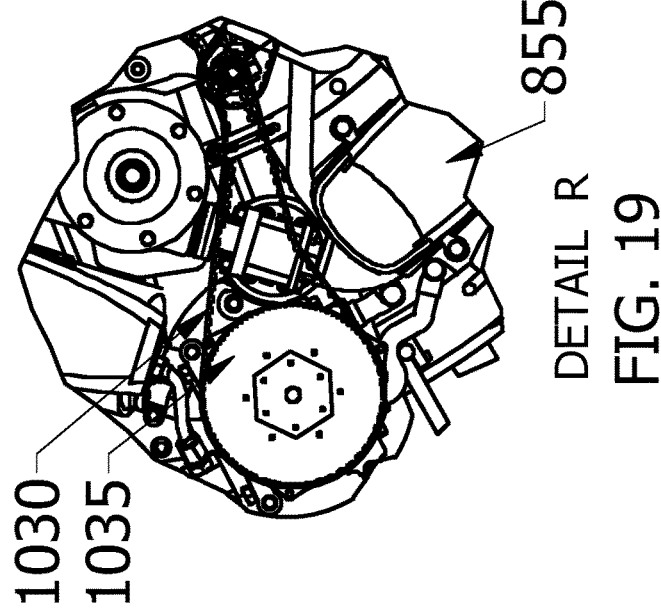
FIG. 19 is an enlarged partial view of the circle R in FIG. 18.
Figure 18:
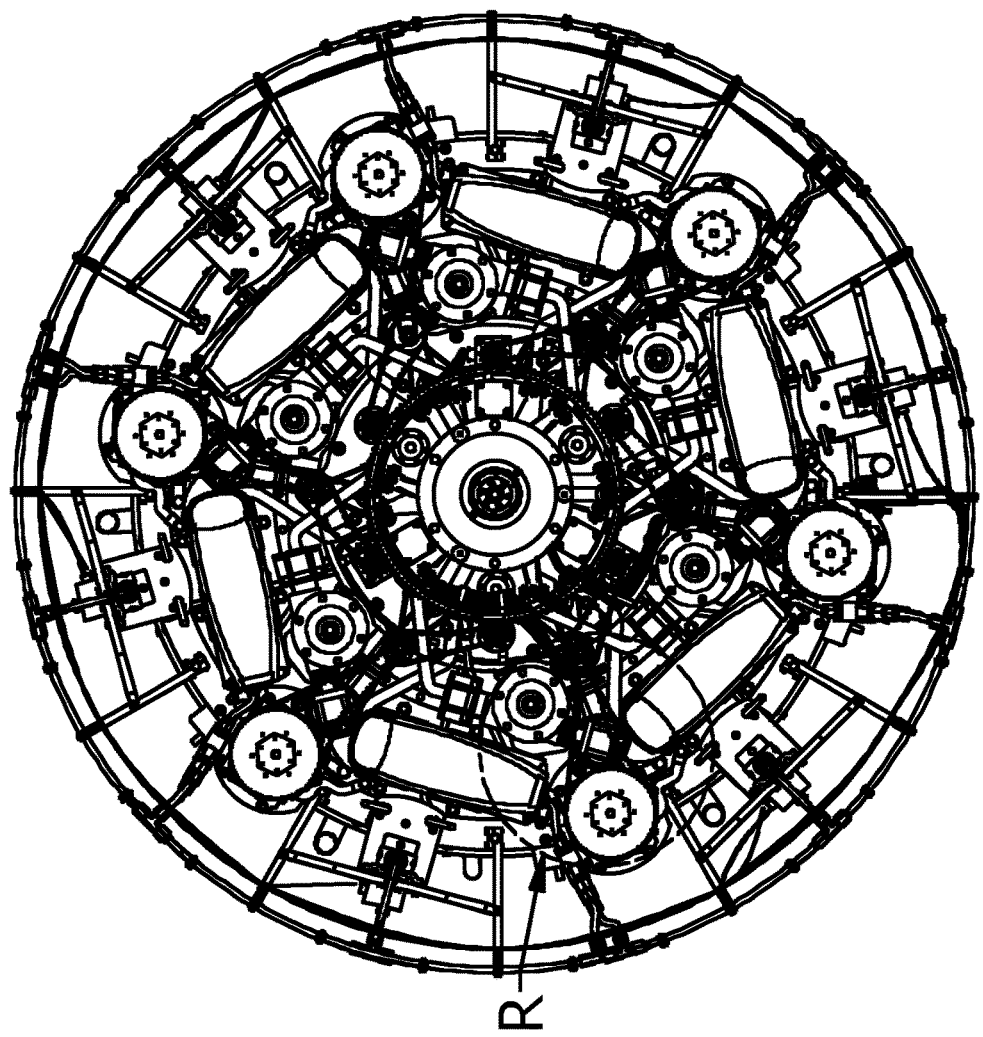
FIG. 18 is a cross-sectional view taken along the line A3-A3 of FIG. 4.
Figure 25:
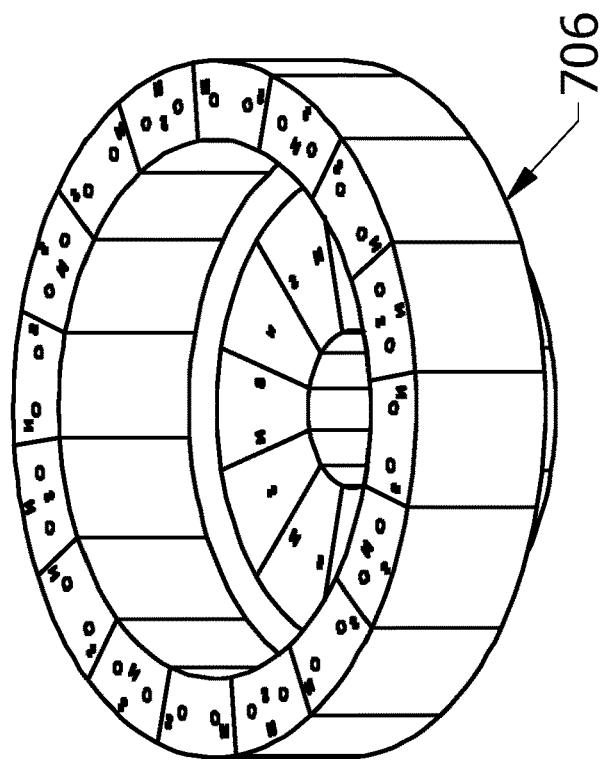
FIG. 25 is a perspective top view of the rotor of FIG. 24.
Figure 24:
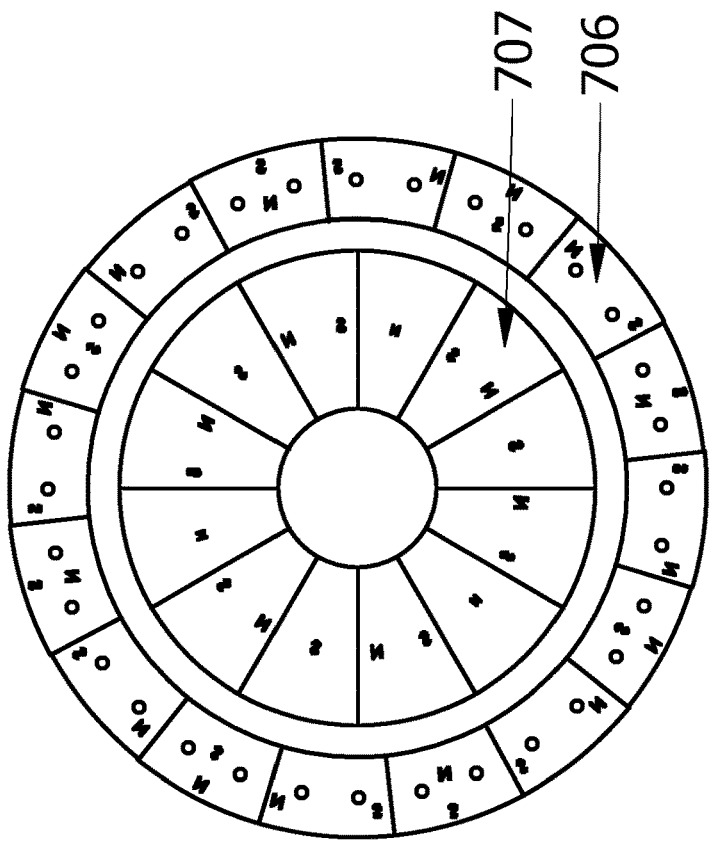
FIG. 24 is a top view of an upper turbine rotor in accordance with an embodiment.
Figure 26:
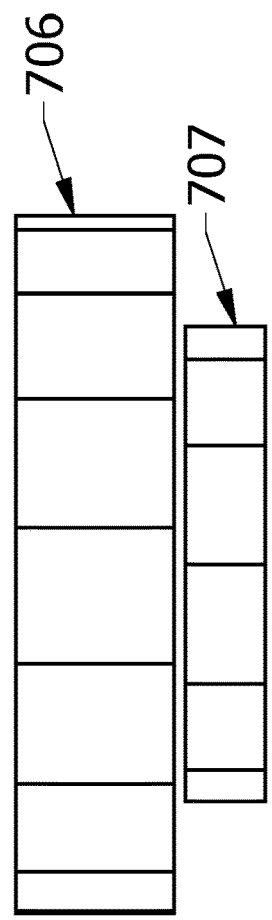
FIG. 26 is a side view of the rotor of FIG. 24.
Figure 28:
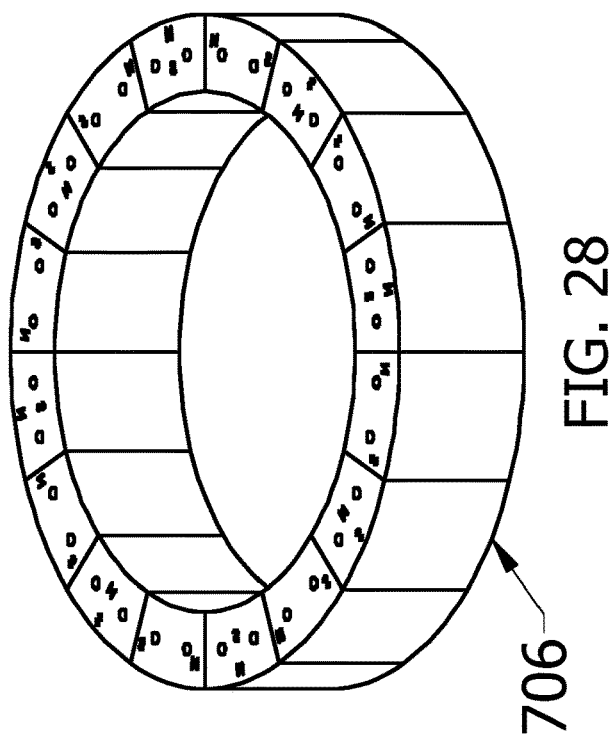
FIG. 28 is a perspective top view of the generator array of FIG. 27.
Figure 27:
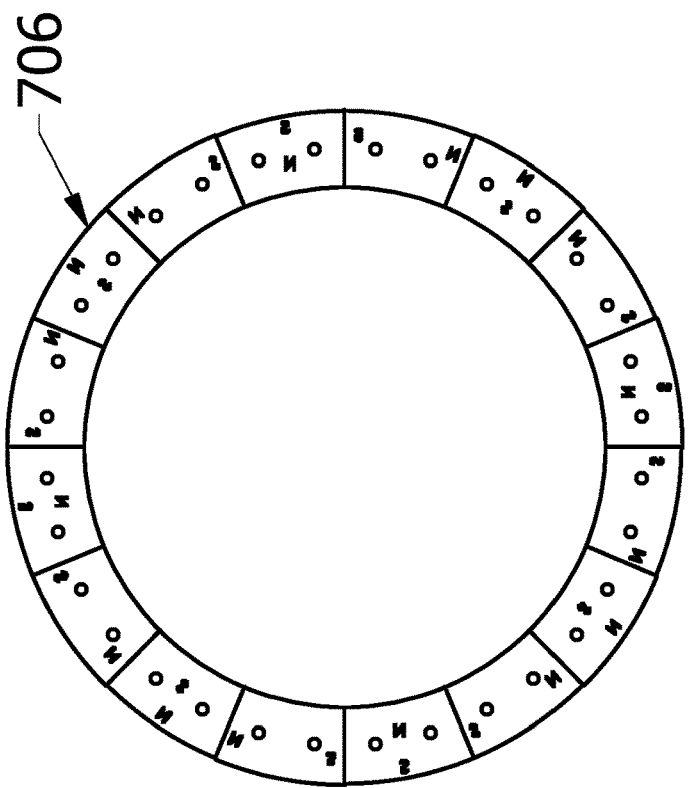
FIG. 27 is a top view of a turbine generator array in accordance with an embodiment.
Figure 29:
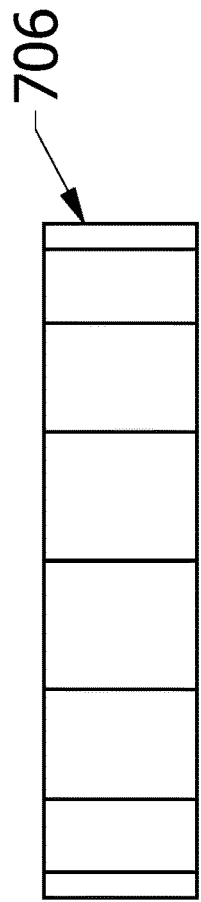
FIG. 29 is a side view of the generator array of FIG. 27.

Referring now to FIGS. 1, 2, 12, and 13 control elements of the turbine system 1000 are shown according to embodiments. A controller 950 may be wired to various electronic elements in the system 1000 to control operation of the various aspects described above. The controller 950 may comprise a circuit board or a processor 960. In some embodiments, a user interface screen 970 may be connected to the processor 960 so that users may be provided user selections and input for operating the turbine system 1000. In some embodiments, the processor 960 may be connected to driver modules or chips 975 (sometimes referred to simply as "drivers 975"). The drivers 975 may be connected to and control elements such as stepper motors 1006 or stepper motor 1025 (FIG. 13). The control of stepper motors 1006 controls actuation of reduction gears 1005 or 1007. Further discussion of examples of actuation of elements are discussed below.

Valve Actuation

Figure 96:
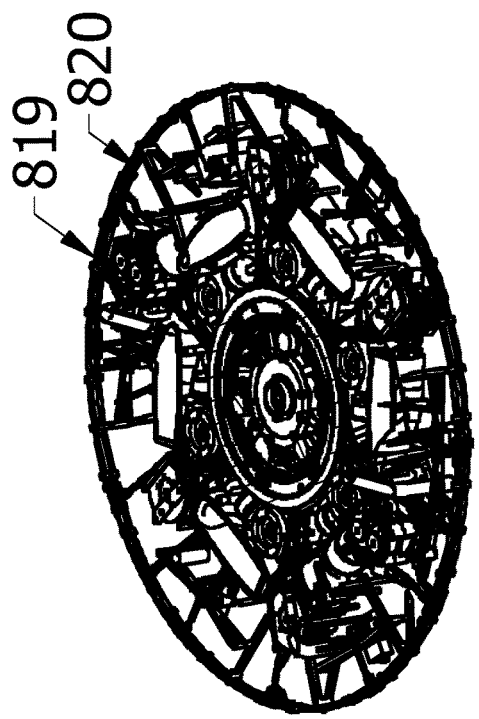
FIG. 96 is a top perspective view of the valve assembly of FIG. 95.
Figure 95:
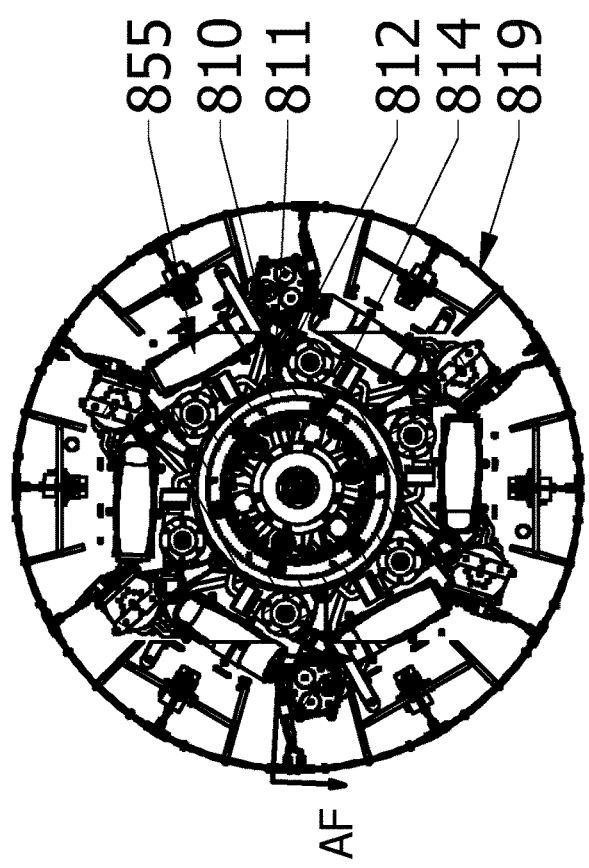
FIG. 95 is a cross-sectional view top view of the turbine system at a level showing the interior of the fluid separator module adjacent the pressure chambers, and valve control systems controlling the timing of turbine impeller action and fill/release from the fluid separator module in accordance with an embodiment.
Figure 94:
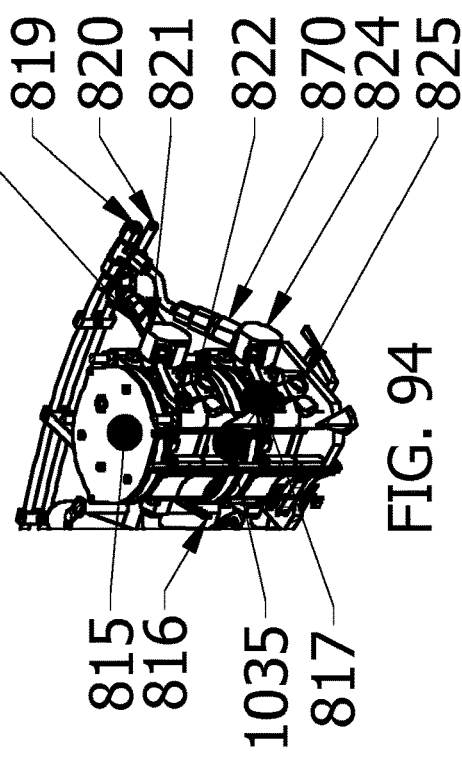
FIG. 94 is a front perspective view of an actuator valve assembly in accordance with an embodiment.
Figure 100:
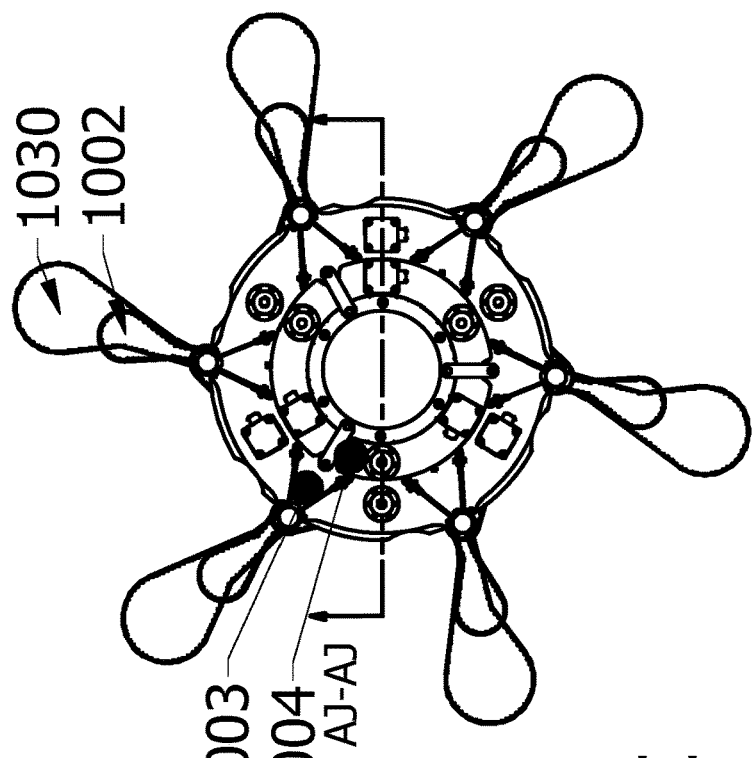
FIG. 100 is a top plan view of actuator assemblies in accordance with an embodiment.
Figure 101:
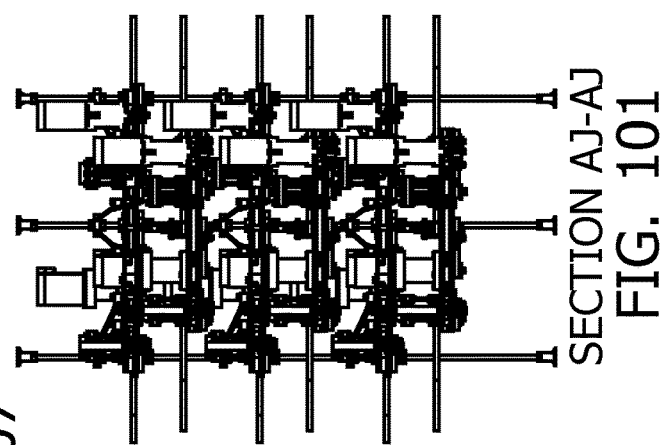
FIG. 101 is a cross-sectional view taken along the line AJ-AJ of FIG. 100.
Figure 102:
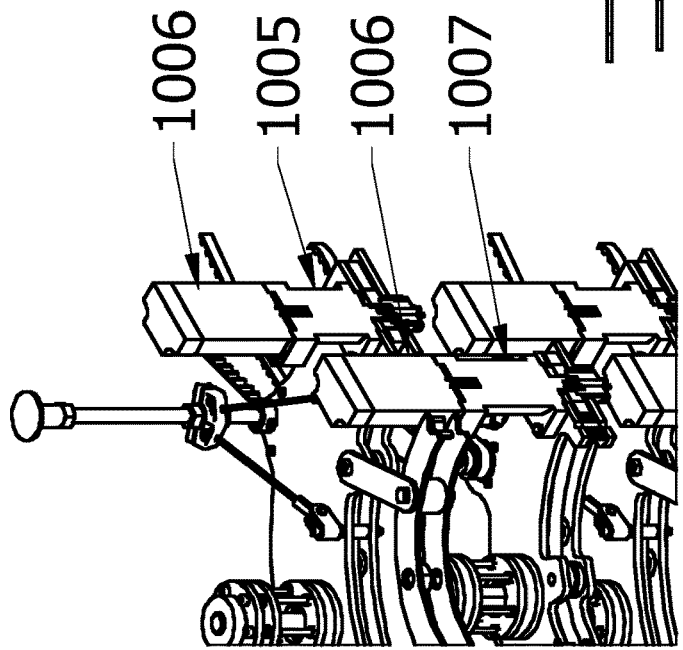
FIG. 102 is an enlarged partial view of central actuator assemblies in accordance with embodiments.
Figure 109:
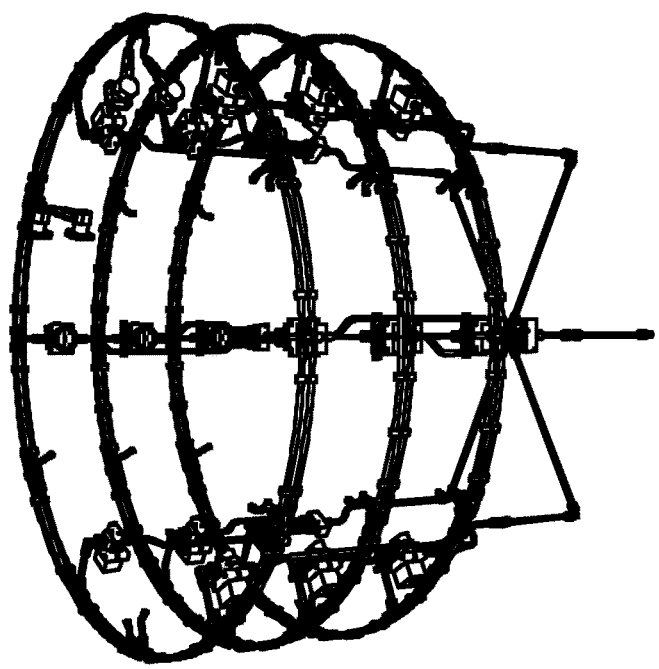
FIG. 109 is a front perspective view of the compressed air manifold assembly of FIG. 108.
Figure 111:
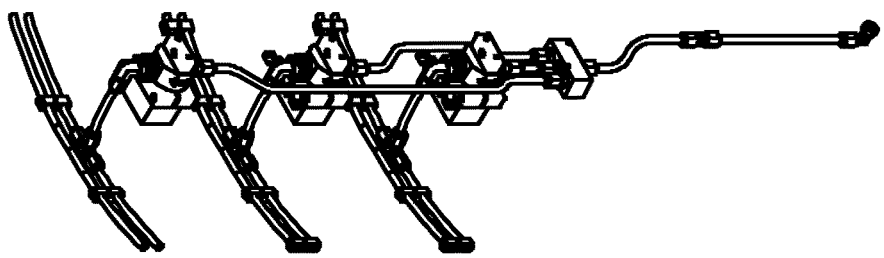
FIG. 111 is a cross-sectional view taken along the line A-A.
Figure 108:
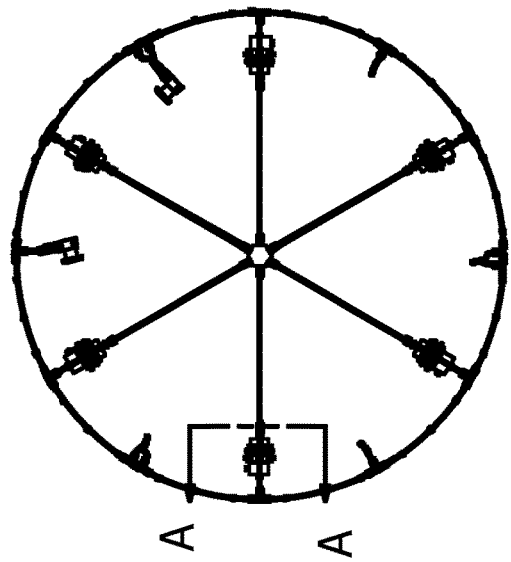
FIG. 108 is a top view of a compressed air manifold assembly in accordance with an embodiment.
Figure 110:
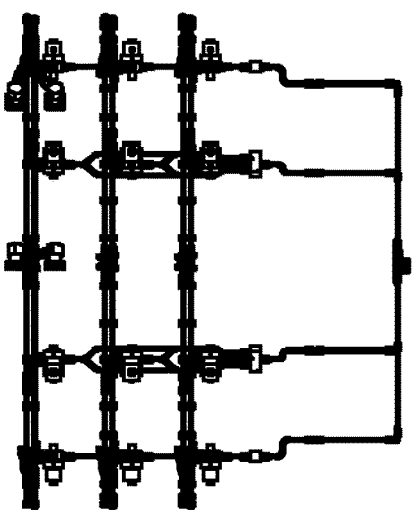
FIG. 110 is a side view of the compressed air manifold assembly of FIG. 108.
Figure 112:
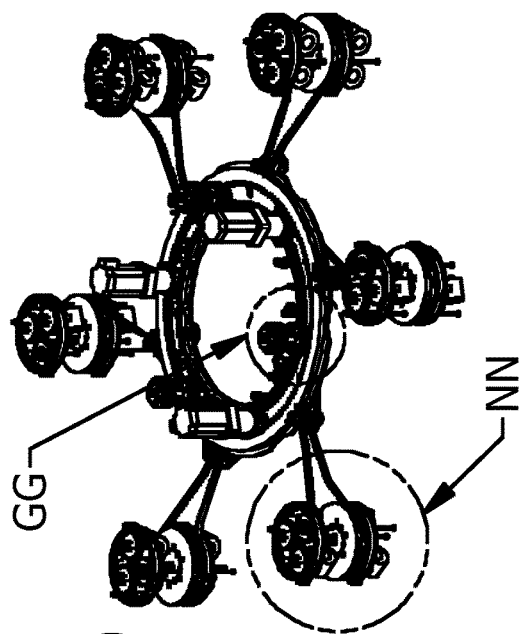
FIG. 112 is a top perspective view of a valve actuator assembly in accordance with an embodiment.
Figure 116:
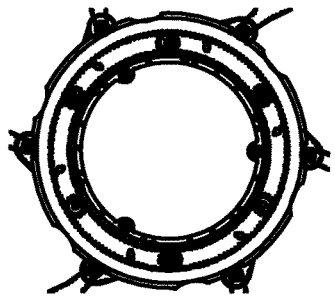
FIG. 116 is cross-sectional view taken along the line RR-RR of FIG. 114.
Figure 115:
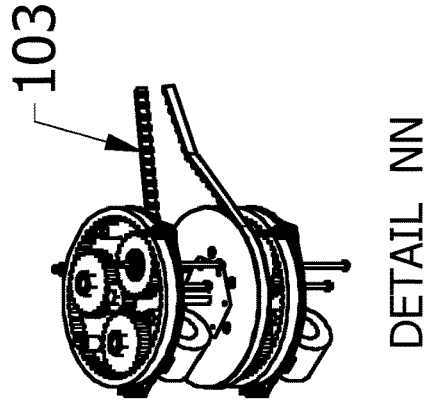
FIG. 115 is an enlarged view of the circle NN of FIG. 112.
Figure 117:
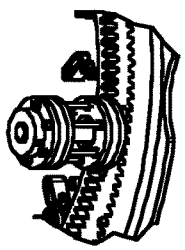
FIG. 117 is an enlarged partial view from the circle GG of FIG. 112.
Figure 113:
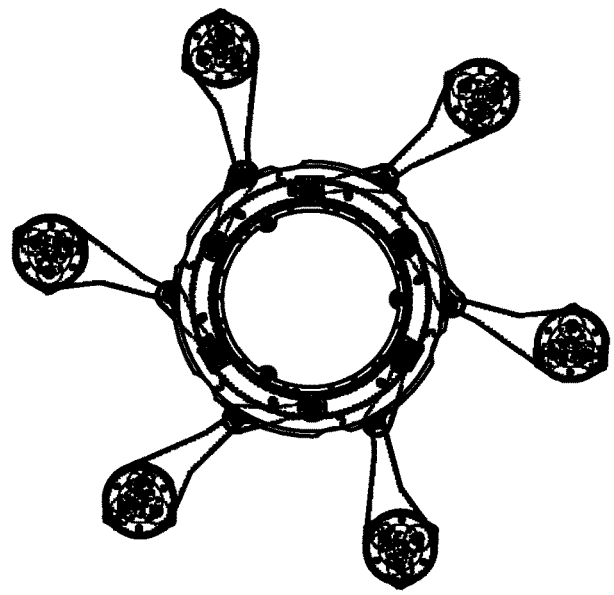
FIG. 113 is a top view of the valve actuator assembly of FIG. 112.
Figure 114:
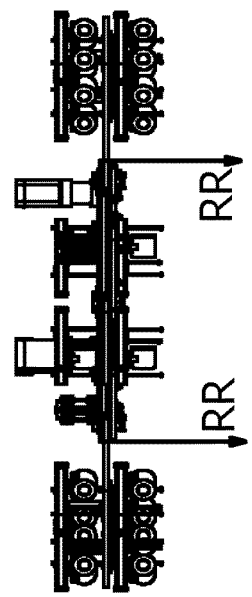
FIG. 114 is a side view of the valve actuator assembly of FIG. 112.
Figure 118A:
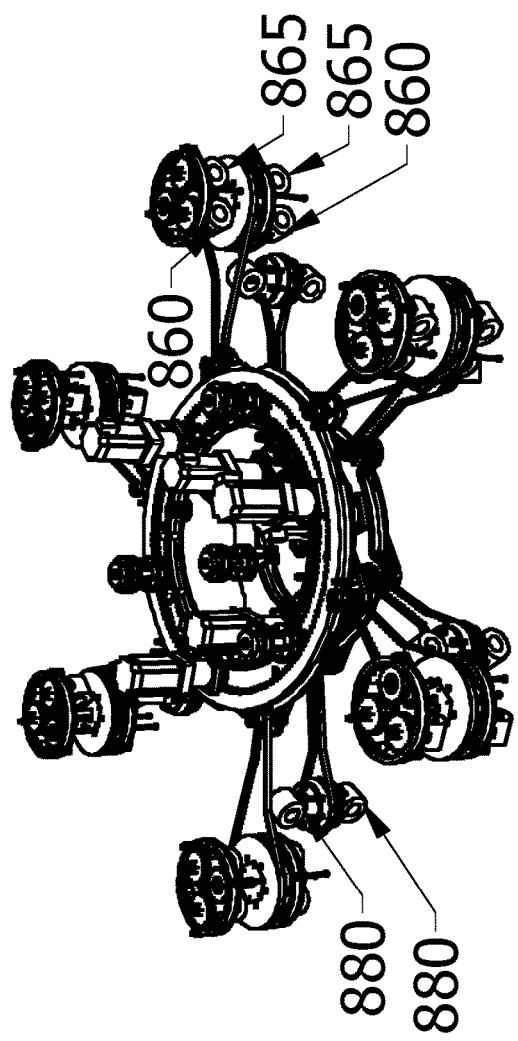
FIG. 118A is a top perspective view of the valve actuator assemblies of FIGS. 118 and 112 merged together in accordance with an embodiment.
Figure 118B:
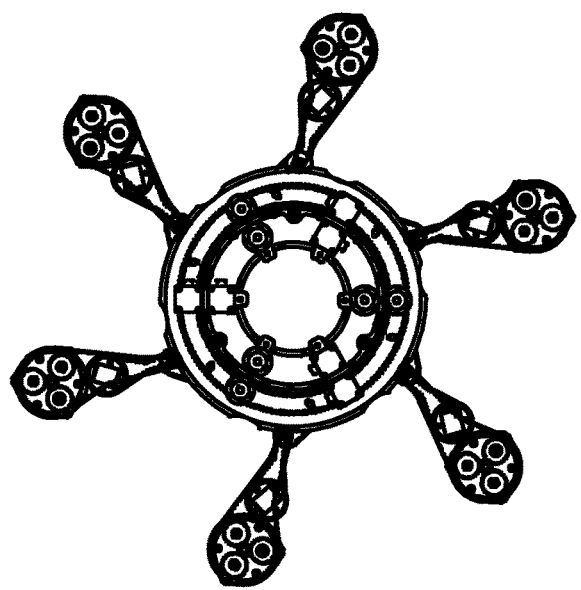
FIG. 118B is atop view of the assemblies of FIG. 118A.
Figure 118C:
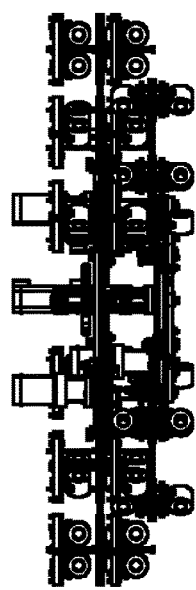
FIG. 118 is a top perspective view of a valve actuator assembly in accordance with an embodiment.

Referring for example to FIGS. 6, 13, 94-96, 100-102 and 112-122, an actuation scheme for valves is shown according to an exemplary embodiment. When reviewing the figures, it should be noted that driving elements may be present in one drawing but not the other so that various features can be seen relative to the other features between figures. For example, FIG. 94 shows a vertical view of actuation features for two different levels of valves 860 and 865 (which can be seen more readily in FIG. 6). The top of the structure only shows a gear box 815 while in practice, other features may be present. The valves 860 and 865 are controlled to be opened on the upper level while closed on the paired lower level (and vice versa). In an exemplary embodiment, there may be paired gear boxes (upper 815 and lower 817) for controlling respective pairs of valves 860; 865. FIGS. 113-122 show this in clearer detail. FIGS. 94-96 also show a belt 816 (which may be the same as belt 1030 called out for example, in FIGS. 115 and 122) that wraps around a pulley 811 (called out as element 1035 in FIG. 122). A liquid flow passage 822 is accessible by liquid as controlled by the liquid valve 860. A fitting 825 may connect one of the two valves to the pressure chamber 855. Liquid flows through fitting 825 into the pressure chamber 855. Referring to FIGS. 100-102, some embodiments may be configured so that the pulleys and valves are staggered (inner and outer sets) for consideration in use of space. As a result, some embodiments use a different size belt 1030 for the outer gears 1003 than the belt 1002 for the inner gears 1004. FIGS. 118A-118C show the valve actuation assemblies for six turbine shafts (not pictured here).

Referring to FIG. 6 (and FIG. 17 for a concurrent top view), the two levels of valve pairs 860 and 865 can be seen according to an embodiment. The top level includes planetary gears 801, 803, and 807 for operating the rotation of valves 860; 865. A sun gear 802 may be situated between the planetary gears 801, 803, and 807. Planetary gears 801 and 807 may be coupled to valve stems 805 and 806 respectively. The bottom level has similar planetary gears 801, 803, and 807 for turning its valves. The shaft 804 may be coupled to both pairs of valves 860; 865 so that when the belt 810 turns pulley 811, the planetary gears 801 and 807 are turned which in turn rotate valve stems 805 and 806 to open or close the passageways through each valve leading to pressure chamber 855.

Pressure Charging Control

Referring back to FIG. 95, in an exemplary embodiment, the control of the fluid intake and release from pressure chambers 855 may include a staggered sequence. While it may not be readily visible, it should be understood that embodiments include two levels of pressure chambers 855 with one pressure chamber 855 coupled to an upper pair of the vales 860; 865 and a lower pressure chamber 855 coupled to the lower pair of valves 860; 865. The compressed gas manifold 819 is the source for the upper level of pressure chambers 855 and the gas manifold 820 may be the source for the lower level. In an exemplary embodiment, as the upper valves 860; 865 are controlled to fill pressure chamber 855, the lower valve pair may be setting up to fill its pressure chamber 865. The controller 960 may be configured to operate the pairs of valves 860; 865 so that every other pressure chamber 855 on the same level is charging up with pressurized fluid while the other three pressure chambers 855 are expelling fluid into their respective impeller modules 600. The controller 960 may also time the charging of pressure chambers 855 on the lower level to have the alternate state of their upper level counterpart so that for example, the upper pressure chamber may be charging while the lower level pressure chamber 855 may be expelling. In the exemplary process described, each turbine shaft 708 may be continuously driven with an even distribution of fluid force down the shaft. In other embodiments, the controller 960 may also operate the valves 860; 865 so that the pressure chambers 855 may be staggered with intermediate states of charging. For example, a first pressure chamber 855 may be in a fully open state having fully expelled the pressurized fluid, a second pressure chamber 855 may be in a fully charged state, ready to expel the pressurized fluid when the first pressure chamber becomes fully expelled, and a third pressure chamber 855 may be in a partially charged state, accumulating the pressurized fluid while waiting for the second chamber 855 to fully expel the pressurized fluid. The sequence may repeat for the next three pressure chambers 855 on the same level.

Wiring

Referring now to FIGS. 137-139, a wiring scheme 900 is shown according to an exemplary embodiment. The wiring scheme 900 shows wired connections between the processor 960, stepper motors 701, user interface 970, drivers 975, solenoids 809 controlling opening/closing of gas from manifolds 819; 820, and optical sensors 795.

Those of skill in the art would appreciate that various components may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electromagnetic turbine, comprising:
   a plurality of first conduit lines for a compressed gas;
   a plurality of second conduit lines for a liquid;
   a plurality of pressure chambers connected to the first conduit line and to the second conduit line, wherein the pressure chambers are configured to combine the compressed gas with the liquid into pressurized fluid;
   a plurality of electromagnetic turbine modules, wherein
      each electromagnetic turbine module includes a turbine impeller, a turbine shaft coupled to the turbine impeller, an electromagnetic turbine generator coupled to the turbine shaft, and wherein
      each pressure chamber is in fluid communication with respective turbine impellers of respective electromagnetic turbine modules for driving respective turbine impellers with the pressurized fluid to turn respective turbine shafts and generate power from respective electromagnetic turbine generators, and wherein
      the pressurized fluid is expelled from respective turbine impellers;
   a centrifuge coupled to a fluid outlet from each of the electromagnetic turbine modules, wherein the centrifuge is configured to:
      collect the pressurized fluid expelled from respective turbine impellers,
      separate the compressed gas from the liquid;
      route the compressed gas away from the liquid, and
      route the liquid out of the centrifuge; and
      an outlet conduit connected to the centrifuge, wherein the liquid is routed back to the second conduit lines.

2. The electromagnetic turbine of claim 1, further comprising:
   a centrifuge impeller system centralized in the centrifuge, including
      an inner impeller configured to collect the compressed gas, and
      an outer impeller configured to collect the liquid separated from the compressed gas.

3. The electromagnetic turbine of claim 2, further comprising:
   a centrifuge shaft;
   a gas extraction assembly coupled to the centrifuge shaft, the gas extraction assembly including a fan blade assembly attached to the centrifuge shaft wherein the inner impeller is configured to catch the compressed gas and direct the compressed gas upward along the centrifuge shaft into contact with the fan blade assembly to assist turning of the centrifuge shaft.

4. The electromagnetic turbine of claim 3, further comprising:
   a drain coupled to the centrifuge for catching some of the liquid;
   a reservoir disposed to receive liquid caught by the drain; and
   a pump coupled to the reservoir, wherein the pump is configured to pump liquid back to the second conduit lines through plumbing.

5. The electromagnetic turbine of claim 4, wherein a priming mechanism is configured to pump the liquid from the reservoir to the pressure chamber.

6. The electromagnetic turbine of claim 1, further comprising a timing controller connected to the plurality of pressure chambers, wherein the timing controller is configured to alternate expelling of the pressurized fluid from one pressure chamber to drive its respective turbine shaft while refilling another pressure chamber with the pressurized fluid.

7. The electromagnetic turbine of claim 6, wherein there are at least three pressure chambers, and the timing controller is configured to control:
   a first pressure chamber to be in a fully open state having fully expelled the pressurized fluid,
   a second pressure chamber to be in a fully charged state, ready to expel the pressurized fluid when the first pressure chamber becomes fully expelled, and
   a third pressure chamber to be in a partially charged state, accumulating the pressurized fluid while waiting for the second chamber to fully expel the pressurized fluid.

8. The electromagnetic turbine of claim 1, further comprising:
   a magnetic bearing coupled to each turbine shaft, wherein each magnetic bearing is disposed to control a lateral alignment of the turbine shaft while being driven by respective turbine impellers.

9. The electromagnetic turbine of claim 8, wherein respective magnetic bearings further comprise a Halbach cylinder surrounding respective turbine shafts, wherein a rotation of respective turbine shafts generates a zero field between the Halbach cylinder and respective turbine shafts.

10. The electromagnetic turbine of claim 1, wherein the electromagnetic turbine generator comprises:
    a rotor and stator assembly;
    a cylindrical set of magnets under the rotor; and
    a conductive platform positioned below the cylindrical set of magnets, wherein:

the driving of respective turbine impellers rotates respective turbine shafts, and the rotation of respective turbine shafts generates a repelling force between the cylindrical set of magnets and the conductive platform generating a levitation of the turbine shaft.

11. The electromagnetic turbine of claim 10, further comprising an optical sensor module coupled to respective electromagnetic turbine modules, wherein each optical sensor module is configured to detect a vertical position of respective turbine shafts.

12. The electromagnetic turbine of claim 1, wherein a set of the electromagnetic turbine generators is configured to generate a three-phase coaxial flux output.

13. An electromagnetic turbine, comprising:
a turbine impeller;
a turbine shaft coupled to the turbine impeller;
an electromagnetic turbine generator coupled to the turbine shaft, wherein the electromagnetic turbine generator comprises:
a rotor and stator assembly;
a cylindrical set of magnets under the rotor, and
a conductive platform positioned below the cylindrical set of magnets, wherein a rotation of the turbine shaft generates a repelling force between the cylindrical set of magnets and the conductive platform; and
a pressurized fluid source in fluid communication with the turbine impeller configured to drive the turbine impeller, the turbine shaft, and the electromagnetic turbine generator to generate an electrical output.

14. The electromagnetic turbine of claim 13, further comprising a circulation system configured to recirculate the pressurized fluid back to the source and recycle the pressurized fluid to the turbine impeller.

15. The electromagnetic turbine of claim 14, wherein the circulation system includes a gas and liquid separator system configured to separate gas and liquid from the pressurized fluid after the pressurized fluid drives the turbine impeller.

16. The electromagnetic turbine of claim 15, further comprising a priming mechanism configured to prime one or more components in the electromagnetic turbine with the pressurized fluid.

17. The electromagnetic turbine of claim 16, wherein the gas and liquid separator system is configured to supply extracted gas to a fan blade assembly attached to a shaft of the gas and liquid separator system for assisting rotation of the shaft of the gas and liquid separator system.

18. The electromagnetic turbine of claim 16, further comprising a pair of apposing magnets coupled to the turbine shaft, wherein the apposing magnets are disposed to prevent the turbine shaft from rising beyond a threshold height.

19. The electromagnetic turbine of claim 13, further comprising a Halbach cylinder surrounding the turbine shaft, wherein a rotation of the turbine shaft generates a zero field between the Halbach cylinder and the turbine shaft, to control a lateral alignment of the turbine shaft.

20. The electromagnetic turbine of claim 13, further comprising an optical sensor module coupled to the turbine shaft, configured to detect a vertical position of the turbine shaft and signal to a controller whether the turbine shaft exceeds a height.

* * * * *